United States Patent
Kuritsyn et al.

(10) Patent No.: US 11,415,745 B2
(45) Date of Patent: Aug. 16, 2022

(54) SYSTEMS, DEVICES, AND METHODS FOR IMPROVED OPTICAL WAVEGUIDE TRANSMISSION AND ALIGNMENT

(71) Applicant: Pacific Biosciences of California, Inc., Menlo Park, CA (US)

(72) Inventors: Alexey Kuritsyn, San Jose, CA (US); Mark Mcdonald, Milpitas, CA (US); Aaron Rulison, Los Altos, CA (US); Russell Berman, San Carlos, CA (US)

(73) Assignee: Pacific Biosciences of California, Inc., Menlo Park, CA (US)

( * ) Notice: Subject to any disclaimer, the term of this patent is extended or adjusted under 35 U.S.C. 154(b) by 0 days.

(21) Appl. No.: 17/201,317

(22) Filed: Mar. 15, 2021

(65) Prior Publication Data
US 2021/0311254 A1    Oct. 7, 2021

Related U.S. Application Data

(63) Continuation of application No. 16/179,942, filed on Nov. 3, 2018, now Pat. No. 10,948,652.
(Continued)

(51) Int. Cl.
*G02B 6/12* (2006.01)
*G02B 6/42* (2006.01)
(Continued)

(52) U.S. Cl.
CPC ......... *G02B 6/12016* (2013.01); *G01N 21/17* (2013.01); *G01N 21/63* (2013.01);
(Continued)

(58) Field of Classification Search
CPC .... G02B 6/12016; G02B 6/122; G02B 6/422; G02B 27/0955; G02B 27/0972; G02B 27/0977; G02B 2006/12147
See application file for complete search history.

(56) References Cited

U.S. PATENT DOCUMENTS

| 3,674,335 A | 7/1972 | Peter et al. |
| 4,818,710 A | 4/1989 | Sutherland et al. |

(Continued)

FOREIGN PATENT DOCUMENTS

| WO | 2011126718 A1 | 10/2011 |
| WO | 2013037900 A1 | 3/2013 |

(Continued)

OTHER PUBLICATIONS

Epworth (1982) "The Temporal Coherence of Various Semiconductor Light Sources Used in Optical Fibre Sensors" Fiber-Optic Rotation Sensors and Related Technologies 237.
(Continued)

*Primary Examiner* — Daniel Petkovsek
(74) *Attorney, Agent, or Firm* — VLP Law Group LLP

(57) ABSTRACT

Provided herein are systems, devices, and methods for improved optical waveguide transmission and alignment in an analytical system. Waveguides in optical analytical systems can exhibit variable and increasing back reflection of single-wavelength illumination over time, thus limiting their effectiveness and reliability. The systems are also subject to optical interference under conditions that have been used to overcome the back reflection. Novel systems and approaches using broadband illumination light with multiple longitudinal modes have been developed to improve optical transmission and analysis in these systems. Novel systems and approaches for the alignment of a target waveguide device and an optical source are also disclosed.

36 Claims, 26 Drawing Sheets

Related U.S. Application Data

(60) Provisional application No. 62/581,203, filed on Nov. 3, 2017.

(51) Int. Cl.

| | | |
|---|---|---|
| *G02B 27/09* | (2006.01) | |
| *G02B 6/122* | (2006.01) | |
| *G01N 21/77* | (2006.01) | |
| *G01N 21/63* | (2006.01) | |
| *G01N 21/17* | (2006.01) | |
| *G01N 21/64* | (2006.01) | |
| *G02B 6/124* | (2006.01) | |
| *G02B 6/34* | (2006.01) | |

(52) U.S. Cl.
CPC ........... *G01N 21/64* (2013.01); *G01N 21/648* (2013.01); *G01N 21/77* (2013.01); *G01N 21/7703* (2013.01); *G02B 6/122* (2013.01); *G02B 6/124* (2013.01); *G02B 6/422* (2013.01); *G02B 27/0955* (2013.01); *G02B 27/0972* (2013.01); *G02B 27/0977* (2013.01); *G02B 6/34* (2013.01); *G02B 6/4224* (2013.01); *G02B 2006/1215* (2013.01); *G02B 2006/12147* (2013.01)

(56) References Cited

U.S. PATENT DOCUMENTS

| | | | |
|---|---|---|---|
| 5,821,058 | A | 5/1998 | Smith et al. |
| 6,917,726 | B2 | 7/2005 | Levene et al. |
| 7,056,661 | B2 | 6/2006 | Korlach et al. |
| 7,058,261 | B2 | 6/2006 | Ghiron et al. |
| 7,170,050 | B2 | 1/2007 | Turner et al. |
| 7,181,122 | B1 | 2/2007 | Levene et al. |
| 7,194,166 | B1 | 3/2007 | Gunn, III |
| 7,245,803 | B2 | 7/2007 | Gunn, III et al. |
| 7,486,865 | B2 | 2/2009 | Foquet et al. |
| 7,668,216 | B2 | 2/2010 | Colbourne |
| 7,792,402 | B2 | 9/2010 | Peng |
| 7,820,983 | B2 | 10/2010 | Lundquist et al. |
| 7,907,800 | B2 | 3/2011 | Foquet et al. |
| 8,182,993 | B2 | 5/2012 | Tomaney et al. |
| 8,207,509 | B2 | 6/2012 | Lundquist et al. |
| 8,274,040 | B2 | 9/2012 | Zhong et al. |
| 8,501,406 | B1 | 8/2013 | Gray et al. |
| 10,302,972 | B2 | 5/2019 | McDonald et al. |
| 10,948,652 | B2 * | 3/2021 | Kuritsyn ................ G02B 6/422 |
| 2003/0016425 | A1 | 1/2003 | Tan et al. |
| 2003/0185514 | A1 | 10/2003 | Bendett et al. |
| 2004/0028310 | A1 | 2/2004 | Moslehi et al. |
| 2008/0128627 | A1 | 6/2008 | Lundquist et al. |
| 2009/0208957 | A1 | 8/2009 | Korlach et al. |
| 2010/0169026 | A1 | 7/2010 | Sorenson et al. |
| 2010/0255488 | A1 | 10/2010 | Kong et al. |
| 2010/0296089 | A1 | 11/2010 | Webb et al. |
| 2011/0183320 | A1 | 7/2011 | Flusberg et al. |
| 2012/0014837 | A1 | 1/2012 | Fehr et al. |
| 2012/0019828 | A1 | 1/2012 | McCaffrey et al. |
| 2012/0021525 | A1 | 1/2012 | Fehr et al. |
| 2012/0052506 | A1 | 3/2012 | Yue et al. |
| 2012/0058469 | A1 | 3/2012 | Shen |
| 2012/0058473 | A1 | 3/2012 | Yue et al. |
| 2012/0058482 | A1 | 3/2012 | Shen et al. |
| 2012/0077189 | A1 | 3/2012 | Shen et al. |
| 2012/0085894 | A1 | 4/2012 | Zhong et al. |
| 2014/0199016 | A1 | 7/2014 | Grot et al. |
| 2014/0287964 | A1 | 9/2014 | Lundquist et al. |
| 2015/0247756 | A1 | 9/2015 | Islam |
| 2016/0061740 | A1 | 3/2016 | Grot et al. |
| 2016/0216538 | A1 * | 7/2016 | McDonald ............ G02F 1/0147 |
| 2016/0273034 | A1 * | 9/2016 | Lundquist ............ C12Q 1/6874 |
| 2016/0334334 | A1 | 11/2016 | Saxena et al. |
| 2016/0363728 | A1 * | 12/2016 | Wang ................ G01N 21/6452 |
| 2017/0145498 | A1 | 5/2017 | Saxena et al. |

FOREIGN PATENT DOCUMENTS

| | | |
|---|---|---|
| WO | 2013173844 A1 | 11/2013 |
| WO | 201623011 A1 | 2/2016 |

OTHER PUBLICATIONS

Saleh et al. (1991) "Statistical Optics" Fundamentals of Photonics, chapter 10.
Nakamura (2000) "Current Status and Future Prospects of InGaN-Based Laser Diodes" JSAP Intl 1 5.
Hecht (2010) "Photonic Frontiers: Shortwave Laser Diodes: The quest for practical green laser diodes" Laser Focus World.
Hecht (2012) "Photonic Frontiers: Green Laser Diodes: Nitride diode sources grow greener" Laser Focus World.
Sizov et al. (2012) "Gallium Indium Nitride-Based Green Lasers" J. Lightwave Tech. 30 679.
Takagi et al. (2013) "High-power and high-efficiency true green laser diodes" SEI Tech. Rev. 77 102.
Jeong et al. (2017) "Indium gallium nitride-based ultraviolet, blue, and green light-emitting diodes functionalized with shallow periodic hole patterns" Scientific Reports 7:45726.
International Search Report and Written Opinion dated Feb. 14, 2019 for Related PCT/US2018/059112.
Extended European Search Report dated Jun. 9, 2021, for European Patent Application 18873798.5.

\* cited by examiner

SYSTEMS, DEVICES, AND METHODS FOR IMPROVED OPTICAL WAVEGUIDE TRANSMISSION AND ALIGNMENT

CROSS-REFERENCE TO RELATED APPLICATION

This application is a continuation of U.S. patent application Ser. No. 16/179,942, filed on Nov. 3, 2018, now U.S. Pat. No. 10,948,652 B2, which claims the benefit of U.S. Provisional Application No. 62/581,203, filed on Nov. 3, 2017, the disclosures of which are incorporated herein by reference in their entireties.

STATEMENT REGARDING FEDERALLY SPONSORED RESEARCH

Not Applicable.

BACKGROUND OF THE INVENTION

As multiplexed analytical systems continue to be miniaturized in size, expanded in scale, and increased in power, the need to develop improved systems capable of such functionality becomes more important. For example, in optical analyses, increasing multiplex often poses increased difficulties, as it may require more complex optical systems, increased illumination or detection capabilities, and new reaction containment strategies. In some cases, systems seek to increase multiplex by many fold, and even orders of magnitude, which further complicate these considerations. Likewise, in certain cases, the analytical environment for which the systems are to be used is so highly sensitive that variations among different analyses in a given system may not be tolerable. These goals are often at odds with a brute force approach of simply making systems bigger and of higher power, as such steps often give rise to even greater consequences, e.g., inter-reaction cross-talk, decreased signal to noise ratios resulting from either or both of lower signal and higher noise, and the like. It would therefore be desirable to provide analytical systems that have substantially increased multiplex for their desired analyses, and particularly for use in highly sensitive reaction systems, and in many cases, to do so while minimizing negative impacts of such increased multiplex.

Conventional optical systems employ complex optical trains that direct, focus, filter, split, separate, and detect light to and from the sample materials. Such systems typically employ an assortment of different optical elements to direct, modify, and otherwise manipulate light entering and leaving a reaction site. Such systems are typically complex and costly and tend to have significant space requirements. For example, typical systems employ mirrors and prisms in directing light from its source to a desired destination. Additionally, such systems may include light-splitting optics such as beam-splitting prisms or diffraction gratings to generate two or more beams from a single original beam.

Alternatives to the conventional optical systems have been described, in particular, alternative systems having integrated optical components designed and fabricated within highly confined environments. There is, however, a continuing need to increase the performance of analytical systems, and to improve the transmission of optical energy through waveguides. There is also a continuing need to provide improved alignment between optical sources and target waveguide devices, in particular in integrated analytical devices comprising these components.

BRIEF SUMMARY OF THE INVENTION

The present disclosure addresses these and other needs by providing in one aspect systems for optical analysis, the system comprising:
 an optical source, the optical source configured to emit a broadband, multi-longitudinal optical excitation beam into free space, and
 a removable target waveguide device, comprising:
 at least one optical coupler, the at least one optical coupler configured to receive the optical excitation beam through free space from the optical source;
 at least one optical waveguide, the at least one optical waveguide comprising a first end; wherein the first end of the optical waveguide is configured to receive an optical excitation signal from the at least one optical coupler;
 at least one reaction region, the at least one reaction region optically coupled to the at least one waveguide; and
 at least one detector region, the at least one detector region configured to detect an optical emission signal from the at least one reaction region.

In some embodiments of these systems, the target waveguide device further comprises:
 at least one optical splitter;
 wherein the at least one optical splitter comprises an optical input and a plurality of optical outputs, wherein the optical input of the at least one optical splitter is optically coupled to the at least one optical coupler; and
 wherein the first end of the optical waveguide is configured to receive the optical excitation signal from the at least one optical coupler, through the optical input of the at least one optical splitter, and through a first optical output of the at least one optical splitter.

More specifically, in some of these systems, the at least one optical splitter comprises from 2 to 512 optical outputs.

In some system embodiments, the at least one optical waveguide comprises a second end; wherein the second end of the at least one optical waveguide is configured to receive the optical excitation signal from the optical source.

In more specific systems, the target waveguide device further comprises:
 at least one optical splitter;
 wherein the at least one optical splitter comprises an optical input and a plurality of optical outputs, wherein the optical input of the at least one optical splitter is optically coupled to the at least one optical coupler; and
 wherein the first end of the at least one optical waveguide is configured to receive the optical excitation signal from a first optical output of the at least one optical splitter, and the second end of the at least one optical waveguide is configured to receive the optical excitation signal from a second optical output of the at least one optical splitter.

In even more specific embodiments, the at least one optical splitter comprises from 2 to 512 optical outputs.

In alternative embodiments, the target waveguide device comprises:
 a first optical coupler and a second optical coupler,
 wherein the first end of the optical waveguide is configured to receive the optical excitation signal from the first optical coupler, and the second end of the optical waveguide is configured to receive the optical excitation signal from the second optical coupler.

According to another aspect, the disclosure provides target waveguide devices, comprising:

at least one optical coupler, the at least one optical coupler configured to receive an optical excitation beam through free space from an optical source;

at least one optical splitter, the at least one optical splitter comprising an optical input and a plurality of optical outputs, wherein the optical input of the optical splitter is optically coupled to the at least one optical coupler;

at least one optical waveguide, the at least one optical waveguide comprising a first end and a second end, wherein the first end of the at least one optical waveguide is configured to receive an optical excitation signal from a first optical output of the at least one optical splitter, and the second end of the at least one optical waveguide is configured to receive the optical excitation signal from a second optical output of the at least one optical splitter;

at least one reaction region, the at least one reaction region optically coupled to the at least one optical waveguide; and at least one detector region, the at least one detector region configured to detect an optical emission signal from the at least one reaction region.

In specific embodiments, the devices comprise a single optical coupler for delivering the optical excitation signal to the first end and the second end of the at least one optical waveguide.

In other specific embodiments, at least one optical splitter comprises from 2 to 512 optical outputs.

In another aspect are provided systems for optical analysis, the systems comprising:

an optical source, the optical source configured to emit an optical excitation beam into free space, and a removable target waveguide device, comprising:

at least one optical coupler, the at least one optical coupler configured to receive the optical excitation beam through free space from the optical source;

at least one optical waveguide, the at least one optical waveguide comprising a first end; wherein the first end of the optical waveguide is configured to receive an optical excitation signal from the at least one optical coupler;

at least one reaction region, the at least one reaction region optically coupled to the at least one waveguide; and at least one detector region, the at least one detector region optically coupled to the at least one reaction region and configured to detect an optical alignment signal from the at least one reaction region;

wherein either the target waveguide device or the optical excitation beam is movable relative to other; and wherein the system is configured to monitor the optical alignment signal and to move either the target waveguide device or the optical excitation beam relative to one another to increase the optical alignment signal.

In some embodiments, the system does not include an alignment camera.

In other embodiments, the system is configured to move either the target waveguide device or the optical excitation beam relative to the other to increase the optical alignment signal to a maximum level.

In yet other embodiments, either the target waveguide device or the optical excitation beam is movable in two dimensions.

In some system embodiments, the at least one detector region is configured to detect both an optical alignment signal and an optical emission signal from the at least one reaction region.

In other system embodiments, the optical excitation beam is configured to project at least a coarse illumination spot and a fine illumination spot on the target waveguide device, and wherein the coarse illumination spot is larger than the fine illumination spot. More specifically, the optical excitation beam is configured to project the coarse illumination spot on the target waveguide device while the target waveguide device or the optical source is moved.

In some system embodiments, the target waveguide device further comprises at least one auxiliary alignment sensor or at least one auxiliary alignment coupler positioned on a surface of the target waveguide device at a distance from the at least one optical coupler. More specifically, the distance is defined using photolithography during manufacture of the target waveguide device, or the at least one auxiliary alignment sensor or the at least one auxiliary alignment coupler is configured for use in a coarse alignment process, or the target waveguide device comprises a plurality of auxiliary alignment sensors or a plurality of auxiliary alignment couplers. Even more specifically, the plurality of auxiliary alignment sensors or the plurality of auxiliary alignment couplers are arranged in a geometric pattern, such as a geometric pattern that includes the at least one optical coupler that is optically coupled to the at least one reaction region.

In some system embodiments, the target waveguide device comprises at least one alignment feature at a defined location on the device, and wherein the location of the alignment feature is stored in a readable format on the device. In other system embodiments, the system comprises at least one optical element positioned between the optical source and the target waveguide device, wherein the at least one optical element modulates the optical excitation beam between the optical source and the target waveguide device, for example wherein the at least one optical element is a lens, a polarizer, a wedge, a filter, a prism, a mirror, or a grating.

In another aspect, the disclosure provides methods for using all of the above systems and devices.

For example, in some embodiments, the disclosure provides methods for alignment of an optical source with a target waveguide device comprising the steps of:

providing a system for optical analysis, the system comprising:

an optical source, the optical source configured to emit an optical excitation beam into free space, and a removable target waveguide device, comprising:

at least one optical coupler, the at least one optical coupler configured to receive the optical excitation beam through free space from the optical source;

at least one optical waveguide, the at least one optical waveguide configured to receive an optical excitation signal from the at least one optical coupler;

at least one reaction region, the at least one reaction region optically coupled to the at least one waveguide; and at least one detector region, the at least one detector region optically coupled to the at least one reaction region and configured to detect an optical alignment signal from the at least one reaction region;

wherein either the target waveguide device or the optical excitation beam is movable relative to one another;

monitoring the optical alignment signal; and moving either the target waveguide device or the optical excitation beam relative to one another to increase the optical alignment signal.

In yet another aspect, the disclosure provides systems for optical analysis, the systems comprising:

an optical source, the optical source configured to emit an optical excitation beam into free space, a removable target waveguide device;

wherein the target waveguide device comprises:

at least one optical coupler, the at least one optical coupler configured to receive the optical excitation beam through free space from the optical source; and at least one optical waveguide, the at least one optical waveguide comprising a first end; wherein the first end of the optical waveguide is configured to receive an optical excitation signal from the at least one optical coupler; and at least two translating lenses positioned between the optical source and the removable target waveguide device; wherein the translating lenses control delivery of the optical excitation beam from the optical source to the target waveguide in multiple directions.

Specifically, in some system embodiments, delivery of the optical excitation beam to the target waveguide device is controlled along a first direction, a second direction, and a first angle.

In some embodiments, the at least two translating lenses comprise a collimator lens and an objective lens, and more specifically, wherein translation of the collimator lens relative to the objective lens modulates delivery of the optical excitation beam to the target waveguide device along a first angle, or wherein translation of the objective lens in a first spatial direction relative to the target waveguide device modulates delivery of the optical excitation beam to the target waveguide device along a first spatial direction.

In some embodiments, translation of the objective lens in a first spatial direction and a second spatial direction relative to the target waveguide device modulates delivery of the optical excitation beam to the target waveguide device along a first spatial direction and a second spatial direction.

In still another aspect are provided systems for optical analysis, the systems comprising:

an optical source, the optical source configured to emit an optical excitation beam into free space, a removable target waveguide device;

wherein the target waveguide device comprises:

at least one optical coupler, the at least one optical coupler configured to receive the optical excitation beam through free space from the optical source; and at least one optical waveguide, the at least one optical waveguide comprising a first end; wherein the first end of the optical waveguide is configured to receive an optical excitation signal from the at least one optical coupler;

a first translating lens positioned between the optical source and the removable target waveguide device; and a first eccentric cam; wherein the first eccentric cam controls the position of the first translating lens in a first direction.

In embodiments, the first eccentric cam is driven by a first stepper motor, more specifically wherein the first stepper motor is stationary.

In other embodiments, the first eccentric cam controls the position of the first translating lens through a first stage attached to the first translating lens, or the first lens has a travel of at most 10 mm, or the first lens has a motion resolution of at least 1 µm.

In some embodiments, the system further comprises a second eccentric cam, wherein the second eccentric cam controls the position of the first translating lens in a second direction, more specifically wherein the second direction is orthogonal to the first direction or wherein the second eccentric cam is driven by a second stepper motor, and even more specifically wherein the second stepper motor is stationary, and in particular, wherein movement of the second eccentric cam does not affect the position of the first translating lens in the first direction. In specific embodiments, the second eccentric cam controls the position of the first translating lens through a second stage attached to the first translating lens.

Some system embodiments further comprise a third eccentric cam, wherein the third eccentric cam controls the position of a second translating lens, and more specifically further comprise a fourth eccentric cam, wherein the fourth eccentric cam controls the position of the second translating lens, in particular, wherein the first translating lens is a collimator lens and the second translating lens is an objective lens.

DETAILED DESCRIPTION OF THE INVENTION

General

Figure 1:
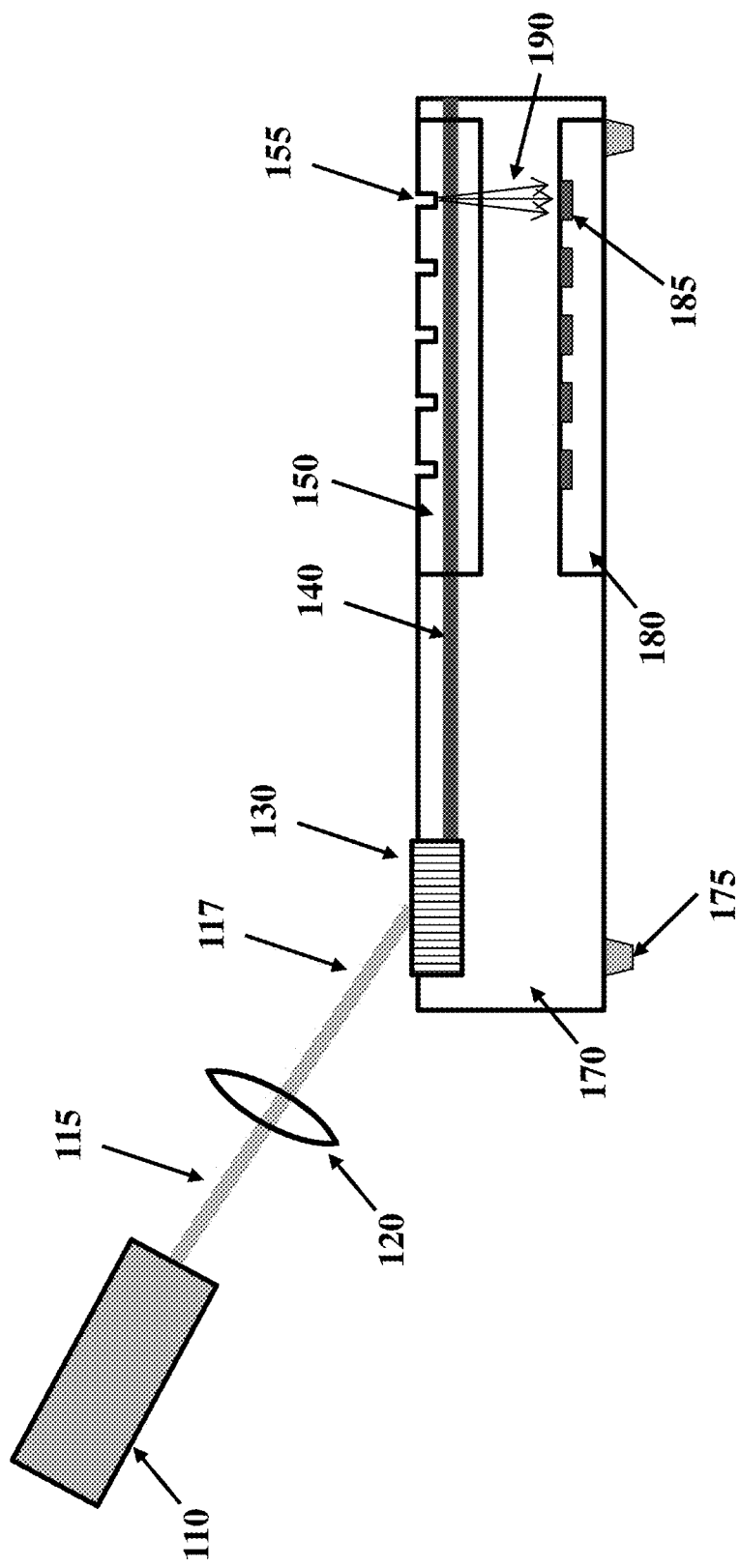
FIG. 1 shows a system, apparatus, or portion of an apparatus comprising an optical waveguide device.

In some aspects, the present disclosure provides systems, devices, and methods for improved fluorescence analysis using waveguide illumination. We have found that some waveguides exhibit a back reflection that is variable over time when illuminated with a laser having a single wavelength. This has been seen, for example, with SiON waveguides illuminated with laser light in the visible wavelength range. This back reflection can be undesirable as it decreases the amount of light delivered by the waveguide. In addition, this back reflection can be undesirable because it can cause other problems such as being transmitted back into the laser, creating instability and laser damage, and temporal and spatial variations of the active area illumination. This variable back reflection has been referred to as link efficiency variation or LEV.

This link efficiency variation problem has been described previously, for example in U.S. Patent Application Publication No. 2016/0216538, which describes a solution for LEV that involves modulating the light illuminating the waveguide over time. It has been found that while time modulation of wavelength can be a solution to the LEV problem, there are some drawbacks. For one, lasers having the capability of wavelength modulation over time can be expensive, and because they may be non-standard for the purposes to which they are being applied, it can take time and effort to obtain lasers that have the all of the desired characteristics, e.g. wavelength and power, and that also have the capability of wavelength modulation over time as described in U.S. Patent Application Publication No. 2016/0216538, which is incorporated herein by reference in its entirety.

The instant inventors were looking to solve the LEV problem without having to use an optical source with a time-modulated wavelength. The instant inventors have discovered that LEV can be reduced or eliminated by other methods, for example by illuminating waveguides with an optical source that exhibits multiple longitudinal modes within a narrow wavelength range. The inventors have also discovered that the use of an optical source with multiple longitudinal modes enables the use of a single optical source in a target device with a waveguide illuminated by counterpropagated optical beams with minimal effect on system performance.

While not being bound by theory, it is believed that LEV can be caused by the formation within the waveguide of a Bragg grating by the illumination light. That is, the illumination light from a laser with a single wavelength "writes" a grating into the waveguide at a spacing corresponding to the wavelength of the light. The grating with this spacing will then cause the backward reflection of some of the light passing through the waveguide. In some cases, the backward reflected light is believed to further intensify the grating, resulting in even more back reflected light. In addition, evidence has been seen that a grating which is "written" into the waveguide as described above can be erased by exposure to illumination light at a different wavelength than the wavelength at which it was formed.

It has been found that, in general, LEV is more prevalent with lower wavelength light (having higher energy photons) and is more prevalent at higher laser power in the waveguide. It has also been found that LEV can be reduced, and in some cases, effectively eliminated by illuminating with a laser having the appropriate characteristics as described herein, including the output of multiple longitudinal modes.

While not bound by theory, it is believed that by providing illumination light having multiple longitudinal modes, the formation of a Bragg grating in a waveguide by one mode can be suppressed by the presence of the other modes having slightly different wavelengths. That is, on its own, each longitudinal mode would tend to write a Bragg grating which would result in LEV and back reflection. However, the presence of another longitudinal mode separated in wavelength by a relatively small amount will tend to suppress the development of the Bragg grating by the other longitudinal mode. In some cases, LEV for visible light can be reduced by having even two longitudinal modes separated by 10 pm or more. Having more than 2 modes can, in some cases, provide even larger reductions in LEV. In some cases, 4 or more longitudinal modes are present, in some cases 8 or more longitudinal modes are present, in some cases greater than 20 longitudinal modes are present. In some cases, between 2 and 500 longitudinal modes are present. For example, the number of longitudinal modes can be at least 2, at least 3, at least 5, at least 10, at least 15, at least 20, at least 30, at least 50, or even more.

With respect to the suppression of LEV, any suitable number of longitudinal modes can be used. However, where the number of longitudinal modes results in a range of illumination wavelengths that is too wide, there can be other deleterious effects on the system. For example, where light is launched into a target waveguide, such as a waveguide on a target analytical device, via a coupler, that coupler typically is designed to launch a specific range of wavelengths of light into the waveguide. If the range of wavelengths of the light entering the coupler from free space is too wide, some wavelengths will not be efficiently coupled into the waveguide, thus reducing the efficiency of the system. For example, some light couplers will accept light within a wavelength range of one nanometer without significant loss of light, but if the range of wavelengths is 20 nm or greater, there can be significant losses. While for some applications such a loss of light may not affect the overall performance of the optical system, minimizing optical losses is generally desirable. The instant inventors have found that by keeping the range of wavelengths of the longitudinal modes below approximately 20 nm, the LEV can be significantly reduced or even eliminated, while retaining acceptable efficiency of light coupling. The range of wavelengths chosen can depend on aspects of the system, including the design of the coupler. In some cases, the range of wavelengths of the longitudinal modes is below approximately 10 nm, in some cases the range of wavelengths of the longitudinal modes is below approximately 5 nm, in some cases the range of wavelengths of the longitudinal modes is below approximately 2 nm, in some cases, the range of wavelengths of the longitudinal modes is below approximately 1 nm, or even lower.

While the optical sources, for example laser or laser diode sources, of the instant disclosure preferably have multiple longitudinal modes, the optical sources also typically have substantially a single transverse mode. In other words, the optical source provides a Gaussian beam with only the lowest-order, fundamental mode (i.e., $TEM_{00}$). Such sources are preferred, since the waveguides typically used in the fluorescence analysis systems of the disclosure are designed to carry a single spatial mode. For these single-mode waveguides, light that reaches the coupler in other spatial modes will not couple into the waveguide, or will quickly dissipate in the waveguide, as the waveguide will not support their transmission. In some cases, the optical source of the instant disclosure will emit more than one transverse mode, and a loss in efficiency will accordingly need to be tolerated. However, it has been found that it is desirable to have an optical source that emits a significant amount of light in only one mode, typically the mode referred to as the gaussian or fundamental mode. In some cases, greater than 10% of the intensity of the light is in a single transverse mode, in some cases greater than 50% of the intensity of the light is in a single transverse mode, in some cases greater than 80% of the intensity of the light is in a single transverse mode.

Because the LEV back reflection tends to increase with time, for a given application, the extent to which LEV needs to be controlled can depend on the duration of the measurements. For example, with single molecule nucleic acid sequencing, the illumination typically extends for greater than 10 minutes, and in some cases, the illumination extends for hours, e.g. in some cases 10 hours or more. Within the teachings of this disclosure, the parameters of the optical source, for example a laser source, can be adjusted to attain the needed LEV suppression with the desired performance. For example, the number of longitudinal modes and the spacing between the modes can be set by one of skill in the art for optimum overall performance.

The approaches described herein can be used with any suitable waveguide that is susceptible to this time-dependent back reflection phenomenon. The instant approaches can be used for instance, with target waveguide devices used for analysis in which the waveguides provide illumination light to reaction regions or wells for fluorescence measurements of samples within the reaction regions or wells.

While described herein in the context of fluorescent analysis systems, the disclosed systems and approaches can be useful in improving the effectiveness of any type of device that carries optical energy via waveguides. It can be particularly useful for devices that contain waveguides that transmit light in the visible range, for example, that transmit light from about 450 nm to about 700 nm. It can be useful for waveguides fabricated on semiconductor chips, such as silicon chips, and in particular such waveguides having a SiON core. Examples are analytical devices that measure levels of fluorescence for which the waveguides provide excitation illumination in the visible range, and planar light circuit (PLC) devices used in the visible range.

FIG. 1 shows a system or apparatus, or portion of a system or apparatus, of relevance to the instant disclosure. A laser or laser system 110, serving as the optical source, emits illumination light 115, also referred to as an optical excitation signal or optical excitation beam, into free space. The laser 110 as represented in this figure can in some cases emit light 115 directly into free space. In other cases, the laser 110 includes other optical elements through which the light travels prior to being emitted into free space. For example, the other optical elements included with the laser can include an optical fiber, a PLC, or a combination of both prior to emission of the illumination light 115 into free space. In some cases, the illumination light emitted from the laser is sent directly to a target, for example a target device 170. Typically, the illumination light 115 will pass through one or more optical elements 120 which are used to shape, steer, or otherwise control the properties of the illumination light prior to reaching the target. The illumination light that has been shaped 117 by the one or more optical elements 120 is coupled into waveguide 140. The light is transmitted through waveguide 140 to an area of interest 150 on the target device. Typically, and as shown here, a coupler 130, such as a grating coupler, is used to launch the illumination light into the waveguide. While a grating coupler is shown, it is to be understood that any type of coupler, prism, or other interface optical element or method, including, for example, direct butt-coupling, can be used to direct an optical excitation signal from an optical source into the waveguide.

The area of interest 150 has a plurality of reaction regions 155, for example nanowells or zero mode waveguides (ZMWs). The waveguide 140 typically extends underneath the reaction regions 155, thereby illuminating the reaction regions from below with evanescent wave illumination. The reaction regions preferably contain fluorescent reactants, which, when excited by the evanescent wave illumination, emit fluorescent light 190, which can be detected in order to carry out the desired analysis (e.g., nucleic acid sequencing). In some cases, and as shown here, the target device also has an integrated sensor 180. The emitted fluorescent light from the reaction regions passes down through the device to be detected at a single pixel or group of pixels 185. Such integrated target devices for fluorescence analysis are described, for example in U.S. Patent Publication Nos. 2008/0128627, 2012/0085894, 2016/0334334, 2016/0363728, 2016/0273034, 2016/0061740, and 2017/0145498 which are incorporated herein by reference in their entireties. Target devices that include integrated sensors typically include electrical outputs 175. For example, the integrated sensor detects and processes an optical emission signal, and then sends electronic data related to the detected signals out of the device through the electrical output or outputs. The electrical outputs can, for example, be bond pads on a silicon chip, which are typically wire bonded to a chip package, and the chip package will have electronic outputs for passing on the electronic signals from the chip. The electronic signals are typically sent to a computer (not shown), which processes the received signals to perform the desired analysis.

It is typically desired that the waveguide, for example waveguide 140 in FIG. 1, will have high levels of light transmission, that is, low levels of light loss as the waveguide transmits the light to a region of interest. As described above, it has been found in some cases that one or more waveguides within a target device will under some conditions exhibit a time-dependent back reflection when continuously illuminated with light of a single wavelength from the laser. It has been seen that this back reflection can be significant, in some cases resulting in greater than 90% loss of the light. Even when the light loss is not as great as this, the back reflection can be a problem, both in terms of raising the requirement for illumination power for a given level of delivered light, and in terms of deleterious effects of the re-directed light. For example, LEV can cause temporal and spatial variations in illumination which make it difficult to reliably detect a fluorescent signal from a reactive region illuminated by the waveguide. In some cases, link efficiency variation may result from coupling to radiation modes without back reflection.

As described above, it has usefully been discovered by the instant inventors that the back reflection in the waveguide can be reduced or eliminated through the use of illumination light from an optical source where the illumination light comprises multiple longitudinal modes within a narrow wavelength range. By way of background, it is understood that it can be useful to use waveguides on a target device that are single mode waveguides. Typically, where such single mode waveguides are used, the light introduced into these waveguides is from a laser having a single longitudinal mode (i.e., a single wavelength). The instant inventors have discovered that transmission of light through single mode waveguides can be improved by using an optical source having multiple longitudinal modes. While the presence of multiple longitudinal modes can be problematic in certain applications, in the case of fluorescence analysis systems, the inventors have found that using illumination light having multiple longitudinal modes can be done without a significant degradation in performance, because the excitation spectra of fluorescent labels typically span a relatively large wavelength range, and thus, a range of illumination wavelengths on the order of 20 nm or more can be used without a significant decrease in excitation of the fluorescent label. In addition, the emission spectra of fluorescent labels are typically relatively insensitive to the wavelength of the illumination light, so a spread of illumination wavelengths as described in this disclosure does not create any new issues with respect to detection of the emitted fluorescent light.

The waveguide on the target device can be any suitable waveguide including a fiber, a planar waveguide, or a channel waveguide. Typically channel waveguides are used. The waveguide is preferably a single mode waveguide, but it can be a multi-mode waveguide for some applications.

In FIG. 1, the waveguide 140 is shown as being on a target device, which can be a semiconductor chip, for example, a silicon chip. Particular systems of interest with respect to the invention are SiON waveguides, for example those formed on silicon chips. The SiON waveguide will have a core of SiON, and is typically surrounded by a cladding material of lower refractive index such as silicon dioxide ($SiO_2$). As is known in the art, SiON can be formed in a deposition process, and the ratio of the elements can be adjusted to control the optical properties of the waveguide. For example, the ratio of oxygen to nitrogen can be varied in order to change the refractive index of the film. For the SiON waveguides of the invention, the composition is often controlled to have a refractive index greater than about 1.6, greater than about 1.7, or greater than about 1.8. The refractive index can be measured, for example, at the sodium D line.

Figure 2:
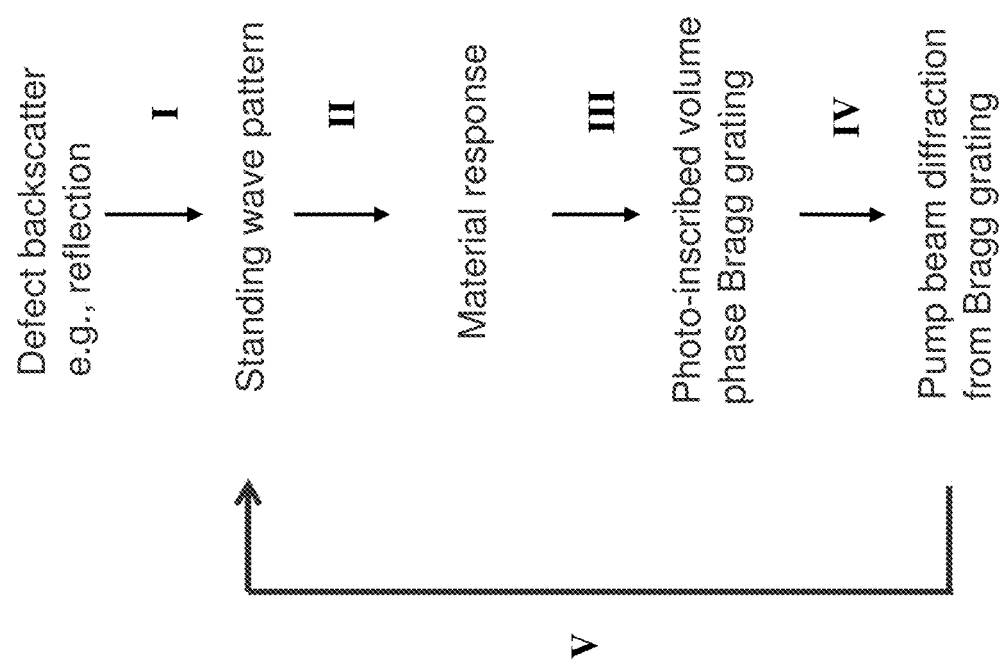
FIG. 2 shows a flow chart outlining a proposed mechanism for time-dependent back reflection.

FIG. 2 shows a flow chart outlining a proposed mechanism for the observed time-dependent back reflection or LEV. Without intending to be bound by theory, it is believed that a standing wave pattern is formed within the waveguide (step I). The standing wave pattern can be formed, for example, by backscatter from a defect or reflection from a portion of the waveguide routing pattern such as an exit facet. In step II there is a material response such as a 2-photon absorption that affects UV color centers. The UV absorption change can then result in a change in the refractive index at the illumination wavelength. The material response produces in a change in refractive index, which results in a photo-inscribed volume phase Bragg grating (step III). The Bragg grating can cause even more of the light to be sent back by reflection (step IV). The increased backward traveling light intensifies the standing wave pattern (step V). As can be seen, this step feeds back on itself, in a manner in which the initial grating can become more and more effective, sending back a higher and higher proportion of the light. This possible mechanism is consistent with the time-dependent back reflections that have been observed experimentally in such a system.

An understanding of the above mechanism provided for the instant inventors' insight into how this LEV problem might be solved by illumination with multiple, closely-spaced, longitudinal modes to prevent the buildup of a reflection grating. Imagine, as a starting point, a laser having a single longitudinal mode. As described herein, one or more neighboring longitudinal modes, each having a different wavelength relatively close to the first wavelength, is added. The added longitudinal modes each have a slightly different wavelength, and therefore these modes will not combine with the first mode to write the same grating, and to the extent each mode alone would create a grating, each mode tends to erase the grating of the other nearby modes. In addition to this, the formation of Bragg gratings in the waveguides, as described herein, has been observed to be dependent on the power of the optical source. When an optical excitation beam is provided in multiple longitudinal modes, the power of the optical signal is divided up. Dividing the power of the optical excitation signal results in each of the modes having a lower power than if all the energy was in a single mode, and therefore each mode is less likely to write a grating in the first place. In some cases, the grating effect on power is greater than linear. For example, regimes have been observed in which the LEV appears to be dependent on the square of the power. In regimes such as this, it can be seen that by dividing the power into multiple modes, the formation of Bragg gratings can be significantly reduced. For example, in this regime, going from one longitudinal mode to four longitudinal modes (e.g. each mode spaced by 30 pm, but each mode with substantially the same intensity) each of the modes is now 16 times less likely to form a grating than if the power was all in a single longitudinal mode.

Waveguide-Addressed Analytical Systems

In some aspects the present disclosure is directed to improved systems, devices and methods for performing analytical operations, and particularly optical analysis of chemical, biochemical, and biological reactions for use in chemical, biological, medical, and other research and diagnostic applications. The systems, devices, and methods of the disclosure are particularly well suited for application in integrated analytical components, e.g., where multiple functional components of the overall analysis system are co-integrated within a single modular component. However, as will be clear upon reading the following disclosure, a number of aspects of the invention will have broad utility outside of such integrated devices and systems.

In general, the optical analyses that are subject of the present disclosure seek to gather and detect one or more optical emission signals from a reaction of interest, the appearance or disappearance of which, or localization of which, is indicative of a given chemical or biological reaction and/or the presence or absence of a given substance within a sample material. In some cases, the reactants, their products, or other substance of interest (all of which are referred to as reactants herein) inherently present an optically detectable signal which can be detected. In other cases, reactants are provided with exogenous labeling groups to facilitate their detection.

Nucleic Acid Sequencing

As is understood by those of ordinary skill in the art, fluorescently labeled nucleotides are used in a wide variety of different nucleic acid sequencing analyses. For example, in some cases such labels are used to monitor the polymerase-mediated, template-dependent incorporation of nucleotides in a primer extension reaction. In particular, a labeled nucleotide can be introduced to a primer template polymerase complex, and incorporation of the labeled nucleotide into the primer can be detected. If a particular type of nucleotide is incorporated at a given position, it is indicative of the underlying and complementary nucleotide in the sequence of the template molecule. In traditional Sanger sequencing processes, the detection of incorporated labeled nucleotides utilizes a termination reaction, where the labeled nucleotides carry a terminating group that blocks further extension of the primer. By mixing the labeled terminated nucleotides with unlabeled native nucleotides, nested sets of fragments are generated that terminate at different nucleotides. These fragments can then be separated by capillary electrophoresis, or other suitable technique, to distinguish those fragments that differ by a single nucleotide, and the labels for the fragments can be read in order of increasing fragment size to provide the sequence of the fragment (as indicated by the last added, labeled terminated nucleotide). By providing a different fluorescent label on each of the types of nucleotides that are added, the different nucleotides in the sequence can readily be differentiated (see, e.g., U.S. Pat. No. 5,821,058, which is incorporated herein by reference in its entirety for all purposes).

In some sequencing technologies, arrays of primer-template complexes are immobilized on surfaces of substrates such that individual molecules or individual and homogeneous groups of molecules (clonal populations) are spatially discrete from other individual molecules or groups of molecules, respectively. Labeled nucleotides are added in a manner that results in a single nucleotide being added to each individual molecule or group of molecules. Following the addition of the nucleotide, the labeled addition is detected and identified.

In some cases, the sequencing analyses utilize the addition of a single type of nucleotide at a time, followed by a washing step. The labeled nucleotides that are added are then detected, their labels removed, and the process repeated with a different nucleotide type. Sequences of individual template sequences are determined by the order of appearance of the labels at given locations on the substrate.

In other similar cases, the immobilized complexes are contacted with all four types of labeled nucleotides, where each type of nucleotide bears a distinguishable fluorescent label and a terminator group that prevents the addition of more than one nucleotide in a given step. Following the single incorporation in each individual template sequence (or group of template sequences), the unbound nucleotides are washed away, and the immobilized complexes are scanned to identify which nucleotide was added at each location. Repeating the process yields sequence information of each of the template sequences. In other cases, more than four types of labeled nucleotides are utilized.

In particularly elegant approaches, labeled nucleotides detected during the incorporation process itself, in real time, by individual molecular complexes. Such methods are described, for example, in U.S. Pat. No. 7,056,661, which is incorporated herein by reference in its entirety for all purposes. In these processes, nucleotides are labeled on a terminal phosphate group that is released during the incorporation process, so as to avoid the accumulation of labels on the extension product, and accordingly to avoid any need for label removal processes that can potentially be deleterious to the complexes. Primer/template polymerase complexes are observed during the polymerization process, and nucleotides being added are detected by virtue of their associated labels. In one particular aspect, labeled nucleotides are observed using an optically confined structure, such as a zero mode waveguide (See, e.g., U.S. Pat. No. 6,917,726, which is incorporated herein by reference in its entirety for all purposes) that limits exposure of the excitation radiation to the volume immediately surrounding an individual primer/template polymerase complex. As a result, only labeled nucleotides that are retained by the polymerase during the process of being incorporated are exposed to excitation illumination for a time that is sufficient to generate fluorescence and thus to identify the incorporated nucleotide. In another approach, the label on the nucleotide is configured to interact with a complementary group on or near the complex, e.g., attached to the polymerase, where the interaction provides a unique signal. For example, a polymerase may be provided with a donor fluorophore that is excited at a first wavelength and emits at a second wavelength, while the nucleotide to be added is labeled with a fluorophore that is excited at the second wavelength, but emits at a third wavelength (See, e.g., U.S. Pat. No. 7,056,661, previously incorporated herein). As a result, when the nucleotide and polymerase are sufficiently proximal to each other to permit energy transfer from the donor fluorophore to the label on the nucleotide, a distinctive signal is produced. Again, in these cases, the various types of nucleotides are provided with distinctive fluorescent labels that permit their identification by the spectroscopic or other optical signature of their labels.

In the various exemplary processes described above, detection of a signal event from a reaction region is indicative that a reaction has occurred. Further, with respect to many of the above processes, identification of the nature of the reaction, e.g., which nucleotide was added in a primer extension reaction at a given time or that is complementary to a given position in a template molecule, is also achieved by distinguishing the spectroscopic characteristics of the signal event.

The optical paths of the overall systems of the disclosure serve one or more roles of delivering excitation radiation to the reaction region, e.g., to excite fluorescently-labeled molecules that then emit the relevant optical emission signal, conveying the optical signal emitted from the reaction region to the detector, and, for multispectral signals, i.e., multiple signals that may be distinguished by their emission spectrum, separating those signals so that they may be differentially detected, e.g., by directing different signals to different detectors or different regions on the same detector array. The differentially detected signals are then correlated with both the occurrence of the reaction, e.g., a nucleotide was added at a given position, and the determination of the nature of the reaction, e.g., the added nucleotide is identified as a particular nucleotide type, such as adenosine.

In conventional, fully free space, analytical systems used for nucleic acid sequencing, the optical trains used to deliver excitation light to the reaction regions, and to convey optical signals from the reaction regions to the detector(s) can impart size, complexity, and cost aspects to the overall system that would preferably be reduced. For example, such optical trains may include collections of lenses, dispersion elements, beam splitters, beam expanders, collimators, spatial and spectral filters and dichroics, that are all assembled to deliver targeted and uniform illumination profiles to the different reactions regions. In large scale systems, these components must be fabricated, assembled, and adjusted to ensure proper alignment, focus, and isolation from other light and vibration sources to optimize the transmission of excitation light to the reaction regions. As the number of addressed reaction regions, or the sensitivity of the system to variations in excitation light intensity is increased, addressing these and other issues becomes more important, and again typically involves the inclusion of additional componentry to the optical train, e.g., alignment and focusing mechanisms, isolation structures, and the like.

With respect to the collection and detection of optical emission signals, conventional systems typically employ optical trains that gather emitted optical signals from the reaction region, e.g., through an objective lens system, transmit the various different signals through one or more filter levels, typically configured from one or more dichroic mirrors that differentially transmit and reflect light of different wavelengths, in order to direct spectrally different optical signals to different detectors or regions on a given detector. These separated optical signals are then detected and used to identify the nature of the reaction that gave rise to such signals. As will be appreciated, the use of such differential direction optics imparts substantial space, size, and cost requirements on the overall system, in the form of multiple detectors, multiple lens and filter systems, and in many cases complex alignment and correlation issues. Many of these difficulties are further accentuated where the optical trains share one or more sub-paths with the excitation illumination, as signal processing will include the further requirement of separating out background excitation illumination from each of the detected signals.

Again, as with the excitation optical train, above, as the sensitivity and multiplex of the system is increased, it increases the issues that must be addressed in these systems, adding to the complexity of already complex optical systems. Further, the greater the number of optical components in the optical train, the greater the risk of introducing unwanted perturbations into that train and the resulting ability to detect signal. For example, optical aberrations in optical elements yield additional difficulties in signal detection, as do optical elements that may inject some level of autofluorescence into the optical train, which then must be distinguished from the signaling events.

In some embodiments, the systems of the instant disclosure further comprise a computer that receives at least one electronic signal from a detector, or region of a detector, for example the detected signals described above, and analyzes the at least one electronic signal. More specifically, the analysis performed by the computer can comprise obtaining nucleic acid sequencing information from the electronic signal, as would be understood by those of ordinary skill in the art.

Counterpropagating Waveguide Illumination

In addition to decreasing LEV, the instant inventors have also usefully discovered that the use of an optical source having multiple longitudinal modes enables the illumination of a target waveguide from two ends of the waveguide using a single optical source without a significant degradation in illumination due to light interference. By way of background, it can in some cases be desirable to illuminate a waveguide that extends across a number of reaction regions from both ends of the waveguide. This is done, for example, to improve the consistency of illumination across the reaction regions or wells. Specifically, for a typical waveguide, there is some loss of light intensity as the light travels down the waveguide. This loss of intensity results in a lower level of illumination for reaction regions at the far end of the waveguide as compared to the levels of illumination for reaction regions at the end of the waveguide into which the light was launched. The loss of intensity can be improved by illuminating the waveguide from both ends. However, when a waveguide is illuminated at both ends with light from one laser having a single longitudinal mode, there can be interference between the two illumination trains, which can be deleterious to an optical analysis due to temporal and spatial variations in the illumination. The instant inventors have found that the optical sources described herein (e.g., lasers having multiple longitudinal modes in a relatively narrow wavelength range) can be used for this two-end illumination with significantly less interference. This approach allows for two-end illumination using a single optical source, such as a single laser, rather than resorting to a solution that requires the use of two optical sources with slightly different wavelengths, one for each waveguide end.

The optimum number of longitudinal modes for reducing or eliminating interference in two-end illumination can in some cases be different than the optimum number of longitudinal modes for reducing or eliminating LEV. In particular, for reducing or eliminating interference it is typically desired that the illuminating laser have at least 8 longitudinal modes. The longitudinal modes are separated by at least 10 pm, and the intensity of the weakest mode is 20% or more the intensity of the strongest mode. In some cases, the intensity of the weakest mode is 50% or more the intensity of the strongest mode. Determination of the optimum number of longitudinal modes, the separation of the modes, and the intensity of each mode is understood by those of ordinary skill in the art. See, e.g., Saleh and Teich (1991) *Fundamentals of Photonics,* ch. 10, John Wiley & Sons, Inc., which describes temporal coherence functions of use in such calculations.

In order to use the counterpropagation approach, light from the optical source is typically split into a plurality of light beams that each are sent to a corresponding plurality of couplers on the chip, each coupler launching light into a corresponding plurality of waveguides. For a given pair of couplers, one coupler injects light into a waveguide that is routed to illuminate one end of an illumination waveguide, and the other coupler injects light into a waveguide that is routed to illuminate the other end of the illumination waveguide. See, e.g., FIG. 8B, below. In other cases, illumination light from a single coupler is routed within the chip such that both ends of the illumination waveguide are illuminated. Such routing can be achieved using, for example, an optical splitter associated with the input coupler and dividing the light within the splitter into two or more outputs for delivery to the respective ends of the waveguides. (See also below for more details.)

Integrated Devices

Some of the devices and methods of the instant disclosure are integrated within small-scale analytical devices that optionally also include one or more reaction regions, fluidic components, and excitation illumination paths and optionally excitation illumination sources. Integration of some or all of above described components into a single, miniaturized analytical device addresses many of the problems facing larger, non-integrated analytical systems, such as size, cost, weight, inefficiencies associated with long path or free space optics, and the like. For example, highly multiplexed analytical systems comprising integrated waveguides for the illumination of nanoscale samples are described in U.S. Patent Publication Nos. 2008/0128627, 2012/0085894, 2016/0334334, 2016/0363728, 2016/0273034, 2016/0061740, and 2017/0145498 which are incorporated herein by reference in their entireties. Further optical systems for the analysis of nanoscale samples, including the illumination and detection of such samples, are described in U.S. Patent Publication Nos. 2012/0014837, 2012/0021525, and 2012/0019828 which are incorporated herein by reference in their entireties. Additional nanoscale illuminations systems for highly multiplexed analysis are described in U.S. Patent Publication Nos. 2014/0199016 and 2014/0287964 which are incorporated herein by reference in their entireties.

Other examples of such integrated systems are described, for example, in U.S. Patent Application Publication Nos. 2012/0014837, 2012/0019828, and 2012/0021525 the contents of which are incorporated herein by reference in their entireties. By integrating the detection elements with the reaction regions, either directly or as a coupled part, the need for many of the various components required for free space optics systems, such as much of the conveying optics, lenses, mirrors, and the like, can be eliminated. Other optical components, such as various alignment functionalities, can also be eliminated, as alignment is achieved through the direct integration of the detection elements with the reaction regions. The systems, devices, and methods of the present disclosure further improve the benefits afforded by such devices by simplifying, to a greater extent, the optical components of the analytical devices, further reducing the cost and complexity of such devices, and improving available signal in the process.

The analytical systems in accordance with the present disclosure employ one or more analytical devices. In an exemplary embodiment, the system includes an array of analytical devices formed as a single integrated device. The exemplary array is configured for single use as a consumable. In various embodiments, the integrated device includes other components including, but not limited to local fluidics, electrical connections, a power source, illumination elements, a detector, logic, and a processing circuit. Each analytical device or array is configured for performing an analytical operation as described above.

Figure 3:
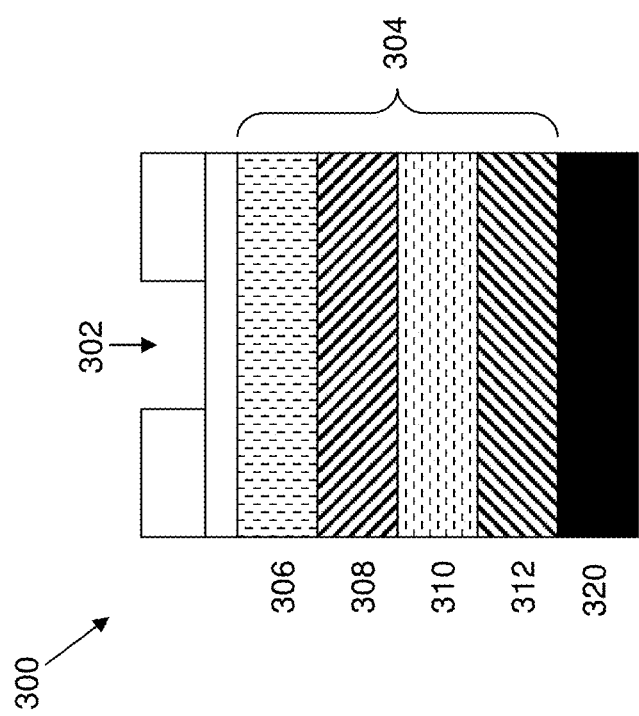
FIG. 3 shows a block diagram of an integrated analytical device.

While the components of each device and the configuration of the devices in the system can vary, each analytical device within the system can comprise, at least in part, the general structure shown as a block diagram in FIG. 3. As shown, an analytical device 300 typically includes a reaction cell 302, in which the reactants are disposed and from which the optical emission signals emanate. "Reaction cell" is to be understood as generally used in the analytical and chemical arts and refers to the location where the reaction of interest is occurring. Thus, "reaction cell" can include a fully self-contained reaction well, vessel, flow cell, chamber, or the like, e.g., enclosed by one or more structural barriers, walls, lids, and the like, or it can comprise a particular region on a substrate and/or within a given reaction well, vessel, flow cell or the like, e.g., without structural confinement or containment between adjacent reaction cells. The reaction cell can include structural elements to enhance the reaction or its analysis, such as optical confinement structures, nanowells, posts, surface treatments, such as hydrophobic or hydrophilic regions, binding regions, or the like.

In various respects, "analytical device" refers to a reaction cell and associated components that are functionally connected. In various respects, "analytical system" refers to one or more associated analytical devices and associated components. In various respects, "analytical system" refers to the larger system including the analytical system and other instruments for performing an analysis operation. For example, in some cases, the analytical devices of the invention are part of an analytical instrument or analytical system. The analytical device can be removably coupled into the instrument. Reagents can be brought into contact with the analytical device before or after the analytical device is coupled with the system. The system can provide electrical signals and/or illumination light to the analytical device, and can receive electrical signals from the detectors in the analytical device. The instrument or system can have computers to manipulate, store, and analyze the data from the device. For example, the instrument can have the capability of identifying the order of added nucleotide analogs in a nucleic acid sequencing reaction. The identification can be carried out, for example, as described in U.S. Pat. No. 8,182,993, which is incorporated herein by reference for all purposes.

In some cases, one or more reactants involved in the reaction of interest can be immobilized, entrained or otherwise localized within a given reaction cell. A wide variety of techniques are available for localization and/or immobilization of reactants, including surface immobilization through covalent or non-covalent attachment, bead or particle based immobilization, followed by localization of the bead or particle, entrainment in a matrix at a given location, and the like. Reaction cells can include ensembles of molecules, such as solutions, or patches of molecules, or they can include individual molecular reaction complexes, e.g., one molecule of each molecule involved in the reaction of interest as a complex. Similarly, the overall devices and systems of the invention can include individual reaction cells or can comprise collections, arrays, or other groupings of reaction cells in an integrated structure, e.g., a multiwall or multi-cell plate, chip, substrate, or system. Some examples of such arrayed reaction cells include nucleic acid array chips, e.g., GeneChip® arrays (Affymetrix, Inc.), zero mode waveguide arrays (as described elsewhere herein), microwell and nanowell plates, multichannel microfluidic devices, e.g., LabChip® devices (Caliper Life Sciences, Inc.), and any of a variety of other reaction cells. In various respects, the "reaction cell", sequencing layer, and zero mode waveguides are similar to those described in U.S. Pat. No. 7,486,865, the entire contents of which is incorporated herein by reference for all purposes. In some cases, these arrayed devices can share optical components within a single integrated overall device, e.g., a single waveguide layer to deliver excitation light to each reaction region. Approaches to illuminating analytical devices with waveguides are provided in U.S. Pat. Nos. 8,207,509 and 8,274,040, which are each incorporated herein by reference for all purposes.

Although an analytical system may include an array of analytical devices having a single waveguide layer and reaction cell layer, it can be appreciated that a wide variety of layer compositions can be employed in the waveguide array substrate and cladding/reaction cell layer while still achieving the goals of the invention (see, e.g., U.S. Pat. No. 7,820,983, incorporated herein by reference for all purposes).

The analysis system typically includes one or more analytical devices 300 as illustrated in FIG. 3 having a detector element 320, which is disposed in optical communication with the reaction cell 302. Optical communication between the reaction cell 302 and the detector element 320 can be provided by an optical train 304 comprised of one or more optical elements generally designated 306, 308, 310 and 312 for efficiently directing the signal from the reaction cell 302 to the detector 320. These optical elements can generally comprise any number of elements, such as lenses, filters, gratings, mirrors, prisms, refractive material, or the like, or various combinations of these, depending upon the specifics of the application. In addition to components for directing the optical emission signal from the reaction region to the detector, the chip can also have optical components for delivering illumination light to the reaction regions for performing fluorescent measurements.

In various embodiments, the reaction cell 302 and detector element 320 are provided along with one or more optical elements in an integrated device structure. By integrating these elements into a single device architecture, the efficiency of the optical coupling between the reaction cell and the detector can be improved. As used herein, the term integrated, when referring to different components of an analytical device typically refers to two or more components that are coupled to each other so as to be immobile relative to each other. As such, integrated components can be irreversibly or permanently integrated, meaning that separation would damage or destroy one or both elements, or they can be removably integrated, where one component can be detached from the other component, provided that when they are integrated, they are maintained substantially immobile relative to one another. In some cases, the components are integrated together, for example as a single fabricated device, such as in a single silicon chip. In some cases, the detector portion is part of a separate instrument, and the reaction cell component is part of a detachable device, such as a detachable chip. In the case where the reaction cell component is in a chip separate from the detector component, optical element components for directing the optical emission signal from the reaction cell to the detector can be in either the reaction cell component, in the detector component, or a combination in which some components are in the reaction cell component and others are in the detector component.

For the devices, methods, and systems of the disclosure, even where the detector is part of an instrument and separate from the reaction cell component, the reaction cell component will typically be placed directly onto the detector with a minimal open space between the reaction cell component and the detector component. In some cases, the space between the reaction cell component and the detector component will be less than 1 micron, less than 10 microns, less than 100 microns, or less than a millimeter.

The reaction cell component will typically have alignment structures to allow for the precise alignment of the reaction cells with the portions of the detector to which they correspond.

Where the reaction cell component, optical components, and detector are irreversibly or permanently integrated into a single integrated device, such a device can be produced by fabrication in a monolithic form, or two or more of the components can be manufactured separately and connected together to form the single device. The connection between the separate components can be accomplished by any suitable method, including adhesion and wafer bonding.

The choice of whether to have all of the components integrated into a single device or to have the detector component separately associated with the instrument can be made depending on the application. A permanently integrated device approach has the advantage that the detector can be manufactured in intimate contact with the reaction cell and other components under controlled conditions allowing for precise registration. The approach in which the detector is not integrated into the reaction cell chip, but is part of the instrument has the advantage that the detector can be used over and over again with different reaction cell components.

In conventional optical analysis systems, discrete reaction vessels are typically placed into optical instruments that utilize only free-space optics to convey the optical signals to and from the reaction vessel and to the detector. These free space optics tend to include higher mass and volume components, and have free space interfaces that contribute to a number of weaknesses for such systems. For example, such systems have a propensity for greater losses of light given the introduction of unwanted leakage paths from these higher mass components. They also typically introduce higher levels of auto-fluorescence. All of these inherent weaknesses reduce the signal-to-noise ratio (SNR) of the system and reduce its overall sensitivity, which, in turn can impact the speed and throughput of the system. Additionally, in multiplexed applications, signals from multiple reaction regions (i.e., multiple reaction cells, or multiple reaction locations within individual cells), are typically passed through a common optical train, or common portions of an optical train, using the full volume of the optical elements in that train to be imaged onto the detector plane. As a result, the presence of optical aberrations in these optical components, such as diffraction, scattering, astigmatism, and coma, degrade the signal in both amplitude and across the field of view, resulting in greater noise contributions and cross talk among detected signals.

The analytical systems and devices in accordance with the present disclosure typically include a reaction region, vessel or zone that is either physically integrated with a detection component or sensor, or provided sufficiently proximal and in sensory communication with the detection component or sensor to improve performance.

In some cases, the reaction region comprises a nanoscale well, for example, a nanoscale well having no linear dimension of greater than 500 nm. A nanoscale well of the systems and devices of the disclosure can, for example, be cylindrical with a base diameter between about 50 nm and 200 nm. The depth of the well can, for example, be from about 50 nm to about 400 nm. In some cases, the reaction regions can comprise zero mode waveguides (ZMWs). Zero mode waveguides are described, for example in U.S. Pat. Nos. 7,170,050, 7,486,865, and 8,501,406 which are each incorporated herein by reference in their entireties.

Such devices have sought to take advantage of the proximity of the reaction region or vessel in which signal producing reactions are occurring, to the detector or detector element(s) that sense those signals, in order to take advantage of benefits presented by that proximity. As alluded to above, such benefits include the reduction of size, weight, and complexity of the optical train, and as a result, increase the potential multiplex of a system, e.g., the number of different reaction regions that can be integrated and detected in a single system. Additionally, such proximity potentially provides benefits of reduced losses during signal transmission, reduced signal cross-talk from neighboring reaction regions, and reduced costs of overall systems that utilize such integrated devices, as compared to systems that utilize large free space optics and multiple cameras in signal collection and detection.

In the systems of the present disclosure, there are a number of design criteria that can benefit from optimization.

For example, in the context of integrated detection systems, an over-arching goal is in the minimization of intervening optical elements that could interfere with the efficient conveyance of optical emission signals from the reaction region to the detector, as well as contribute to increased costs and space requirements for the system, by increasing the complexity of the optical elements between the reaction regions and the sensors.

Additionally, and with added importance for single molecule detection systems, it is also important to maximize the amount of optical emission signal that is detected for any given reaction event. In particular, in optical detection of individual molecular events, a relatively small number of photons corresponding to the event of interest are typically relied on in the measurements. While high quantum yield labeling groups, such as fluorescent dyes, can improve detectability, such systems still operate at the lower end of detectability of optical systems. Fluorescent dyes finding utility in the analytical reactions performed using the instant systems are well known. Any suitable fluorescent dye can be used, for example, as described in PCT International Publication No. WO2013/173844A1 and U.S. Patent Application Publication Nos. 200910208957A1, 201010255488A1, 201210052506A1, 201210058469A1, 201210058473A1, 201210058482A1, and 201210077189A1.

In the context of the systems, devices, and methods of the present disclosure, the size and complexity of the optical pathways poses a greater difficulty, as there is less available space in which to accomplish the goals of separation of excitation and signal, or separation of one signal from the next. Accordingly, the systems, devices, and methods of the disclosure take advantage of simplified optical paths associated with the analyses being carried out, in order to optimize those analyses for the integrated nature of those systems, devices, and methods.

Figure 4:
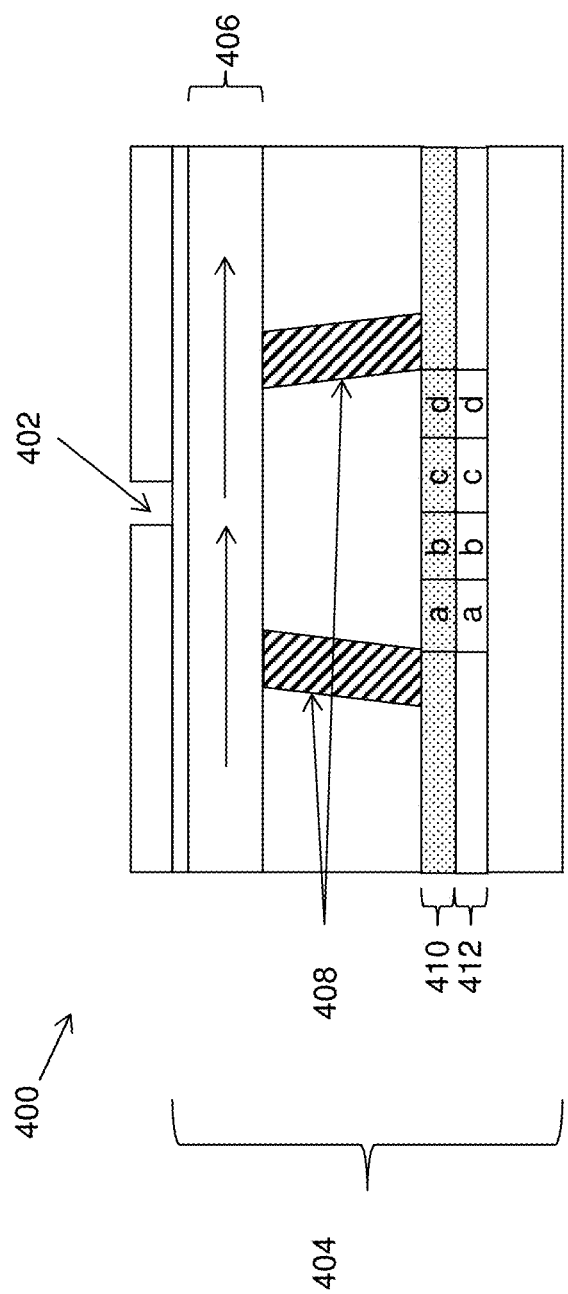
FIG. 4 shows an example of a device architecture for performing optical analyses.

FIG. 4 illustrates in more detail an example of a device architecture for performing optical analyses, e.g., nucleic acid sequencing processes or single molecule binding assay. As shown, an integrated device 400 includes a reaction region 402 that is defined upon a first substrate layer 404. As shown, the reaction region 402 comprises a well disposed in the substrate surface. Such wells may constitute depressions in a substrate surface or apertures disposed through additional substrate layers to an underlying transparent substrate, e.g., as used in zero mode waveguide arrays. See, e.g., U.S. Pat. Nos. 7,181,122 and 7,907,800. FIG. 4 illustrates a portion of a device having one reaction region 402. Typically, a device will have multiple reaction regions, for example a device can comprise arrays with thousands to millions or more individual reaction regions.

Excitation illumination is delivered to the reaction region from an excitation light source (not shown) that may be separate from or also integrated into the substrate. As shown, an optical waveguide (or waveguide layer) 406 is used to convey excitation light (shown by arrows) to the vicinity of reaction region 402, where the evanescent field emanating from the waveguide 406 illuminates reactants within the reaction region 402. Use of optical waveguides to illuminate reaction regions is described in e.g., U.S. Pat. Nos. 7,820,983, 8,207,509, and 8,274,040, which are each incorporated herein by reference for all purposes.

The integrated device 400 optionally includes light channeling components 408 to efficiently direct emitted light from the reaction regions to a detector layer 412 disposed beneath the reaction region. The detector layer will typically comprise multiple detector elements, for example the four illustrated detector elements 412a-d that are optically coupled to a given reaction region 402. For DNA sequencing applications, it is often desirable to monitor four different signals in real time, each signal corresponding to one of the nucleobases. Although illustrated as a linear arrangement of pixels 412a-d, it will be appreciated that the detector elements can be arranged in a grid, n by n square, annular array, or any other convenient orientation or arrangement. In some cases, each of the detector elements or channels will have a single pixel. In some cases, the detector elements will each comprise multiple pixels. The detector elements are connected electrically to conductors that extend out of the chip for providing electrical signals to the detector elements and for sending out signals from the detector elements, for example to an attached processor, as described in more detail elsewhere herein. In some embodiments, the detector layer is a CMOS wafer or the like, i.e., a wafer made up of CMOS sensors or CCD arrays. See, for example, *CMOS Imagers From Phototransduction to Image Processing* (2004) Yadid-Pecht and Etienne-Cummings, eds.; Springer; *CMOS/CCD Sensors and Camera Systems* (2007) Hoist and Lomheim; SPIE Press.

Emitted signals from the reaction region 402 that impinge on these detector elements are then detected and recorded. As illustrated in the integrated device of FIG. 4, the device may additionally include a color filter above each of the detector element, as disposed, for example, in filter layer 410. As shown in the drawing, "filter a" corresponds to the color filter associated with "channel a", "filter b" corresponds to the color filter associated with "channel b", and so forth. The set of filters is chosen to allow for a high yield of captured photons, for example with each color filter having one or more blocking bands that block the signal from a portion of one or more of the spectrally distinct signals emitted from the reaction occurring in reaction region 402. Specifically, the filters are designed to allow passage of a large percentage of the emitted photons, while still discriminating between the four bases.

In some cases, optical elements are provided to selectively direct light from given sets of wavelengths to given detector elements. Typically, no specific light re-direction is used, such that the light reaching each region of the filter layer is substantially the same.

The detector layer is operably coupled to an appropriate circuitry, typically integrated into the substrate, for providing a signal response to a processor that is optionally included integrated within the same device structure or is separate from but electronically coupled to the detector layer and associated circuitry. Examples of the types of circuitry useful in such devices are described in U.S. Patent Application Publication No. 2012/0019828, previously incorporated by reference herein.

The integrated analytical device arrays of the instant disclosure, also referred to herein as target waveguide devices or target devices, typically have at least one optical coupler and an integrated waveguide that is optically coupled to the optical coupler. In some embodiments, the optical coupler of the instant devices is a low numerical aperture coupler, and in some embodiments, the optical coupler is a diffraction grating coupler. In some cases, an optical source is directed onto a single coupler, while in other cases, the optical source is directed onto multiple couplers, for example from 2 to 16 couplers. In some cases, each coupler receives substantially the same power. In some cases, different power levels are directed to different couplers on the target device. While this description may refer to "the coupler" on the device, it is understood that in some cases there can be a single coupler, and that in other cases, there will be a plurality of couplers on the device. Analysis devices having multiple couplers are described, for example, in U.S. Patent Application Publication No. 2016/0363728, which is incorporated herein by reference in its entirety.

Grating couplers and their use in coupling light, typically light from optical fibers, to waveguide devices are known in the art. For example, U.S. Pat. No. 3,674,335 discloses reflection and transmission grating couplers suitable for routing light into a thin film waveguide. In addition, U.S. Pat. No. 7,245,803 discloses improved grating couplers comprising a plurality of elongate scattering elements. The couplers preferably have a flared structure with a narrow end and a wide end. The structures are said to provide enhanced efficiency in coupling optical signals in and out of planar waveguide structures. U.S. Pat. No. 7,194,166 discloses waveguide grating couplers suitable for coupling wavelength division multiplexed light to and from single mode and multimode optical fibers. The disclosed devices include a group of waveguide grating couplers disposed on a surface that are all illuminated by a spot of light from the fiber. At least one grating coupler within the group of couplers is tuned to each channel in the light beam, and the group of couplers thus demultiplexes the channels propagating in the fiber. Additional examples of grating couplers are disclosed in U.S. Pat. No. 7,792,402 and PCT International Publication Nos. WO 2011/126718 and WO 2013/037900. A combination of prism coupling and grating coupling into an integrated waveguide device is disclosed in U.S. Pat. No. 7,058,261.

Figure 5:
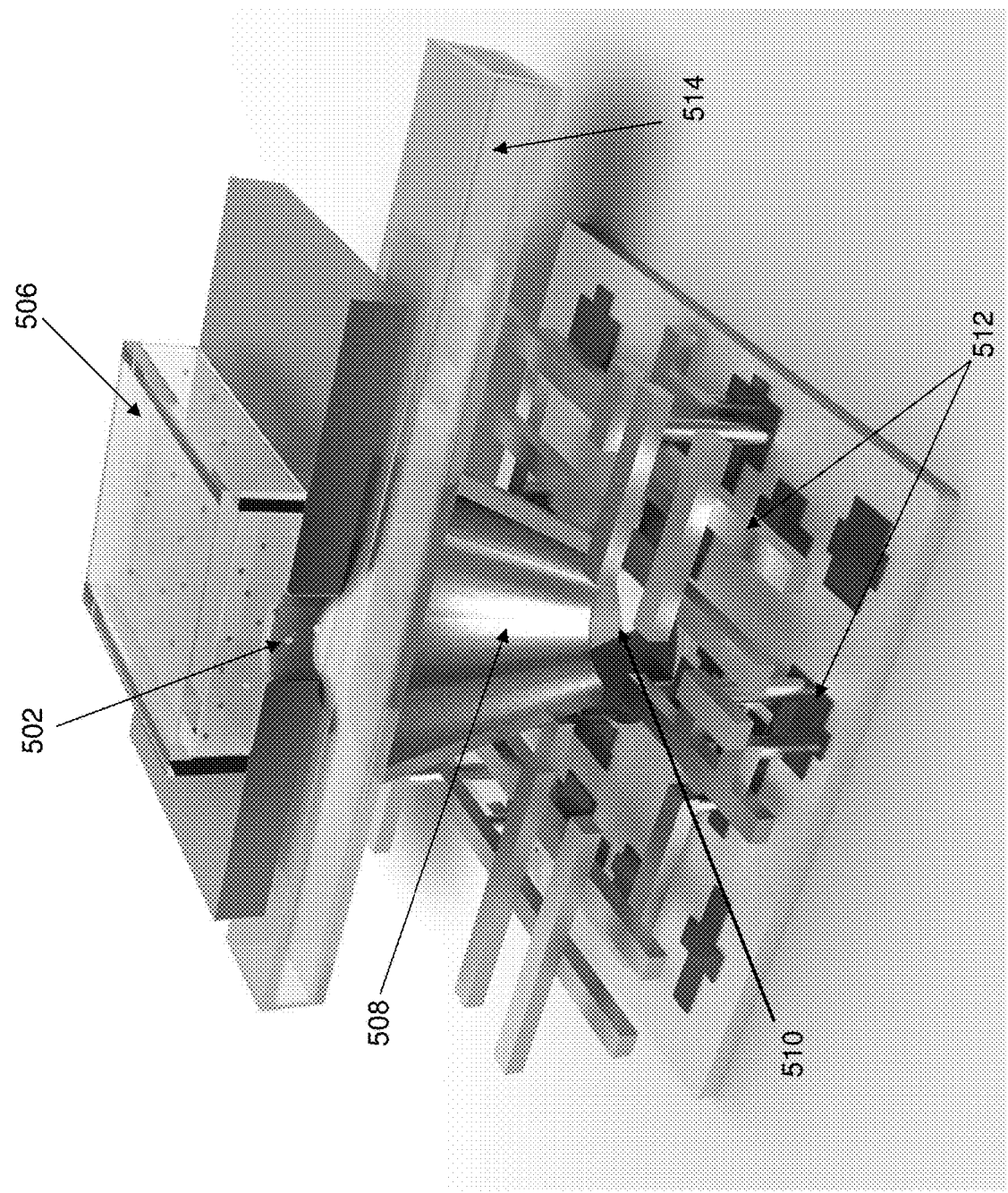
FIG. 5 shows an example of an integrated device used for four color analysis.

With reference to an integrated device used for four color analyses, as alluded to above, an exemplary structure is shown in FIG. 5. As shown, the analytical device includes a reaction cell 502 that is coupled with a reagent reservoir or fluid conduit 506, which delivers reactants to the reaction cell 502. The reaction cell can be a nanoscale well or zero mode waveguide. In some cases, the reaction cell will have a biomolecule such as a polymerase enzyme immobilized within it. The fluidic conduit can provide reagents across a number of reaction cells. Below the reaction cell is a waveguide 514 for providing excitation illumination to the reagents within the reaction cell. The illumination light can be used to excite fluorescent emission from reagents with the reactor cell. The light emitted from the reaction cell is directed downward through a transmission layer, which acts to transmit the light from the reaction cell to the detector. In some cases, the transmission layer will have optical components to enhance the efficiency of the light transfer or modulate the light. In the analytical device of FIG. 5, an optical tunnel or conduit 508 is disposed in optical communication with the reaction cell 502, which is in turn in optical communication with sensing elements 510 in the detector, where the light reaching each of the 4 sensing elements on the detector passes through a different color filter. As shown, each reaction cell is optically coupled to a detector or detector element that includes 4 regions or pixel subsets, each region or pixel subset including a filter layer, and each filter layer including at least one blocking band. Each filter layer sends the appropriate set of wavelengths of light to the appropriate pixel subset. The pixel subsets or sensor elements are coupled to appropriate electronic components 512, such as busses and interconnects, that make up the overall sensor or camera. The electronic components can also include processing elements for processing signals from the detectors.

The instant inventors have usefully found that, in the SiON/SiO$_2$ waveguides of the subject integrated devices, LEV is more likely to be present in longer waveguides than in shorter waveguides. Without intending to be bound by theory, this observation is consistent with the proposed mechanism for LEV, as described above. Thus, in addition to the use of illumination light with multiple longitudinal modes, it has been found that LEV can be reduced by splitting the initially illuminated waveguide on a waveguide device into multiple waveguides. As described previously, it has also been found that LEV buildup can depend on the power (or spatial power density) of the illumination light. In addition, the level of LEV buildup can be lowered by splitting the initial waveguide into multiple branch waveguides over a relatively short distance on the waveguide device.

For the waveguide devices of the instant disclosure, there can be a significant distance between the coupler and the area of interest, e.g., the reaction regions, as described above. The distance that the light travels in the waveguide from coupler to an area of interest can be, for example, several centimeters, for example from 1 cm to 10 cm. The distance referred to herein is the distance the light travels within the waveguide, e.g. the routing distance of the light through the waveguide or waveguides. Typically, where light is routed from a coupler over relatively long distances to an area of interest, a single waveguide is used to rout the light from the coupler to a region close to the area of interest where splitting of the routing waveguide into multiple waveguides can occur. Where multiple waveguide branches are desired within the area of interest, the splitting from a routing waveguide to waveguide branches in the area of interest is typically carried out near the area of interest rather than near the coupler. One routing waveguide per coupler is typically the most efficient approach for routing over relatively long distances. Using one routing waveguide involves fewer elements and typically uses less space on the device than when multiple routing waveguides per coupler are used. The current inventors have found, contrary to this typical architecture, that for waveguide devices of the instant disclosure, it can be advantageous to carry the light from the coupler to the area of interest or to a region near the area of interest over more than one waveguide per coupler, by splitting the illumination light into multiple routing waveguides near the coupler. By lowering the power carried in each routing waveguide, the tendency to build up LEV back reflection can be reduced. Where the dependence of LEV on power is greater than linear, an even more significant lowering of LEV can be gained by splitting near the coupler, instead of near the area of interest.

In some cases, the inventors have found that the waveguide can advantageously be split into two or more waveguides, e.g. 2 to 512 waveguides, within 1 mm to 3 mm of the coupler. In some cases, the waveguide can advantageously be split into 2 or more waveguides within 3 mm of the coupler. In some cases, the waveguide is split into 4 or more waveguides within 3 mm of the coupler. In some cases, the waveguide is split into 2 to 512 waveguides within 3 mm of the coupler. In some cases, the waveguide is split into 4 to 64 waveguides within 3 mm of the coupler.

The inventors have also found that the splitting can advantageously occur in within a fraction of the distance that the light travels from coupler to the area of interest. For example, in some cases, the splitting can occur within a distance that is less than 30% of the distance that the light travels from the coupler to the area of interest. In some cases, the splitting occurs within 20% of the distance the light travels from coupler to active area. In some cases, the splitting occurs within 10% of the distance the light travels from the coupler to the area of interest. In some cases, the coupled light is split into 2 to 512 waveguides within 20% of the distance that the light travels from the coupler to the area of interest. In some cases, the coupled light is split into greater than 2 waveguides within 20% of the distance the light travels from the coupler to the area of interest. In some cases, the coupled light is split into greater than 4 waveguides within 20% of the distance that the light travels from the coupler to the area of interest. In some cases, the coupled light is split into 2 to 512 waveguides within 20% of the distance the light travels from the coupler to the area of interest. In some cases, the coupled light is split into 4 to 64 waveguides within 20% of the distance that the light travels from the coupler to the area of interest. Typically, for a given coupler, the most relevant distance is the longest distance traveled by the light through a branch. As used herein, when describing the longest distance the light travels from a coupler to the active area, this is generally referring to the distance the light travels in the longest routing branch from the coupler to the area of interest. This distinction is made because in many cases, the distance that light travels is different in each of the different routing branches. Minimization of LEV in all of the branches is generally preferred.

The distance over which the one waveguide is split into multiple waveguides can be the distance between the last linear portion of the waveguide before the splitter or splitters to the first linear portion of the multiple waveguides after passing through the splitter or splitters. The distance can also be determined by determining the distance over which the relevant power reduction has occurred (e.g. for a splitter or splitters that split the light into 4 waveguides, the distance over which a power drop of approximately one fourth has occurred, taking into account losses from the splitter or splitters).

The splitter or splitters used to split the waveguide from the coupler into multiple routing waveguides can be any suitable type of splitter or splitters. In some cases, the waveguide from the coupler can be split into multiple waveguides using one or more sets of binary (1:2) splitters. For example, the light can be split into 4 routing waveguides using two sets of binary splitters, one binary splitter to split the light from the initial waveguide into 2 waveguides, then one binary coupler for each of these two waveguides, resulting in four routing waveguides. In some cases, one or more higher order (1:3, 1:4, 1:5, 1:6, or even more) can be used. It will be understood by those of skill in the art that combinations of splitters of the same order or of different orders can be used to split the illumination light into multiple routing waveguides as provided herein. As described above, in some cases, the waveguide device has a plurality of couplers, each coupling light into a single waveguide, and each of the single waveguides are split into multiple routing waveguides as described herein.

In many cases, the branch waveguides are further split near the area of interest into a large number of waveguides to monitor many reaction regions. For example, within the area of interest, the number of waveguide branches can be in the hundreds or thousands. For example, the number of waveguides in the area of interest can be from about one hundred to about 10 thousand. In some cases, each of these waveguides can illuminate from 100 to 10 thousand reaction regions, e.g. nanoscale wells or ZMWs. For example, the illumination light can be split into about 1000 waveguides, each illuminating 1000 reaction regions, allowing analysis to be performed on one million reaction regions at one time.

The number of waveguides and the number of analytical regions per waveguide can be varied in order to obtain the desired level of multiplexing and performance. For example, from 1 to 100,000 waveguides, or from 100 to 10,000 waveguides, or from 500 to 5,000 waveguides on the waveguide device can be used. The number of analytical regions per waveguide, e.g. nanoscale wells, can be, for example, from 1 to 100,000 analytical regions, from 100 to 10,000 analytical regions, or from 500 to 5,000 analytical regions on the waveguide device can be used. Those of skill in the art will understand how to set these numbers in order to obtain the desired performance and level of multiplex.

In some cases, the light is routed such that each of the waveguides in the area of interest is illuminated from both of its ends (i.e., the waveguide is illuminated by counter-propagation from a first end and a second end of the waveguide). As described elsewhere herein, optical sources having multiple longitudinal modes can be used to provide counterpropagating illumination to the waveguides in the area of interest without significant losses due to optical interference. In some cases, it may be advantageous to route light into a waveguide from only one end, for example from a first end of a waveguide.

In some cases, a waveguide is referred to herein as a waveguide branch. As would be understood by one of skill in the art, a waveguide branch as used herein is still a waveguide. It is referred to as a branch for clarity when discussing the splitting of light. For example, herein, a recitation of illuminating a waveguide would include illuminating a waveguide branch.

Accordingly, in certain aspects, the present invention provides optical detection systems that reduce the attenuation of optical emission signals emanating from the reaction region and ultimately, that reach the detector. This permits detection and signal discrimination that is based upon a greater amount of emitted and detected signal, thus increasing the signal-to-noise ratio.

Optical Sources

The optical sources for use in the systems of the instant disclosure preferably have multiple longitudinal modes spaced apart by at least 10 pm. The longitudinal modes are generally spaced by 10 pm to 500 pm, in some cases spaced between 10 pm and 100 pm. Each longitudinal mode preferably has an intensity of 20% or more of the intensity of the most intense longitudinal mode. In some cases, each longitudinal mode has an intensity of 30%, 50%, or 70% of the most intense longitudinal mode.

The illumination spectrum, wavelength range, or bandwidth of the shortest longitudinal mode to the longest longitudinal mode is generally between 10 pm and 20 nm. In some cases, the wavelength range is between 30 pm and 10 nm. In some cases, the wavelength range is between 30 pm and 5 nm. In some cases, the wavelength range is greater than 200 pm, in some cases, the wavelength range is greater than 1 nm, in some cases, the wavelength range is greater than 3 nm, in some cases, the wavelength range is greater than 5 nm, in some cases, the wavelength range is greater than 10 nm. The inventors have found with respect to excitation of fluorescent species that a relatively broad range of wavelengths can be used with suitable performance. For example, even wavelength ranges of the longitudinal modes of 50 nm can be used. However, the inventors have also found that if the wavelength range is too wide, there can be large losses at the coupler on the target waveguide device. While such losses will depend on coupler design, the inventors have found that in some cases a wavelength range of less than 20 nm, less than 10 nm, or less than 5 nm is preferred.

The number of longitudinal modes can be chosen to optimize performance and cost. For example, it may be the case that using an optical source with two longitudinal modes spaced by 10 pm provides sufficient improvement in LEV, and for the other purposes described herein. In some cases, however, an optical source having eight longitudinal modes spaced apart by 30 pm may be required in order to decrease LEV to the required level. In some cases, an optical source having dozens of longitudinal modes, all within a wavelength range of 3 nm, may be the best solution. Accordingly, in some embodiments, the number of longitudinal modes is at least 2, at least 3, at least 5, at least 10, at least 15, at least 20, at least 30, at least 50, or even more.

As described elsewhere herein, the amount of LEV, and other waveguide optical interference, in a given system can depend on the material and dimensions of the waveguide and on the wavelength and power of the illumination light. Those of skill in the art will understand from the teachings provided herein how to achieve a system having the desired analytical parameters.

In some cases, it can be straightforward to determine the number of longitudinal modes and the spacing for a given optical source. In other cases, especially where there are a relatively large number of modes, it can be more straightforward to characterize the illumination light by measuring the width of the illumination spectrum or wavelength range between the longitudinal mode with the shortest wavelength and the longitudinal mode with the longest wavelength. In some cases, there are a large number of modes such that at the resolution of the wavelength scan that is taken, the multiple modes approximate a peak. In this case, the range of wavelengths can be determined by measuring the width of the peak, for example, determining the full width at half maximum (FWHM).

In other embodiments, instead of using a laser with a broadband linear continuous wave (CW) spectrum comprised of a stationary or quasi-stationary distinct modes to suppress spatial coherence, a broadband spectrum can be synthesized by quickly scanning the laser wavelength over a particular spectral range at a particular frequency. As described above, such a time-modulated approach for suppressing LEV has been disclosed previously in U.S. Patent Application Publication No. 2016/0216538. As provided therein, the frequency of modulation can in some cases be greater than about 0.001 Hz and can in some cases be between about 1 KHz and 0.01 Hz (see para. 0008). As further disclosed therein, the modulation of wavelength can be done at the laser, or it can be accomplished using optical elements between the laser and the target waveguide (see para. 0053). As also noted therein, the frequency of modulation can depend on the time it takes for the back reflection to develop in the waveguide (id.).

The above approach can also be extended to reducing spatial coherence during excitation of a waveguide device by counter-propagation from a single optical source. In particular, the coherence function is the Fourier transform of the laser spectrum and time averaged coherence function is a Fourier transform of a time averaged optical spectrum of the laser. This will lead to at least partial suppression of the time-averaged interference effects by modulating the laser wavelength to widen the time-averaged optical spectrum.

If the laser wavelength scanning frequency is 10× larger than the chip sensor frame rate, then synchronization of the laser and the sensor in time is generally not of concern, since optical signals will be averaged over many wavelength periods during a sensor frame. In some cases it may be acceptable to work without synchronization even if laser scanning frequency is less than 10× larger than the sensor frame rate, for instance if it is only 3× larger. However, once the laser wavelength scanning frequency starts to approach the sensor frequency, it can be desirable to synchronize the laser and the sensor to ensure that each sensor frame sees exactly the same spectral range of wavelengths.

In can also be advantageous to vary the wavelength of the laser in a continuous manner, as opposed to varying the wavelength in steps, over a discrete set of wavelengths, as the continuous variation can help to suppress repeating fringes in the coherence function. For example, U.S. Pat. No. 7,668,216, which is incorporated herein by reference in its entirety, demonstrates that a reduction of time-averaged coherence of laser radiation can be achieved by modulating a laser drive current using a modulation function optimized for obtaining a pre-determined time-averaged spectral profile of laser radiation, ideally of a Gaussian shape. In particular, FIG. 3A of U.S. Pat. No. 7,668,216 shows how the fringe contrast (or coherence) is modified and fringe visibility is significantly reduced when a Gaussian shape spectrum is employed, as compared to the trapezoidal spectrum. As further described in this patent, the slow decay of the fringe contrast with increasing optical path differences (OPD) stems from the sharp edges ($\lambda_{min}$ and $\lambda_{max}$) of the spectrum (see, e.g., FIG. 2B of U.S. Pat. No. 7,668,216). To obtain a rapidly falling off coherence function, these sharp discontinuities in the optical spectrum should be avoided. A spectral profile that has the Fourier transform falling off most rapidly is a Gaussian profile. Therefore, in the use of such optical sources in the current applications, it is preferred to modulate the laser wavelength in such a way that the time-averaged frequency spectrum has a target spectral profile that approximates a Gaussian profile.

In still other embodiments of the instant disclosure, the optical source utilized in the instant systems is a superluminescent light emitting diode (SLED or SLD), which is an edge-emitting semiconductor light source based on superluminescence. Such optical sources are also known as superluminescent diodes, superluminescence diodes, or superluminescent LEDs. They combine the high power and brightness of laser diodes with the low coherence of conventional light emitting diodes. The emission band of a typical superluminescent light emitting diode is approximately 5-100 nm wide. If such an optical source is designed to have a smooth Gaussian spectral distribution, its coherence function will drop on a spatial scale of few tens of microns, and there will be no repeating side lobes of the fringe visibility.

Thus, both of the above preferred approaches rely on creating a laser spectrum of a Gaussian shape, either time-averaged or CW. Creation of such a laser spectrum has the advantage that just one distinct coherence peak is formed at the zero OPD point, and the coherence function falls off rapidly away from this zero OPD point. Accordingly, by the introduction of a small delay on the chip between the self-counter-propagating beams, the zero OPD point can be shifted outside of the active area everywhere on the chip for all the waveguides, and the effect of the laser coherence on detection performance can therefore be minimized.

In another embodiment, either CW or time-averaged CW sources can be employed for LEV suppression. In this case the different sources can be utilized either for single-sided or dual-sided (i.e., counter-propagated) illumination of waveguides in the active area of the target device.

As described above, the integrated target devices of the instant disclosure typically comprise one or more single mode waveguides. Single mode waveguides can be preferred for certain analyses including, for example, single molecule sequencing. Where single mode waveguides are used, it is preferred that the optical source, in addition to having multiple longitudinal modes has a significant portion of its energy in a single transverse or spatial mode. In some cases, the illumination light from the optical source has greater than 80% of its intensity in a single transverse mode, in some cases, the illumination light from the optical source has greater than 50% of its intensity in a single transverse mode, in some cases, the illumination light from the optical source has greater than 20% of its intensity in a single transverse mode, in some cases, the illumination light from the optical source has greater than 10% of its intensity in a single transverse mode. In some cases, the illumination light from the optical source has an $M^2$ factor describing beam quality that is less than 1.5, in some cases, the illumination light from the optical source has an $M^2$ factor that is less than 1.3. The single transverse mode is typically the Gaussian or fundamental mode. In some cases, the single transverse mode is a $TEM_{00}$ mode.

Typically, the illumination light from the optical source is linearly polarized. For example, in some cases, it is useful for the illumination light from the optical source to be linearly polarized in order to more effectively couple into a TE mode in a waveguide on the target device.

It will be understood that the characteristics of the illumination light can change along the path from exiting the optical source to the location where it illuminates a reaction region. For example, the illumination light can be described as it exits the optical source, after it is emitted into free space, after it passes through optional free space optical elements, as it travels down the waveguide on the target device, and as it impinges upon the reaction region. While illumination from all of these locations will be described herein as illumination light, it is understood that the characteristics of the light at each of these points may differ. For clarity, light exiting the optical source into free space will most often be referenced. This provides a convenient point for carrying out a measurement of the properties of illumination light. While this point is chosen for clarity and ease of measurement, typically the number of longitudinal modes will not vary significantly at the various points along the light path. An alternative point for determining the characteristics of the illumination light is the point after the optional free space optics and before the light enters the target device. As noted elsewhere herein, in some cases there are optical components connected to the optical source prior to the light being emitted into free space. In some cases, the optical source will have associated optical elements such as a coupled fiber or lenses.

In some cases, there will be free-space optical elements positioned between the optical source and the target device. These free-space optical elements can be used to modify, tune, focus, or shape the beam, for example to provide light to the target device that is coupled more effectively, or that is transmitted more effectively through the waveguide. The free space optical elements can be any suitable element or set of elements including, for example one or more lens, polarizer, wedge, filter, prism, mirror, or grating.

The optical source used in the instant systems can be any suitable optical source, as would be understood by those of ordinary skill in the relevant art. In particular, the optical source has the properties described above with respect to minimization of LEV in the target waveguide devices. In preferred embodiments, the optical source is a laser source. Lasers that emit in the visible wavelength range are particularly useful for the analysis systems of the present disclosure, for example lasers that emit between 450 nm and 700 nm or from 500 nm to 650 nm. In other preferred embodiments, the optical source is a superluminescent light emitting diode.

Any suitable type of laser can be used for the instant systems. In some cases, solid state lasers are used, for example, III-V semiconductor lasers. Recently, progress has been made in producing solid state lasers that emit in the desired wavelength range. Particularly useful lasers are GaInN solid state lasers. Lasers suitable for use in the disclosed systems, including GaInN lasers, are described, for example in Sizov et al., "Gallium Indium Nitride-Based Green Lasers," *J. Lightwave Technol.*, 30, 679-699 (Mar. 1, 2012), Nakamura, et al. "Current Status and Future Prospects of InGaN-Based Laser Diodes", *JSAP Int. No.* 1, January, 2000, Jeong et al. Nature, Scientific Reports, "Indium gallium nitride-based ultraviolet, blue, and green light emitting diodes functionalized with shallow periodic hole patterns", DOI: 10.1038, and Tagaki et al., "High-Power and High-Efficiency True Green Laser Diodes", *SEI Tech Rev, No.* 77, October 2013; which are each incorporated by reference herein for all purposes in their entireties.

Combining Multiple Optical Sources

While in many cases, it is most desirable to provide the illumination light of the present invention with a single optical source, for example a single laser, in some cases, it is desirable to use two or more optical sources to provide the multiple longitudinal modes that have been found to provide significant advantages for optical analysis with the instant target waveguide devices.

The combined output of the illumination light into free space is the same as described elsewhere herein, however, in this embodiment, the output of two or more lasers is combined to produce the multiple longitudinal modes that are released into free space and then launched into the waveguides on the target device. Those of skill in the art will know how to use combining optical elements to produce the desired multiple longitudinal modes of illumination light.

Analytical Instruments and Systems

In another aspect, the disclosure provides analytical instruments for carrying out the disclosed methods and for use with the analytical devices described herein. For example, in some cases, the analytical devices of the invention are part of an analytical instrument or analytical system. The analytical devices can in some cases be removably coupled into an instrument or system. Reagents can be brought into contact with the analytical device before and/or after the analytical device has been coupled with the instrument or system. The system or instrument can provide electrical signals and/or illumination light to the analytical device, and can receive electrical signals from the detectors in the analytical device. The instrument or system typically has computers to manipulate, store, and analyze the data from the device. For example, the instrument can have the capability of identifying the order of added nucleotide analogs for the purpose of nucleic acid sequencing. The identification can be carried out, for example, as described in U.S. Pat. No. 8,182,993, and U.S. Patent Application Publication Nos. 2010/0169026 and 2011/0183320 which are incorporated herein by reference for all purposes in their entireties.

For example, the disclosure provides analytical instruments comprising any suitable target device as described herein, an optical source for providing illumination light to the one or more waveguides of the target device or devices, an electronic system for providing voltage and current to the detector and for receiving signals from the detector; and a computer system for analyzing the signals from the detector to monitor the analytical reaction, for example to obtain sequence information about a template nucleic acid.

As used herein, the terms sensor and detector are used interchangeably. In some cases, a sensor or detector can comprise a single pixel. In other cases, the sensor or detector can comprise a plurality of pixels such as an array of pixels. The meaning of these terms will be understood by those of skill in the art in the context that they are used.

Planar Lightwave Circuits (PLCs)

In some aspects, the systems of the instant disclosure include optical delivery devices that are constructed with a plurality of integrated transmission waveguides for the delivery of optical energy from one or more optical inputs to one or more optical outputs. Such integrated devices are sometimes referred to as planar lightwave circuits (PLCs). PLCs are most typically found in telecommunications equipment, where they serve to couple and/or split optical excitation signals from fiber optic cores, for the purpose of, for example, multiplexing/demultiplexing, optical branching, and/or optical switching. These more specific PLCs are also sometimes referred to as fiber spacing concentrators (FSCs). PLCs typically comprise multiple components that are directly fabricated into an integrated device, where the different components provide the desired functionality. For example, a PLC may comprise one or more waveguides, one or more splitters, one or more taps, one or more photodetectors, and one or more fibers, ideally polarization-maintaining fibers. The fibers and PLCs used in telecommunications applications typically transmit light in the infrared range, most commonly at wavelengths of about 1310 nm or about 1550 nm. In some cases, lower cost electronics such as light-emitting diodes (LEDs) and vertical-cavity surface-emitting lasers (VCSELs) may be used in devices comprising PLCs, such as FSCs.

In contrast to the PLCs used to transmit optical telecommunication signals, however, the instant optical devices are typically designed for the efficient transmission of shorter wavelengths of light. In particular, the optical illumination for fluorescent analysis, for example in DNA sequencing reactions with fluorescently-labeled DNA reagents, is typically in the visible range, most commonly in the range from about 450 nm to about 700 nm. The waveguides and other components of the optical devices disclosed herein, and incorporated into the instant systems for DNA sequencing, are therefore preferably designed and scaled to transmit optical energy efficiently in the visible range. In some embodiments, the wavelengths range from about 450 nm to about 700 nm. In more specific embodiments, the wavelengths range from about 500 nm to 650 nm or even from about 500 nm to about 600 nm. In some specific embodiments, the wavelengths are from about 520 nm to about 560 nm, for example. In other specific embodiments, the wavelengths are from about 620 nm to about 660 nm, for example, approximately 635 nm or 650 nm. In some embodiments, a combination of visible wavelengths may be transmitted within the devices.

In the instant disclosure, a PLC is typically optically coupled to a single optical source by an optical fiber. The PLC is used to split the light emitted by the optical source into multiple beams, all of which are directed to a target device comprising waveguides. As described above, the disclosure includes the use of lasers, or other optical sources, providing light having particular characteristics, including having multiple longitudinal modes. For purposes of this application, the light characteristics are described at the point where the light passes into free space. Accordingly, where a PLC is coupled to an optical source via an optical fiber, the light is considered to have reached free space when it exits the PLC.

Figure 6:
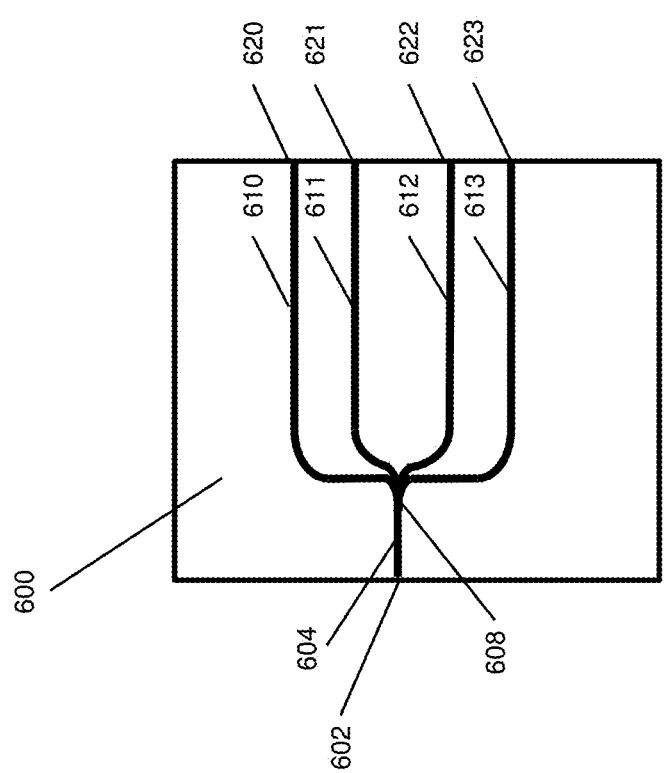
FIG. 6 shows a representative planar lightwave circuit (PLC).

PLC devices can include a variety of functional components embedded within the lightwave circuit. For example, a device can include an optical splitter, such that a single optical input can be divided into multiple optical outputs as optical energy is transmitted through the device. In the simplest case, for example as shown in the PLC of FIG. 6, the optical power emitted from each of the optical outputs of the device is the same, or nearly the same. In this example, the optical device 600 can include various integrated waveguides that are optically coupled with one another to transmit light through the device. Specifically, the device can include an optical input 602 optically coupled through an optical input waveguide 604 to a 1×4 splitting element 608 that divides the input optical energy delivered to four optical outputs 620-623 of equal power intensity that are optically coupled to the splitting element through four optical output waveguides 610-613. It should be understood that the same outcome could be achieved by a combination of a first 1×2 splitter followed by the further splitting of the resulting optical outputs by two additional 1×2 splitters. PLC elements suitable for use with the instant systems are described, for example in U.S. Patent Application Publication No. 2016/0273034, which is incorporated herein by reference for all purposes.

Target Waveguide Devices and Systems with a Single Optical Source

In another aspect, the disclosure provides systems comprising a target waveguide device with a single input source that can deliver light from the optical source to both ends of an optical waveguide (i.e., by counterpropagation). As described above, when providing illumination to a number of regions on a target device using a single waveguide, it can be advantageous to use counterpropagating illumination. For example, as light travels through a waveguide, there are inevitable propagation losses, and therefore the regions toward the opposite end of a waveguide will receive less illumination than the regions at the beginning of the waveguide. For an optical analysis device, it is often desirable to have a consistent amount of illumination at each region, and therefore this diminishment in intensity can be undesirable. Counterpropagating illumination allows for mitigation of this issue. While there can still be a loss in illumination intensity of the light coming in from each end of the waveguide, the combination of intensities from the two opposite beams tends to cancel this effect and provide for a more consistent illumination across the entire analysis region. The need to use counterpropagation could be avoided by using shorter waveguides in order to minimize propagation losses within each waveguide, but the use of short waveguides would require an increased total number of waveguides and thus a less efficient device geometry (e.g., short waveguides would require a long and narrow device design). The use of shorter waveguides can thus limit the size of the active area of a device.

Figure 7:
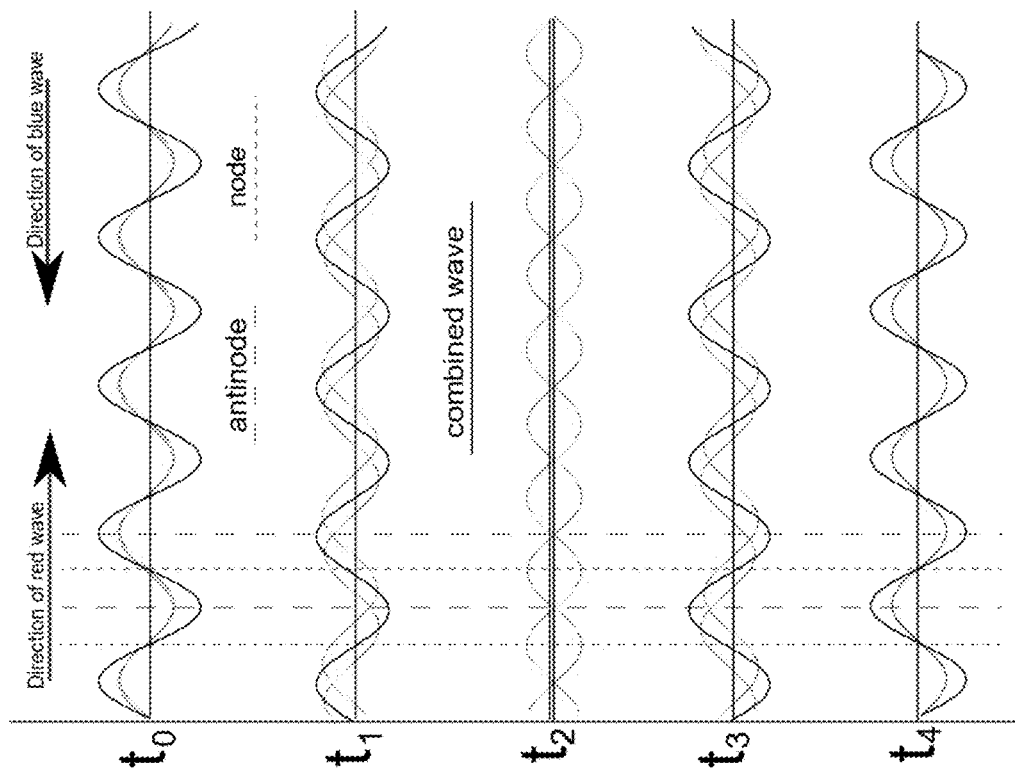
FIG. 7 illustrates the formation of standing waves from counterpropagated optical beams and mitigation of the resulting interference by the use of optical beams having different wavelengths.

While counterpropagation can be desirable for the purpose of uniformity of illumination, the use of a single longitudinal mode laser to generate the counterpropagating beams (e.g., by splitting a single input beam and directing the split beams to opposite ends of a waveguide on the target device) can be problematic. Specifically, laser light coming in from the split beams at opposite ends of the waveguide can result in the formation of standing waves, and therefore interference, which, given long coherence length, can create temporal and spatial light intensity fluctuations along the length of the waveguide. See, e.g., FIG. 7 (adapted from https://en.wikipedia.org/wiki/Standing_wave), which provides a graphical representation of two opposing waves combining to form a standing wave. For example, counterpropagating beams originating from the same laser and launched into a waveguide from two opposite ends can result in undesirable standing waves leading to non-uniform illumination of samples. Since the coherence length for a single-mode laser is typically very long (e.g., >10 m) a delay line between the two beams cannot easily be introduced in order to break the coherence, especially if the splitting is done on the target device itself.

Figure 8B:
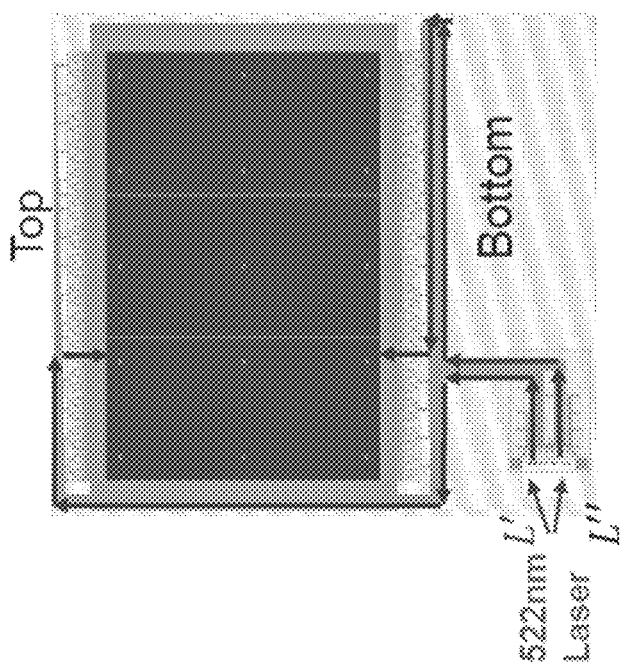
FIG. 8B shows the design of a DNA sequencing waveguide device where excitation is provided by counterpropagating optical beams emitted from a single split-beam multi-longitudinal mode laser, for example with an output wavelength of about 522 nm.
Figure 8A:
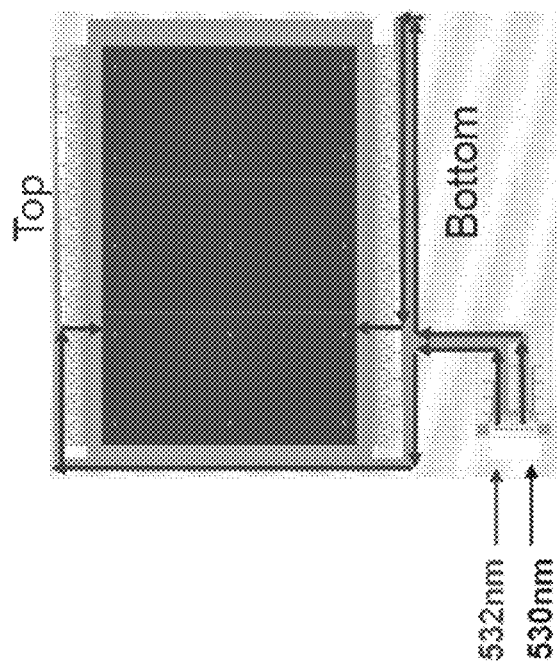
FIG. 8A shows the design of a DNA sequencing waveguide device where excitation is provided by counterpropagating optical beams emitted from two single-spatial mode lasers with different average output wavelengths (530 nm and 532 nm).

A solution to the problem of the above-described interference is the use of two independent single-mode optical sources, each source having a different wavelength, in order to minimize or eliminate the interference. When two optical sources are used, one source illuminates one end of a waveguide or set of waveguides, and the other source illuminates the other end of the waveguide or set of waveguides on the device. An example of the configuration of such a target waveguide device is illustrated in FIG. 8A, where the input optical couplers are located in the lower left corner of the device. In this example, a 532 nm input beam is directed around the left side of the device to enter the sample waveguides from the "top" end of the device, and a 530 nm input beam is directed to enter the same sample waveguides from the "bottom" end of the device. In this case, a standing wave only persists on the following approximate time scale, $$\tau \sim \frac{2}{\Delta f} \sim \frac{2}{c} \cdot \frac{\lambda^2}{\Delta \lambda} \sim 10^{-12} s \sim 1 ps,$$

which is very short compared to the fluorescence lifetime and therefore does not have any effect on the detection system. While the use of two single-mode optical sources with different wavelengths can mitigate or solve the problem of interference due to counterpropagating illumination, the use of two optical sources is expensive and adds to the complexity of the illumination system.

The instant inventors have found and demonstrated that by using a single broadband multi-mode optical source to deliver light to a target waveguide device, one or more waveguides on the device can be illuminated in counterpropagating fashion with significantly lower levels of interference than where an optical source with a single longitudinal mode is used. An example of the configuration of such a target device is illustrated in FIG. 8B, where the input optical couplers are located in the lower left corner of the device. In this example, a single 522 nm multi-longitudinal mode laser provides the optical input at both of the indicated input couplers. The two beams are directed around the device so that they enter the same sample waveguides from opposite ends, thus providing counterpropagating input light. Alternatively, a single coupler on the target device could receive input optical energy from a single optical source, and the separate optical inputs for the two ends of the sample waveguides could be created by splitting the light on the target device itself.

Thus, one aspect of the disclosure involves the illumination of a target waveguide device, wherein the waveguide is illuminated by splitting the light from a single optical source such that the waveguide is illuminated from both of its ends. In some embodiments, the single optical source emits illumination light into free space prior to coupling into the target device. In some embodiments, the emitted illumination light comprises multiple longitudinal modes spaced apart by at least 10 pm. In some embodiments, each longitudinal mode having an intensity of 20% or more of the intensity of the most intense longitudinal mode, wherein the wavelength range of the shortest longitudinal mode to the longest longitudinal mode is between 10 pm and 20 nm. The characteristics of the broadband optical source for use in counterpropagation are provided throughout this application. Typically, the target device has multiple waveguides, and the single optical source is used to illuminate each of the waveguides from each of its ends.

In some cases, a single coupler on the target device is used to collect the light from the single illumination source. The light from this source is routed on the device to the two ends of a single waveguide or a set of waveguides. In some embodiments, the target waveguide device comprises a plurality of optical waveguides, each optical waveguide comprising a first end and a second end, and wherein the first end of each optical waveguide and the second end of each optical waveguide are configured to receive the optical excitation beam from the optical source. More specifically, the target the target waveguide device can comprise at least 2, at least 5, at least 10, at least 50, at least 100, at least 500, at least 1,000, at least 5,000, at least 10,000, at least 50,000, or even more optical waveguides. Alternatively or in addition, the target waveguide device can comprise no more than 100,000, no more than 50,000, no more than 10,000, no more than 5,000, no more than 1,000, no more than 500, no more than 100, or even fewer optical waveguides. In specific embodiments, the set of waveguides can be, for example, from 1 to 100,000 waveguides, from 100 to 10,000 waveguides, or from 500 to 5,000 waveguides.

The ability to use a single coupler to provide this counterpropagating light can be advantageous, as it can significantly lower costs and reduce the complexity of the illumination system, in particular when compared to systems where multiple light beams must simultaneously be directed to multiple different couplers on the target device. The routing of light on the device can be achieved by including one or more embedded optical splitters in the device between the input coupler and the waveguide, or set of waveguides, that provide illumination to the reaction region, as would be understood by those of ordinary skill in the art.

Optical Alignment with a Target Device

In another aspect, the disclosure provides systems and methods for using signals from the target optical device itself in order to perform source-to-device alignment, in some cases with a single input coupler. In general, alignment of an illumination light beam from a laser or other optical source (where the source is typically part of an analytical instrument, such as a sequencing instrument) with an optical target device (which is often removably held in place in the instrument) such that the light beam is precisely directed to the coupler on the target device can be a difficult problem. On the one hand, the components in the instrument responsible for holding a removable target device in place may have geometrical uncertainties, while on the other hand, there may also be uncertainties in the position of the coupler on the target device, for example, with respect to the edge of the chip, given that imperfections of the cell packaging process can be +/−300 μm or larger in the x and y directions. The beam from the optical source also may need to be directed to the coupler on the target device at a certain angle in order to maximize the coupling efficiency, and the optimal angle can also vary from target device to target device. In addition, the size of the coupler on the target device can be relatively small (e.g., 50 µm×50 µm), and it can be difficult to remove and replace a target device in the instrument within the tolerances required for the light beam to be aligned with the coupler each time a target device is removed and reinserted. Exemplary approaches to such alignment are provided in U.S. Patent Application Publication No. 2016/0273034 which is incorporated herein by reference for all purposes. Such previous approaches typically required inclusion of an alignment camera in the analytical system. See, e.g., FIG. 9, which illustrates an optical analytical system that comprises an alignment camera. The requirement for an analytical system to include an alignment camera increases the complexity of the system as well as the cost.

In order to address this problem, the instant disclosure thus also provides novel systems, devices, and processes for carrying out and optimizing alignment between an optical source, in particular a laser source, and a target device, in particular a waveguide device comprising at least one input optical coupler, for example a DNA sequencing chip. The alignment process can include both a coarse alignment and a fine alignment. In particular, the alignment can be done by using signal feedback directly from a sensor that is incorporated into the target device, for example an analytical sequencing chip, and adjusting the position of the optical source relative to the target device in order to maximize this signal. For example, a raster scan can be performed with the laser beam over the area where an input coupler is expected to be located, and a signal from one or more sensors optically coupled to the an optical waveguide associated with the coupler can be monitored. Since alignment is routinely done over a short period of time (compared to the duration of, for example, a sequencing analysis on a sequencing chip) and at low power, the relative photodamage to a sample in the reaction region is small as the alignment is achieved.

During the alignment process according to some embodiments, the fluorescent signal arising from one or more reaction regions, which typically include at least one fluorescent reagent, is generated in response to the input light. In the simplest and most efficient embodiments, the same optical and data paths can be used both for the alignment process and for subsequent analytical measurements, where an "optical alignment signal" is obtained during the alignment process, and an "optical emission signal" is obtained during the analytical measurements. Furthermore, in some embodiments, signals can be binned together from several sensor regions (e.g., from several pixels on the detector), for example using embedded software, to improve the signal-to-noise ratio of the feedback signal. It should also be understood, however, that the regular data analysis pipeline can be slow, since all of the sensor regions from the sensor need to be processed. Therefore, in alternative embodiments, signals from several reaction reactions in the sensor board can be binned (for example by reprogramming the device using a field-programmable gate array (FPGA)), and the resultant signal can be fed to the computer controlling the alignment motion between the optical source and the target device via a separate data path. This approach can be much faster than other methods and therefore allow for faster alignment as well.

In another embodiment, a fluorophore, or another agent capable of generating an optical emission signal with intensity that varies as a function of input optical energy, can be deposited in a dummy region used solely for purposes of alignment. The subsequent fine alignment step, which optimizes the position between the optical source and the target device, should be easier to perform compared to the coarse alignment, since after the coarse alignment step is complete, signals emitted from the actual reaction regions can be monitored and maximized, for example using an optimization method such as a Nelder-Mead method, or the like, as would be understood by those of ordinary skill in the art.

In other embodiments, special features can be placed on the target device to further simplify the coarse alignment step. For example, a target device can have a small auxiliary alignment sensor, either 2D, 1D, or two orthogonally positioned 1D, placed near the input coupler at a distance precisely defined using lithography step during chip manufacturing. The dimensions of the auxiliary alignment sensor should be larger than its positioning uncertainty during packaging, to ensure that the laser beam will be registered on the sensor as soon as the cell is placed in the instrument. The geometrical tolerances of the components responsible for target device within the instrument can also be of importance in these considerations. For example, if the packaging uncertainty of the auxiliary alignment sensor on the target device is +/−300 microns, then the size of the sensor should preferably be larger than 600 microns. Since the auxiliary alignment sensor is placed on the target device very precisely with respect to the input coupler, once the input optical beam is registered on the auxiliary alignment sensor, it is immediately known by how much the beam and/or target device needs to be shifted in order to align the input beam with the input coupler. Achieving sub-micron positioning accuracy using lithographic processes is well within the skill in the art. If there is expected to be some degree of rotation and cross-coupling between the x and y axes of the target device, then the beam can first be scanned over the sensor to determine the required rotation angle. The sensor can either be a part of the sensor responsible for detecting signals from the reaction regions or can preferably be a separate sensor, as it can optionally include an intervening filter layer in order to attenuate the laser beam to a level that does not cause saturation of the sensor output.

In another variation, the locations of different alignment features (e.g., auxiliary alignment sensors, auxiliary alignment couplers, and the like) on the chip can be calibrated during cell manufacturing using a machine vision camera, and the locations can be saved on $E^2PROM$ (Electrically Erasable Programmable Read-Only Memory) positioned on the cell or cell packaging. In particular, positions of the input couplers with respect to known datum or distance between the alignment feature, or features, and the input coupler can be precisely measured. If the offsets related to the cell positioning in the instrument are also precisely calibrated, then utilizing this information can allow for significant speed up of the alignment time.

In yet another variation for achieving alignment of the optical source and the target device, instead of having a sensor array of small pixels, a quad-cell consisting of 4 larger size detectors packed together, for example in a square configuration, can be employed. In some embodiments, two detectors can be used to determine the position of the beam along one axis, and two detectors can be used along the other axis. The beam is initially centered in the middle of the quad-cell, and it is then translated to the input coupler using the known separation distance, as described above.

In yet another implementation of the alignment system and process, one or more auxiliary alignment couplers can be placed at a lithographically defined distance from the input coupler that is optically connected to the sequencing area, and the one or more auxiliary couplers can be used to assist in coarse alignment. For example, from one to six, from one to four, from one to three, or from one to two auxiliary couplers can be arranged on the target device to provide coarse alignment. In one example, four auxiliary input couplers can be packed close to each other in a rectangular shape configuration, for example in a square shape configuration, where one of the four couplers is the actual input coupler. One advantage of having several input couplers is the increased probability that the laser will encounter one of them during the alignment scan. For example, the auxiliary couplers are preferably placed far enough apart on the surface of the optical device that an input beam scanning the surface of the device will be ensured of encountering at least one of them during the coarse alignment process, given manufacturing tolerances of the optical device. The light entering the device from the auxiliary couplers can be routed to the active area sensor or to a sensor that is dedicated to the alignment process.

In an additional or an alternative approach for alignment of the target device, the system for carrying out coarse alignment can include an expanding lens, including a cylindrical lens, within the laser beam path to broaden the laser beam spot on the coupler. Alternatively or in addition, the beam can be broadened by the insertion of a diffractive optical element (DOE) in the beam path, thus also reducing the coarse alignment time. After coarse alignment has been achieved using the broadened beam, the fine alignment step is performed, for example by maximizing the sequencing signal strength through the sample input coupler. In a broad application of this approach, the expanded beam can enable coarse alignment through a sample input coupler, without the need for an auxiliary input coupler on the target device. In more specific applications, the expanded beam can be coupled through one or more auxiliary couplers to achieve coarse alignment. Fine alignment is typically achieved using the sample input couplers, for example, after removing the expanding lens from the path of the optical source. The amount of beam expansion ideally should be larger than the uncertainty of the coupler position to ensure that the input or auxiliary input coupler will be encountered by the expanded beam in that dimension. However, in situations where the laser power output is limited, it may be the case that the laser power density can be too low after beam expansion, and it may become more difficult to detect the alignment signal. In this case, it may be advantageous to expand the beam by a smaller factor in order to maintain optical power density. Even a small increase in beam size will facilitate alignment, since the area of a coarse search will be reduced accordingly.

After coarse alignment is complete, the additional lens will typically be removed from the optical path to proceed with a fine alignment. In some cases, if the lens is not exactly orthogonal to the optical beam, removing the lens from the beam path may result in the beam becoming misaligned with the input coupler. Such displacement caused by the lens can be calibrated during instrument manufacturing and beam position can be corrected after the additional lens is removed.

In another embodiment, instead of placing an auxiliary sensor, such as a quad-cell or sensor or a photodiode, on the target device for assisting with coarse alignment, one can instead place some auxiliary features, for example, diffractive features on the target device at a known, lithographically defined distance from the input coupler to assist with the coarse alignment process. In addition, a sensor, either 2D or 1D, or a photodiode, can be placed in the proximity of the target device. The sensor position can be arranged in such a way that if the laser is scanned over the target device surface and hits a diffractive feature the light will be deflected towards the sensor. This approach can help to quickly localize the position of the input coupler, thereby speeding up the coarse alignment search.

Although the alignment process can be performed by holding the target device in a fixed position and scanning the output from the optical source across the surface of the immobilized device, it should be understood that the process can alternatively be performed by holding the optical source in a fixed position and moving the target device relative to the output from the optical source in order to achieve alignment. In general, in the instant systems, either the target waveguide device or the optical source is movable relative to the other in at least two dimensions, and alignment is achieved by configuring the system to monitor an optical alignment signal and to move either the target waveguide device or the optical source relative to the other to increase the optical alignment signal. In specific embodiments, the system does not include an alignment camera. In other specific embodiments, the system is configured to move the target waveguide device relative to the optical source until the optical alignment signal is increased to a maximum level.

In some embodiments, at least one detector region in the target waveguide device is configured to detect both an optical alignment signal and an optical emission signal. In some embodiments, the target waveguide device further comprises an auxiliary alignment sensor, and the auxiliary alignment sensor is positioned on a surface of the target waveguide device at a distance from the at least one optical coupler that is precisely defined using photolithography during manufacture of the target waveguide device. In some embodiments, the waveguides of the target waveguide device are configured to transmit counterpropagated optical signals, as described in detail above, for example, by a single optical source, such as a broadband, multimodal optical source. The target waveguide devices used in the just-described systems and methods for alignment can alternatively or in addition include any of the above-described target waveguide device features, without limitation.

In some alignment methods, the optical beam is configured or scanned spatially to project at least a coarse illumination spot size and a fine illumination spot size, wherein the coarse illumination spot size is larger than the fine illumination spot size. More specifically, in these embodiments, the optical beam can be configured to project the coarse illumination spot size on the target waveguide device while the target waveguide device or the optical beam are moved relative to one another to increase the optical alignment signal.

Improved Optical System with Multiple Translatable Lenses

In another aspect, the disclosure provides improved optical systems for the delivery of optical energy to a target device in a controllable manner. Specifically, such optical systems include at least two translating lenses, positioned between the optical source and the target device, to control the delivery of light from a laser or other optical source through an optical beam in multiple directions.

Figure 10D:
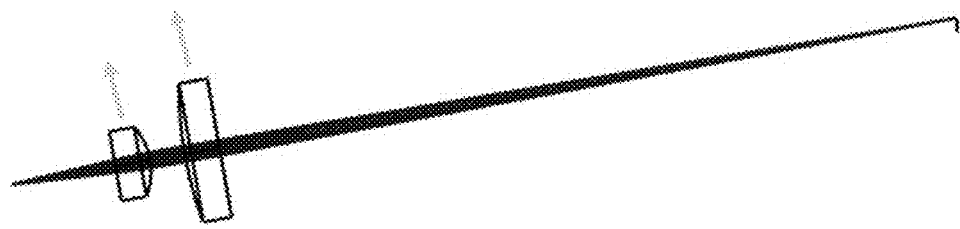
FIGS. 10A-10D illustrate the design and use of an optical source where the output beam is controlled in multiple dimensions by two translating lenses.
Figure 10C:
Figure 10B:
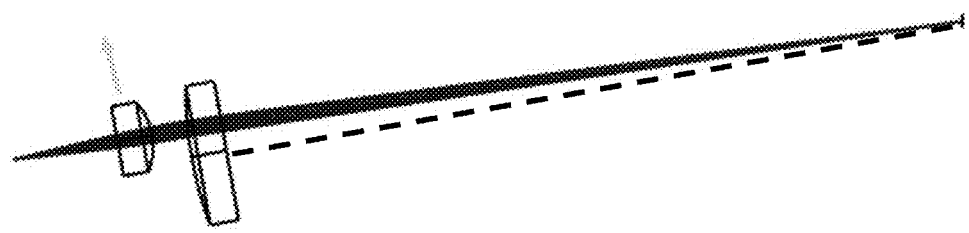
Figure 10A:
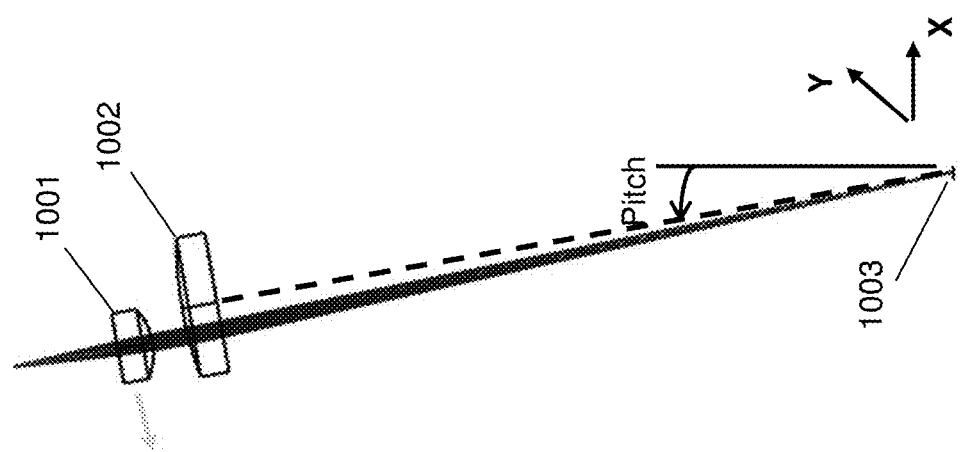

An exemplary schematic design of a single-beam optical system with two translatable lenses (also referred to as a "light pen") is illustrated in FIGS. 10A-10D. This design is significantly simpler and less expensive than that of a system comprising an optical source designed to simultaneously illuminate multiple input couplers on a chip. See, e.g., the "light brush" and other optical delivery devices described in U.S. Patent Application Publication Nos. 2016/0273034A1 and 2016/0363728A1. In the system for optical delivery illustrated in FIGS. 10A-10D, delivery of light from an optical source, for example a fiber, is controlled by at least two translating lenses positioned between the optical source (located at the top of each drawing) and a removable target waveguide device (located at the bottom of each drawing), where the optical beam is illustrated passing through the lenses in each drawing. In the illustrated design, light from the optical source is first collimated by a translatable collimator lens (1001), which is typically joined directly to the optical source, so that the collimator lens and the optical source (e.g., an optical fiber) can be moved in tandem. The collimated light is then focused by a translatable objective lens (1002) onto the input coupler of a target device (1003). It should be understood in this design that the target device preferably remains stationary as the lenses are translated. Existing designs of target waveguide devices (also referred to as "chips") primarily require the adjustment of an input optical beam along four axes: x, y, pitch angle, and yaw angle (i.e., a first direction, a second direction, a first angle, and a second angle), as illustrated in FIG. 10A. (Note that the yaw angle lays in the orthogonal plane relative to the page and is therefore not shown in the drawing. Error in yaw can often be very small, however, in which case control along the yaw axis may not be needed.) By moving the collimator lens and its associated optical source with respect to the objective lens (as indicated by the arrows in FIGS. 10A and 10B), the incoming (pitch or yaw) angle changes, while the spatial (x,y) position on the target device does not change. (The dashed line in FIGS. 10A and 10B is intended to indicate that the objective lens remains fixed in these examples.) By moving the optical source, the collimator, and the objective lenses together (as shown by the arrows in FIGS. 10C and 10D), the beam can be translated in the x or y spatial direction, as desired. Alternatively, if motions in the x and y directions are relatively small, and if coupling to the target device is not very sensitive to small changes in the incidence angle, the beam can be translated in the x or y direction by moving only the objective lens. For example, if the focal length of the objective lens is 100 mm, and the required x or y motion is at most about +/−300 µm, then the cross-coupling between the angle and the horizontal motion will lead to less than a +/−0.2 deg angle change in the incidence angle.

It should be understood that the just-described systems for optical analysis, in which at least two translating lenses are used to control the delivery of an optical signal from an optical source to a target device, are generally applicable to the coupling of optical signals from a variety of optical sources to a variety of target devices. In particular, these approaches are usefully applied in systems with target devices that have at least one optical coupler configured to receive the optical excitation beam through free space from the optical source. In some embodiments, the target waveguide device advantageously comprises a plurality of optical waveguides, the optical waveguides configured to receive the optical excitation beam from the at least one optical coupler. For example, the target waveguide device can comprise at least 2, at least 5, at least 10, at least 50, at least 100, at least 500, at least 1,000, at least 5,000, at least 10,000, or at least 50,000 optical waveguides. In some embodiments, the target waveguide device can comprise no more than 100,000, no more than 50,000, no more than 10,000, no more than 5,000, no more than 1,000, no more than 500, or no more than 100 optical waveguides. In other embodiments, the target waveguide device can comprise from 1 to 100,000, from 100 to 10,000, or from 500 to 5,000 optical waveguides.

In some embodiments, the target waveguide device of the disclosed systems comprises at least one optical splitter, wherein the at least one optical splitter comprises an optical input and a plurality of optical outputs, and wherein the optical input of the at least one optical splitter is configured to receive the optical excitation beam from the optical coupler. Such devices also typically comprise a plurality of optical waveguides, the optical waveguides configured to receive the optical excitation beam from the plurality of optical outputs of the at least one optical splitter.

In specific embodiments, the target waveguide device of the instant systems comprises no more than one optical coupler for providing illumination light to reaction regions. In other specific embodiments, the at least one optical splitter comprises 2 to 512 optical outputs.

The systems comprising at least two translating lenses, positioned between the optical source and the target device, to control the delivery of light from a laser or other optical source in multiple directions can also advantageously be combined with any of the other above-described systems and methods, including the more specific embodiments of those systems and methods. For example, in some embodiments, the optical source of the instant systems emits a broadband, multimodal optical excitation beam, for example an optical excitation beam comprising at least 3, at least 5, at least 10, at least 15, at least 20, at least 30, or at least 50 longitudinal modes. In some embodiments, the target waveguide device of the instant systems is any of the above-described target waveguide devices, including those configured to receive excitation light provided by counterpropagating optical beams.

Figure 11B:
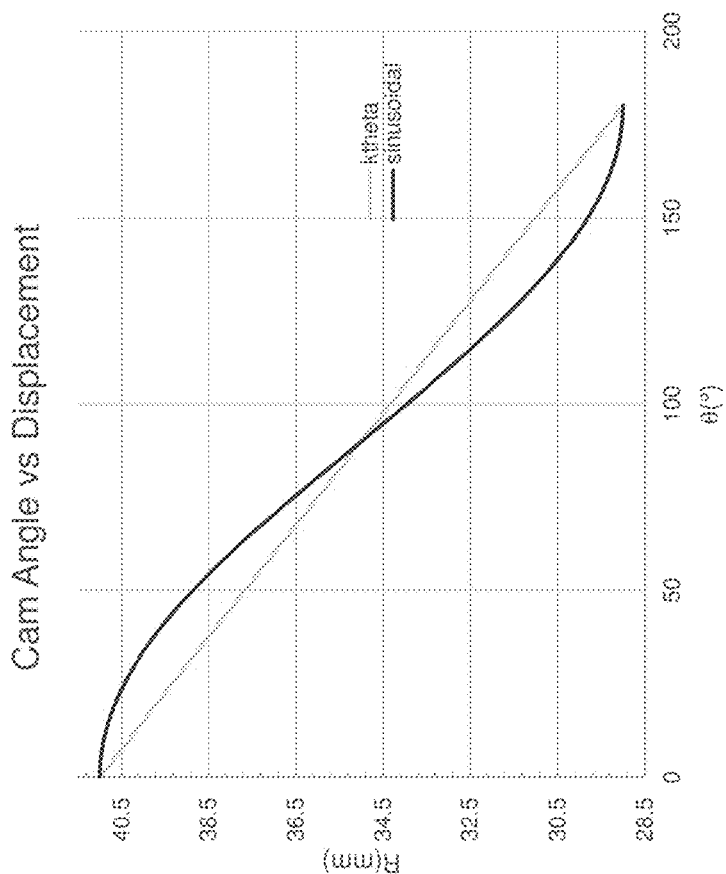
FIGS. 11A-11F illustrate design features of a high-accuracy lens actuation system comprising motor-driven eccentric cams.
Figure 11A:
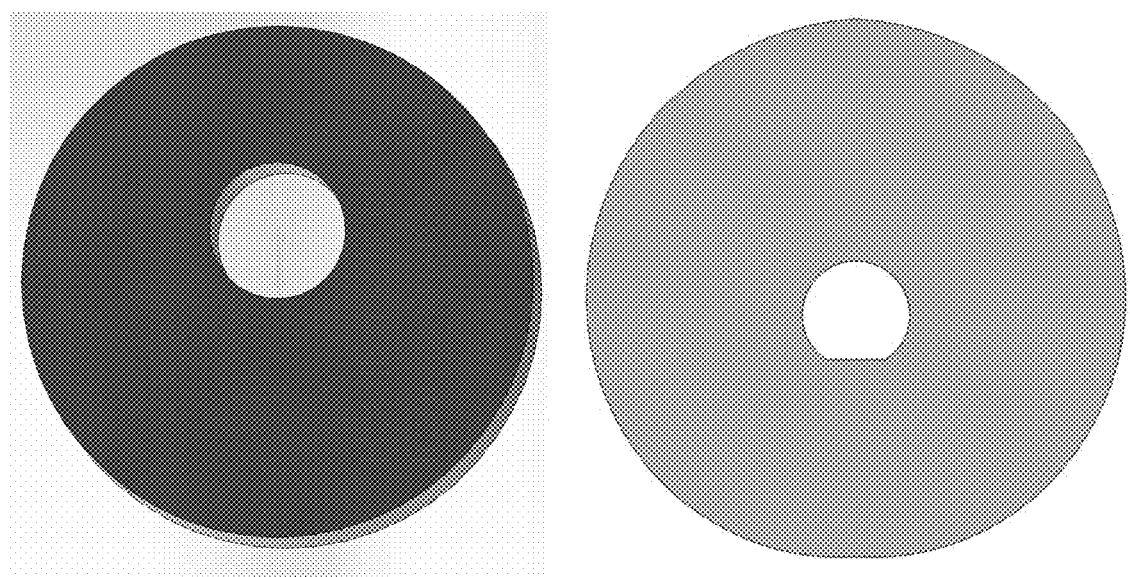

Control of the lenses is further improved in the instant systems through the use of an eccentric cam to facilitate fine motion of each lens in each dimension. FIG. 11A, for example, shows two views of a suitable cam with the rotational axis offset from the centroid of the cam. FIG. 11B shows the displacement of such an offset cam (in mm) as a function of the cam angle (in degrees) as the cam rotates around the axis. As should be apparent from the sinusoidal displacement curve, the use of such a device provides for highly controllable coarse and fine motion, depending on the need. Such eccentric cams can be driven by any suitable motor means, as would be understood by those of ordinary skill in the art. They are preferably driven using an inexpensive stepper motor, such as a stepper motor with an integrated planetary gearbox.

For an application where a lens is to be controlled along three degrees of freedom (e.g., along track (AT) spatial control, cross track (CT) spatial control, and pitch rotational control), an eccentric cam control can provide the following exemplary specifications:

| Property (AT/CT) | Value |
| --- | --- |
| Travel | +/− 1 mm |
| Resolution | 0.1 µm |
| Property (Pitch) | Value |
| Travel | +/− 5 mm |
| Resolution | 0.5 µm |

It should be understood, however, that a wide variety of other specified values can be achieved by varying the properties of the stepper motor and the dimensions and eccentricity of the cam, as would be understood by those of ordinary skill in the art.

Figure 11C:
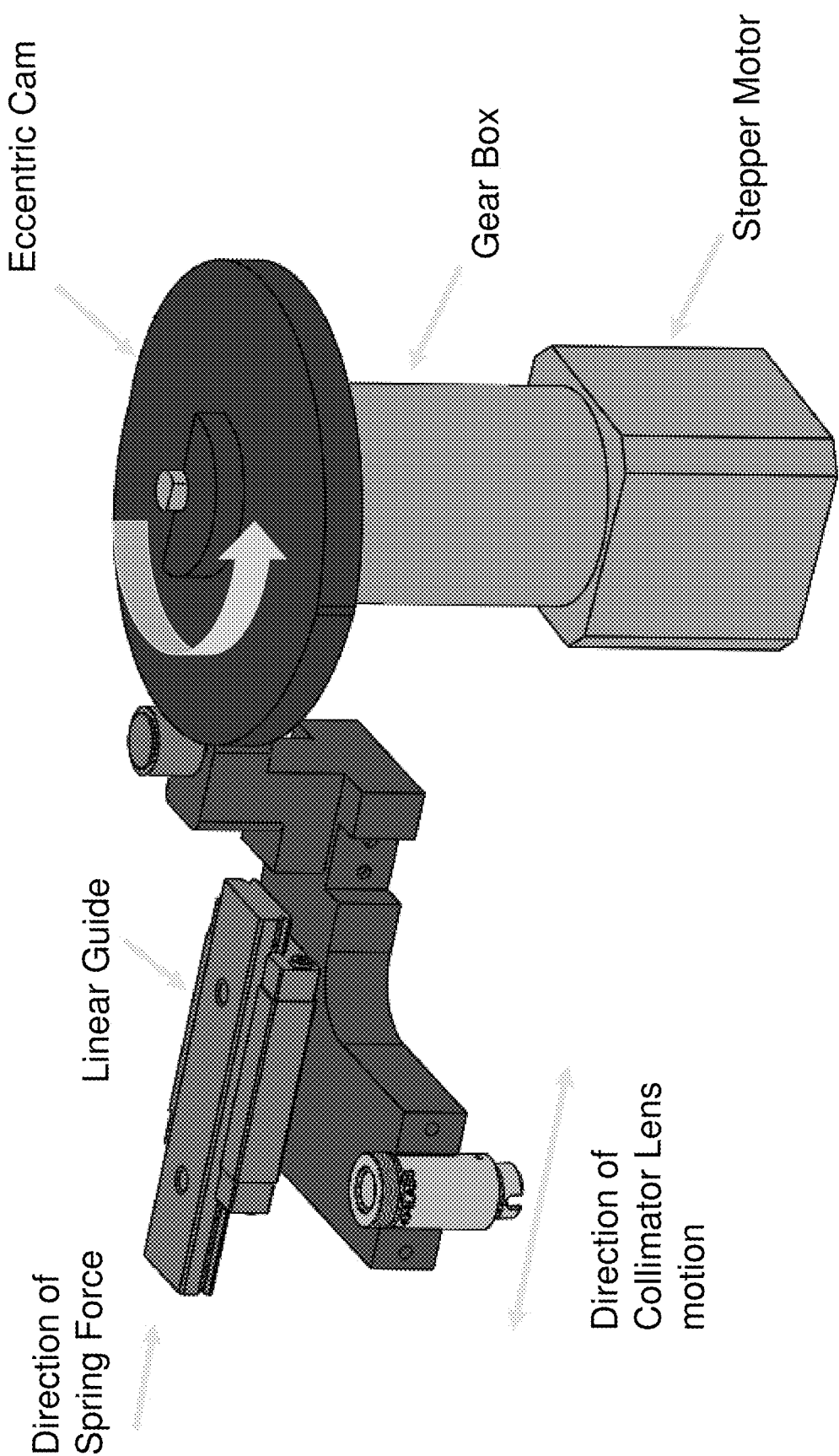

FIG. 11C illustrates how an eccentric cam controlling mechanism can be mechanically coupled to a lens, for example a collimator lens, to provide the desired fine motion control of the lens in a single dimension. FIG. 11C also illustrates other optional features and components of such a control mechanism, for example a "linear guide" mechanism, to maintain and control motion of the lens in a single direction, and a "spring force" mechanism, to provide a tensioning force between the lens-holding stage and the eccentric cam, as the cam is rotated by the stepper motor. A roller mechanism attached to the lens stage can also be used to provide a smooth connection between the eccentric cam and the lens stage, as shown in this drawing. The "stepper motor" and "gear box" are chosen to provide the desired functionality, as would be understood by those of ordinary skill in the art. For example, a stepper motor with an integrated planetary gearbox can be chosen to provide a 100:1 gear reduction, a 0.018° step size, a 4 Nm maximum torque, and can be non-backdriveable, but any suitable stepper motor and gear box can be chosen and adapted for use in the above drive systems provided the specifications are appropriate for the desired use.

Figure 11D:
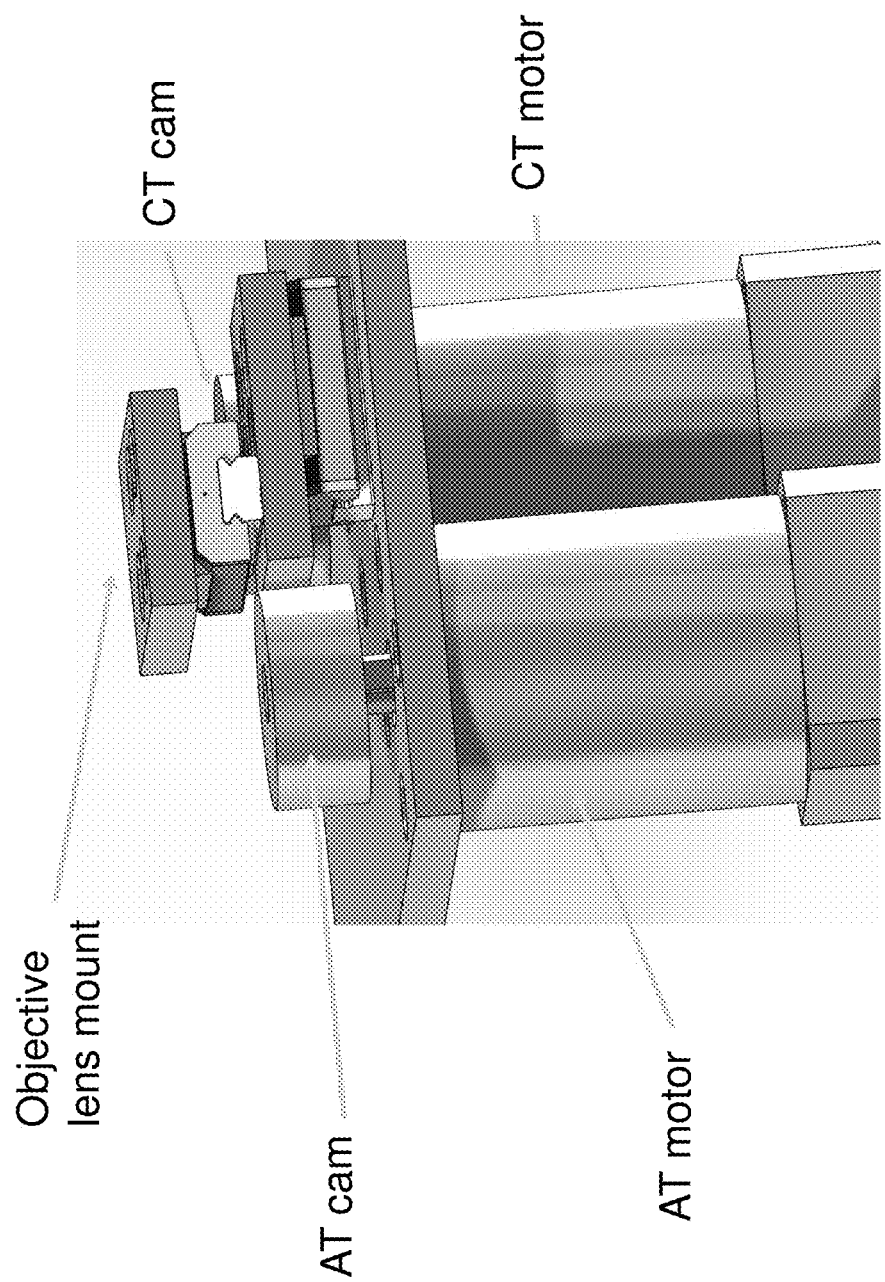
Figure 11E:
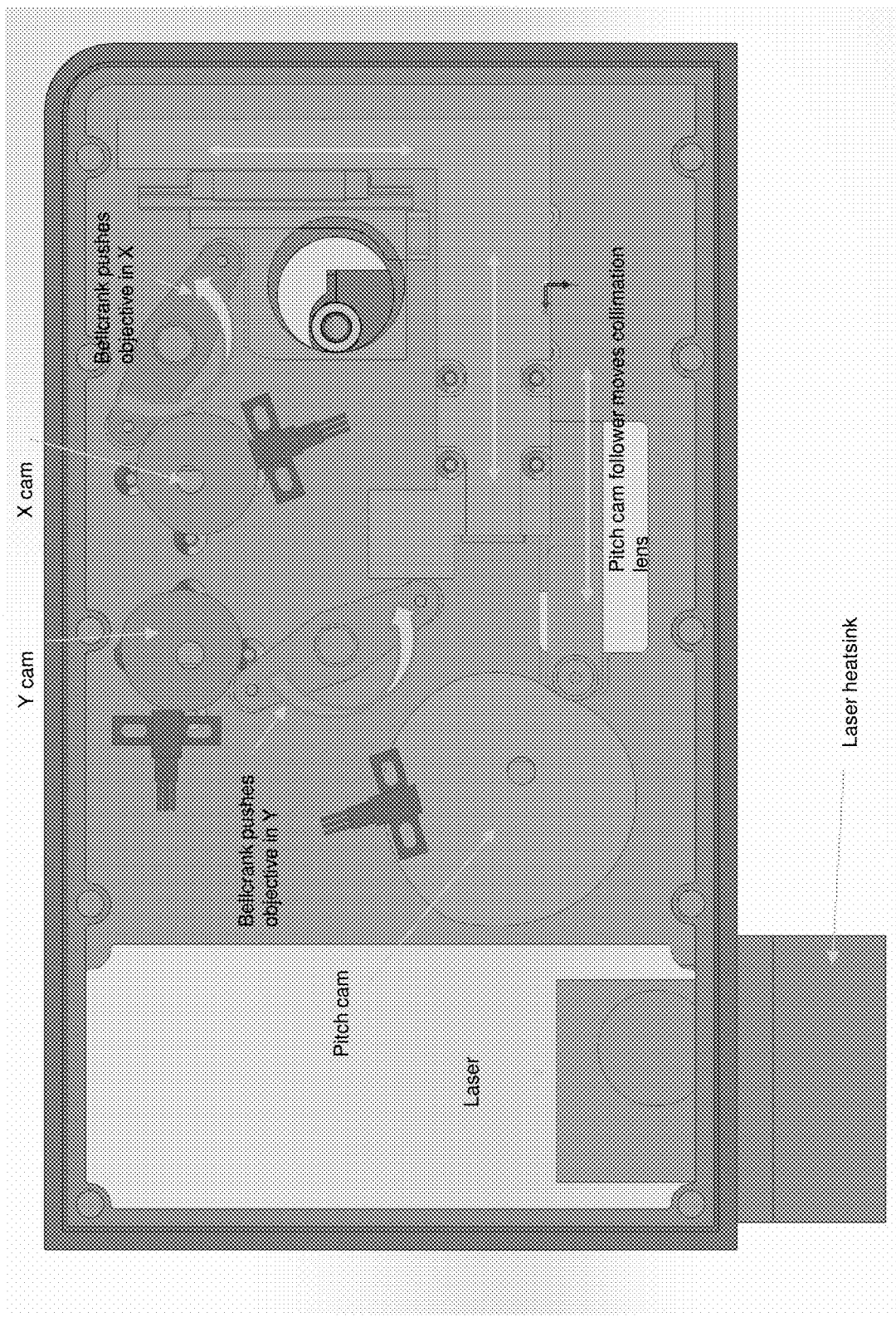
Figure 11F:
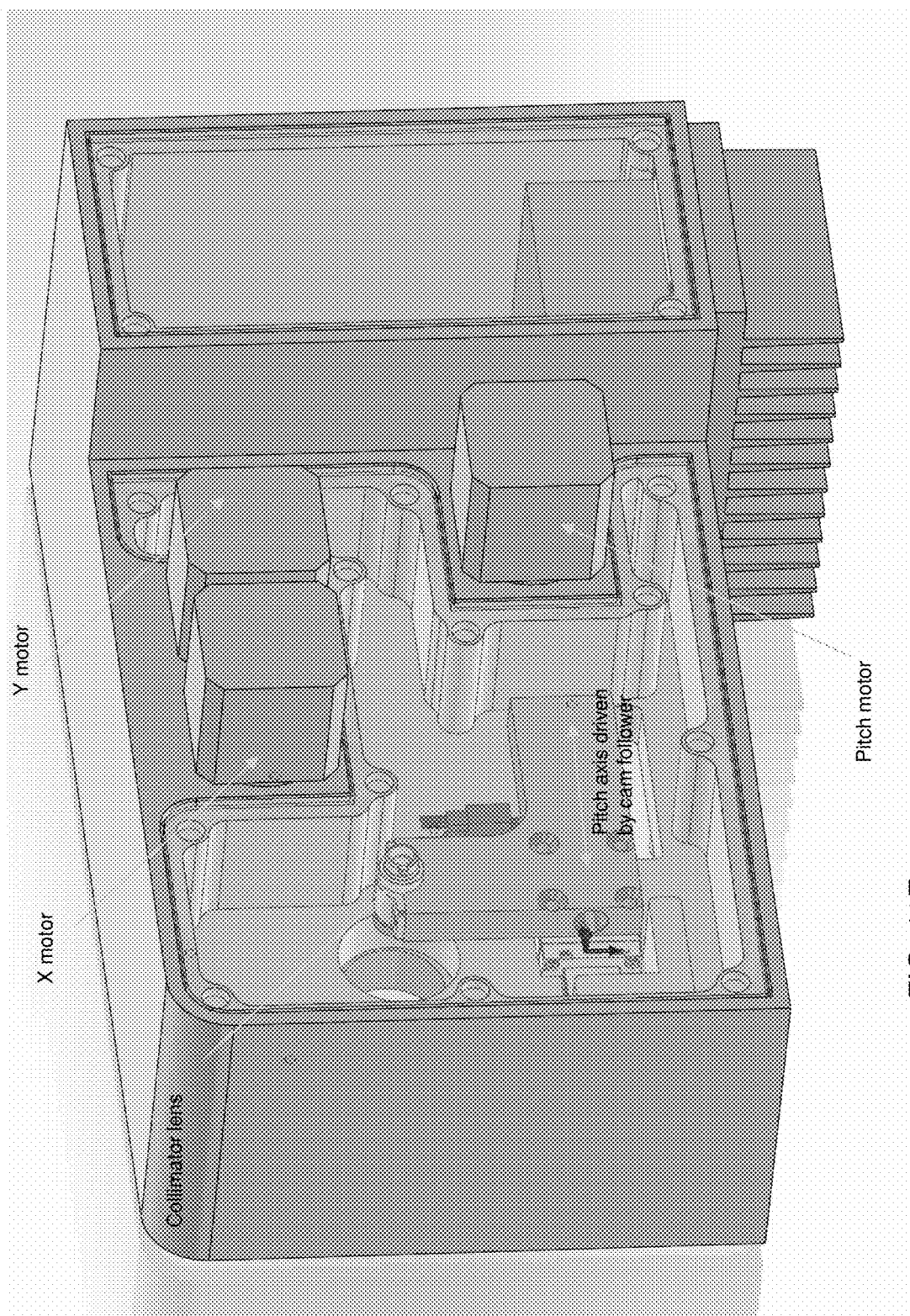

FIG. 11D illustrates the control of an objective lens in two spatial dimensions (AT and CT) using two stationary stepper motors and their associated eccentric cams to drive a lens mount along two orthogonal axes. FIGS. 11E and 11F provide two different views of an assembled optical alignment system that controls an objective lens in two orthogonal directions (X and Y) and that also controls the pitch angle of a collimation lens. Accordingly, in this system, fine motion control is provided for a lens-holding optical stage along three separate axes (e.g., AT, CT, and pitch). It should be understood that control of motion along additional axes (e.g., yaw, roll, and out-of-plane spatial control) can be readily achieved in such a system through the addition of suitable motor/cam/linear- or rotational-guide mechanisms for each additional axis of motion. Accordingly, in some embodiments of the instant systems, motion is controlled along four separate axes (e.g., AT, CT, pitch, and yaw). In still other embodiments, motion is controlled along five separate axes (e.g., AT, CT, pitch, yaw, and roll) or even six separate axes, in order to provide the desired relative positioning and alignment between the optical source and the target waveguide device.

It should be appreciated that the above designs provide significant advantages over traditional designs for controlling lens translation in two dimensions. Although in a traditional design, the motor controlling lens movement along the first directional axis (e.g., the AT axis) may be stationary, the motor and guide mechanism controlling lens movement along the second directional axis (e.g., the CT axis) is typically cantilevered off the AT guide mechanism. The weight of the motor and associated mechanical components can therefore significantly increase the costs of the AT components, which must overcome the inertia of the entire CT drivetrain.

As is particularly apparent in FIG. 11F, in the instant designs, all of the motors are preferably mounted on a housing or other rigid component of the system, so that the lenses can be moved along each axis without impacting the position or movement of the lenses along any other axis. Since the stepper motors are stationary, the payload moved by the motors is very light, providing significant improvement in performance over previous systems for optical control. Not shown in the systems of FIGS. 11E and 11F are springs for preloading each cam follower or a mechanism for moving the collimation lens along the "yaw" axis.

Other Embodiments

In another aspect, the disclosure provides additional embodiments, as described in the following numbered paragraphs.

1. A system for improved florescent analysis on a chip comprising illumination waveguides comprising:
   a laser that emits illumination light into free space, the emitted illumination light comprising multiple longitudinal modes spaced apart by at least 10 pm, each longitudinal mode having an intensity of 20% or more of the intensity of the most intense longitudinal mode, wherein the wavelength range of the shortest longitudinal mode to the longest longitudinal mode is between 10 pm and 20 nm; and
   a chip that receives the illumination light from free space, the chip comprising;
      a plurality of reaction regions;
      at least one waveguide that provides illumination light to the plurality of reaction regions, the reaction regions comprising fluorescent species that absorb the illumination light and emit fluorescent light; and
      a coupler that couples the illumination light into the at least one waveguide, and
      a detector that detects the emitted fluorescent light from the reaction regions.
2. The system of paragraph 1 wherein the multiple longitudinal modes comprise at least two longitudinal modes separated by at least 10 pm, wherein the intensity of each mode is 50% or more of the intensity of the most intense mode.
3. The system of paragraph 1 wherein the multiple longitudinal modes comprise at least four modes separated by at least 10 pm, wherein the intensity of each mode is 50% or more of the intensity of the most intense mode.
4. The system of paragraph 1 wherein the multiple longitudinal modes comprise at least eight modes separated by at least 30 pm, wherein the intensity of each mode is 50% or more of the intensity of the most intense mode.
5. The system of paragraph 1 wherein the multiple longitudinal modes comprise between 2 and 100 longitudinal modes, wherein the intensity of each mode is 50% or more of the intensity of the most intense mode.
6. The system of paragraph 1 wherein the wavelength range of the shortest longitudinal mode to the longest longitudinal mode is greater than 200 pm.
7. The system of paragraph 1 wherein the wavelength range of the shortest longitudinal mode to the longest longitudinal mode is greater than 1 nm.
8. The system of paragraph 1 wherein the wavelength range of the shortest longitudinal mode to the longest longitudinal mode is greater than 3 nm.
9. The system of paragraph 1 wherein the wavelength range of the shortest longitudinal mode to the longest longitudinal mode is between 200 pm and 10 nm.
10. The system of paragraph 1 further comprising optical elements, wherein the optical elements modulate the illumination light between the laser and the chip.
11. The system of paragraph 1 wherein the illumination light from the laser has greater than 80% of its intensity in a single transverse mode.
12. The system of paragraph 1 wherein the illumination light from the laser has greater than 50% of its intensity in a single transverse mode.
13. The system of paragraph 1 wherein the illumination light from the laser has greater than 10% of its intensity in a single transverse mode.

14. The system of paragraph 11 wherein the single transverse mode is a Gaussian mode.
15. The system of paragraph 1 further comprising a computer that receives electronic signals from the detector and analyzes the electronic signals.
16. The system of paragraph 1 wherein the analysis comprises obtaining nucleic acid sequencing information.
17. The system of paragraph 1 wherein the wavelength of the shortest longitudinal mode is from about 450 nm to about 700 nm.
18. The system of paragraph 1 wherein the wavelength of the shortest longitudinal mode is from about 500 nm to about 650 nm.
19. The system of paragraph 1 wherein the waveguide comprises a SiON core.
20. The system of paragraph 18 wherein the SiON core has a refractive index above about 1.6.
21. The system of paragraph 1 wherein the waveguide comprises a core surrounded by silicon dioxide.
22. The system of paragraph 1 wherein the at least one waveguide on the chip is dimensioned to carry a single transverse mode.
23. The system of paragraph 1 wherein the chip comprises a silicon chip.
24. The system of paragraph 1 wherein the detector comprises a CMOS sensor.
25. The system of paragraph 1 wherein the laser is fiber coupled, and the light emitted from the laser into free space is emitted from the fiber.
26. The system of paragraph 1 wherein the laser is coupled to a PLC through a fiber and the light emitted from the laser into free space is emitted from the PLC.
27. The system of paragraph 1 further comprising one or more optical elements disposed between the laser and the chip.
28. The system of paragraph 27 wherein the one or more optical elements comprise one or more lens, polarizer, wedge, filter, prism, mirror, or grating.
29. The system of paragraph 1 further comprising a computer that receives electronic information from the detector relating to the light detected by the detector and analyzes the information.
30. The system of paragraph 1 wherein the reaction regions comprise nucleic acids, and the analysis carried out by the computer includes determining nucleic acid sequence information.
31. The system of paragraph 1 wherein the at least one waveguide that provide illumination light to the plurality of reaction regions is illuminated from two ends with illumination light from the same laser, and the number of longitudinal modes is greater than 8.
32. The system of paragraph 1 wherein the plurality of reaction regions comprise nanoscale wells.
33. The system of paragraph 1 wherein the plurality of reaction regions comprise zero mode waveguides.
34. The system of paragraph 1 wherein the chip comprises a plurality of couplers.
35. The system of paragraph 34 wherein the chip has 2 to 16 couplers.
36. The system of paragraph 1 wherein the coupler couples light into a single waveguide, and that waveguide is split into between 2 and 512 waveguide branches within 3 mm of the coupler.
37. The system of paragraph 36 wherein the chip comprises a plurality of couplers and each coupler couples light into a single waveguide, and that waveguide is split into between 2 and 512 waveguide branches within 3 mm of the coupler.
38. The system of paragraph 1 wherein the coupler couples light into a single waveguide, and that waveguide is split into between 2 and 512 waveguide branches within 20% of the longest distance the light travels from the coupler to the area of interest through a waveguide branch.
39. The system of paragraph 38 wherein the chip comprises a plurality of couplers and each coupler couples light into a single waveguide, and that waveguide is split into between 2 and 512 waveguide branches within 20% of the longest distance the light travels from the coupler to the area of interest through a waveguide branch.
40. A method for carrying out fluorescence analysis on a chip comprising:
providing a laser that emits illumination light into free space, the emitted illumination light comprising multiple longitudinal modes, each longitudinal mode having an intensity of 20% or more of the intensity of the most intense longitudinal mode, wherein the wavelength range of the shortest longitudinal mode to the longest longitudinal mode is between 10 pm and 20 nm; and
illuminating a chip with the illumination light from free space, the chip comprising;
a plurality of reaction regions;
at least one waveguide that provides illumination light to the plurality of reaction regions, the reaction regions comprising fluorescent species that absorb the illumination light and emit fluorescent light; and
a coupler that couples the illumination light into the at least one waveguide, and
a detector that detects the emitted fluorescent light from the reaction regions.
41. The method of paragraph 40 wherein the multiple longitudinal modes comprise at least two longitudinal modes separated by at least 10 pm, wherein the intensity of each mode is 50% or more of the intensity of the most intense mode.
42. The method of paragraph 40 wherein the multiple longitudinal modes comprise at least four modes separated by at least 10 pm, wherein the intensity of each mode is 50% or more of the intensity of the most intense mode.
43. The method of paragraph 40 wherein the multiple longitudinal modes comprise at least eight modes separated by at least 30 pm, wherein the intensity of each mode is 50% or more of the intensity of the most intense mode.
44. The method of paragraph 40 wherein the multiple longitudinal modes comprise between 2 and 100 longitudinal modes, wherein the intensity of each mode is 50% or more of the intensity of the most intense mode.
45. The method of paragraph 40 wherein the wavelength range of the shortest longitudinal mode to the longest longitudinal mode is greater than 200 pm.
46. The method of paragraph 40 wherein the wavelength range of the shortest longitudinal mode to the longest longitudinal mode is greater than 1 nm.
47. The method of paragraph 40 wherein the wavelength range of the shortest longitudinal mode to the longest longitudinal mode is greater than 3 nm.
48. The method of paragraph 40 wherein the wavelength range of the shortest longitudinal mode to the longest longitudinal mode is between 200 pm and 10 nm.

49. The method of paragraph 40 further comprising optical elements, wherein the optical elements modulate the illumination light between the laser and the chip.
50. The method of paragraph 40 wherein the illumination light from the laser has greater than 80% of its intensity in a single transverse mode.
51. The method of paragraph 40 wherein the illumination light from the laser has greater than 50% of its intensity in a single transverse mode.
52. The method of paragraph 40 wherein the illumination light from the laser has greater than 10% of its intensity in a single transverse mode.
53. The method of paragraph 52 wherein the single transverse mode is a Gaussian mode.
54. The method of paragraph 40 further comprising a computer that receives electronic signals from the detector and analyzes the electronic signals.
55. The method of paragraph 40 wherein the analysis comprises obtaining nucleic acid sequencing information.
56. The method of paragraph 40 wherein the wavelength of the shortest longitudinal mode is from about 450 nm to about 700 nm.
57. The method of paragraph 40 wherein the wavelength of the shortest longitudinal mode is from about 500 nm to about 650 nm.
58. The method of paragraph 40 wherein the waveguide comprises a SiON core.
59. The method of paragraph 58 wherein the SiON core has a refractive index above about 1.6.
60. The method of paragraph 40 wherein the waveguide comprises a core surrounded by silicon dioxide.
61. The method of paragraph 40 wherein the at least one waveguide on the chip is dimensioned to carry a single transverse mode.
62. The method of paragraph 40 wherein the chip comprises a silicon chip.
63. The method of paragraph 40 wherein the detector comprises a CMOS sensor.
64. The method of paragraph 40 wherein the laser is fiber coupled, and the light emitted from the laser into free space is emitted from the fiber.
65. The method of paragraph 40 wherein the laser is coupled to a PLC through a fiber and the light emitted from the laser into free space is emitted from the PLC.
66. The method of paragraph 40 further comprising one or more optical elements disposed between the laser and the chip.
67. The method of paragraph 66 wherein the one or more optical elements comprise one or more lens, polarizer, wedge, filter, prism, mirror or grating
68. The method of paragraph 40 further comprising a computer that receives electronic information from the detector relating to the light detected by the detector and analyzes the information.
69. The method of paragraph 40 wherein the reaction regions comprise nucleic acids, and the analysis carried out by the computer includes determining nucleic acid sequence information.
70. The method of paragraph 40 wherein the chip comprises a plurality of couplers.
71. The method of paragraph 40 wherein the chip has 2 to 16 couplers.
72. The method of paragraph 40 wherein the coupler couples light into a single waveguide, and that waveguide is split into between 2 and 512 waveguide branches within 3 mm of the coupler.
73. The method of paragraph 72 wherein the chip comprises a plurality of couplers and each coupler couples light into a single waveguide, and that waveguide is split into between 2 and 512 waveguide branches within 3 mm of the coupler.
74. The method of paragraph 40 wherein the coupler couples light into a single waveguide, and that waveguide is split into between 2 and 512 waveguide branches within 20% of the longest distance the light travels from the coupler to the area of interest through a waveguide branch.
75. The method of paragraph 74 wherein the chip comprises a plurality of couplers and each coupler couples light into a single waveguide, and that waveguide is split into between 2 and 512 waveguide branches within 20% of the longest distance the light travels from the coupler to the area of interest through a waveguide branch.
76. A system for improved florescent analysis on a chip comprising illumination waveguides comprising:
a plurality of lasers each having output illumination;
combining optical elements that combine the output illumination from the plurality of lasers, wherein the combining optical elements emit the combined output illumination into free space, the emitted illumination light comprising multiple longitudinal modes spaced apart by at least 10 pm, each longitudinal mode having an intensity of 20% or more of the intensity of the most intense longitudinal mode, wherein the wavelength range of the shortest longitudinal mode to the longest longitudinal mode is between 10 pm and 20 nm; and
a chip that receives the illumination light from free space, the chip comprising;
a plurality of reaction regions;
at least one waveguide that provides illumination light to the plurality of reaction regions, the reaction regions comprising fluorescent species that absorb the illumination light and emit fluorescent light; and
a coupler that couples the illumination light into the at least one waveguide, and
a detector that detects the emitted fluorescent light from the reaction regions.

The chips of any of the above systems and methods can in some embodiments comprise at least one coupler.

It should be understood that the terms "chip" and "target waveguide device" are generally used interchangeably herein, unless the context makes clear otherwise.

It will be readily apparent to one of ordinary skill in the relevant arts that other suitable modifications and adaptations to the analytical devices and systems described herein can be made without departing from the scope of the invention or any embodiment thereof. Having now described the present invention in detail, the same will be more clearly understood by reference to the following Examples, which are included herewith for purposes of illustration only and are not intended to be limiting of the invention.

Examples

Illumination and Measurement from Waveguides

Figure 9:
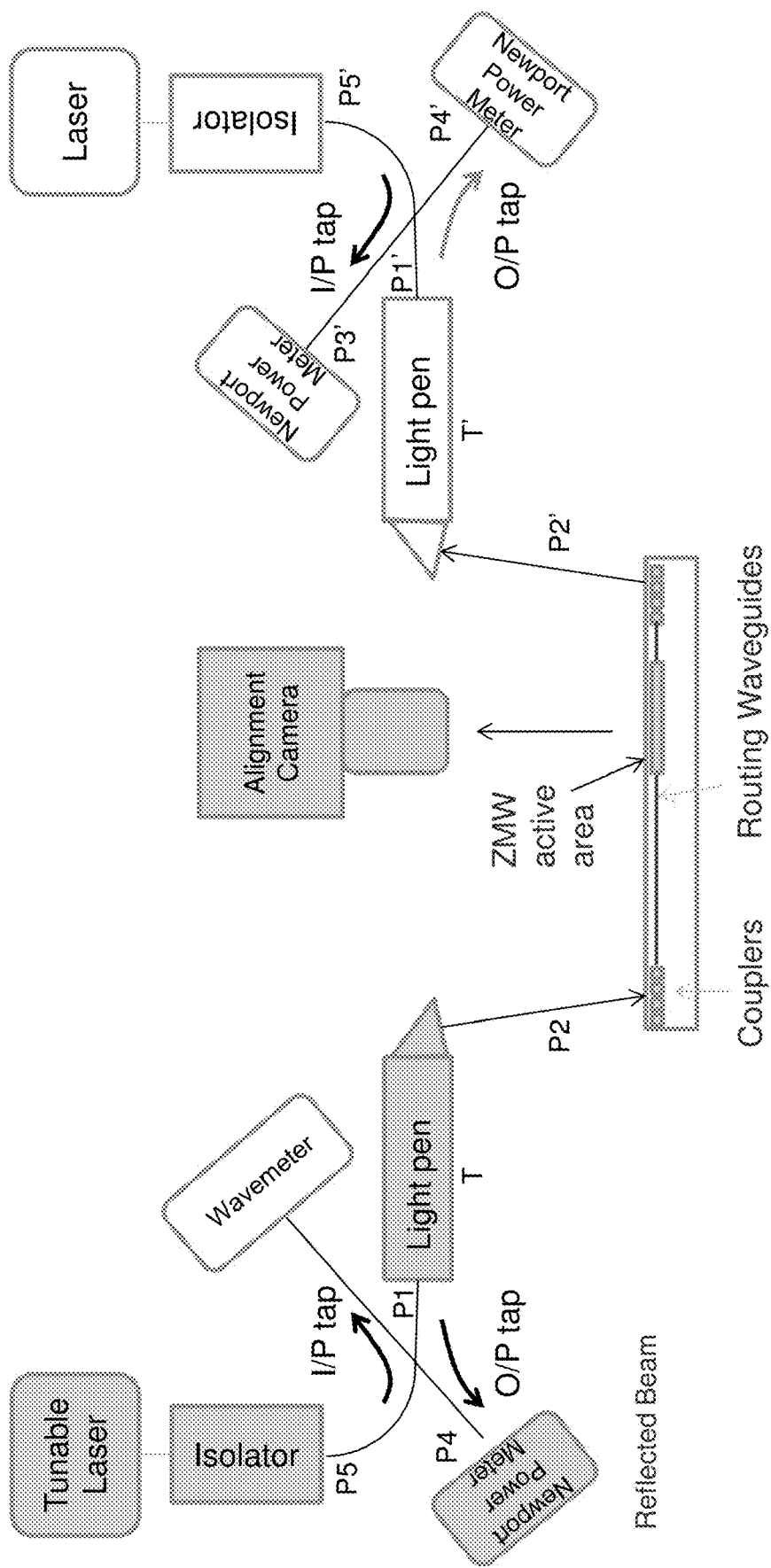
FIG. 9 shows a setup used for sending light into a waveguide and measuring the amount of light transmitted as well as the amount of light reflected over time.

FIG. 9 shows a typical setup that can be used for sending light into a target waveguide device and measuring the amount of light transmitted as well as the amount of reflected over time. The light can either be delivered to one side of the target device using one of the lasers or to both sides of the device using both lasers. The alignment camera measures light sent through the waveguides and then coupled out of the device. The target device includes a zero mode waveguide (ZMW) region for carrying out fluorescent analyses, such as single molecule real time sequencing as described herein.

Time-Dependent Back Reflection

Figure 12:
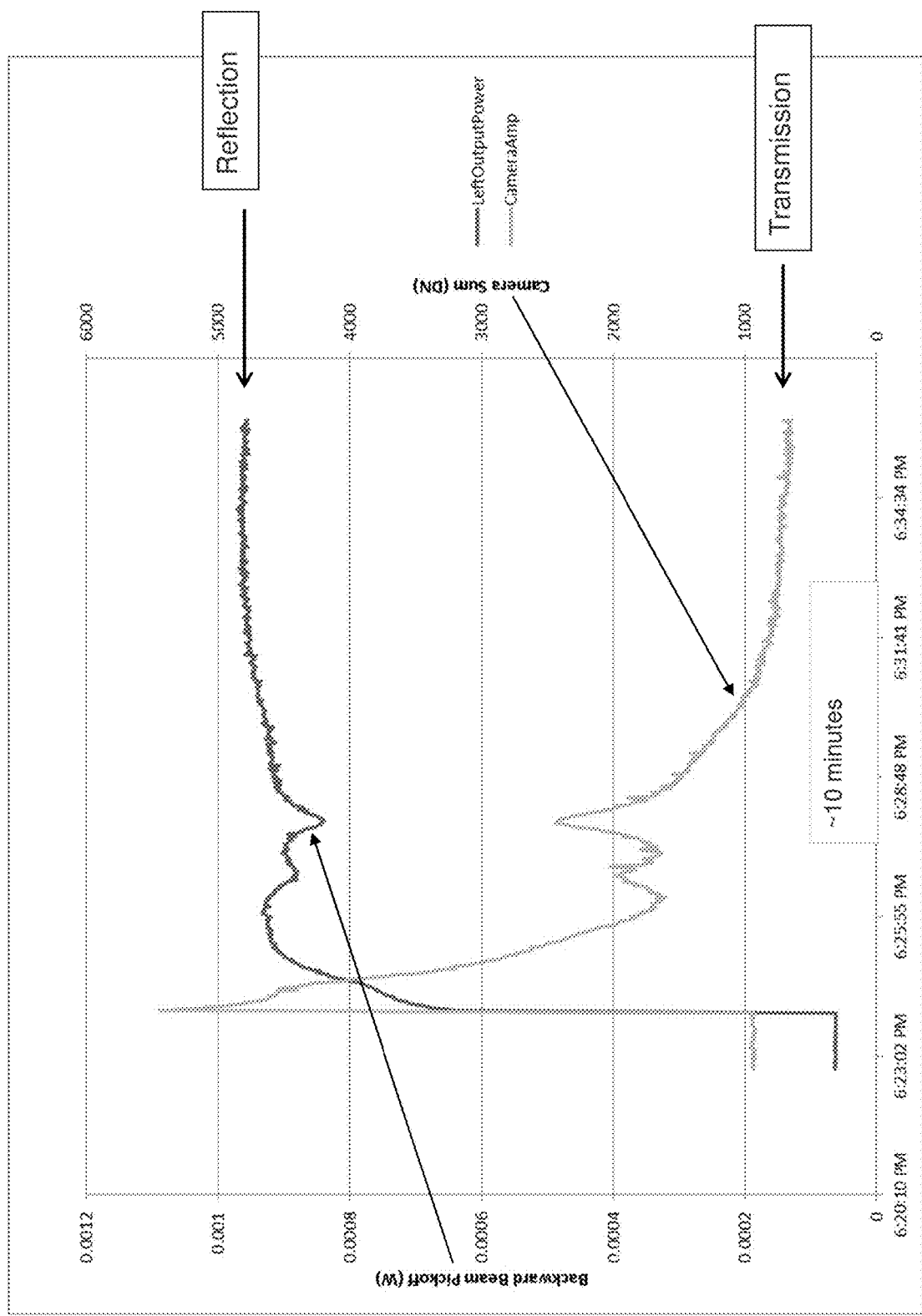
FIG. 12 shows a set of measurements that illustrate time-dependent back reflection and decrease in transmitted power.

FIG. 12 shows a set of measurements that illustrate the time-dependent back reflection. Light is sent into the waveguide at about 532 nm. The top curve, axis to the left, shows reflected light over time. The lower curve, axis to the right, shows transmitted light. It can be seen that over time there is a buildup in back reflection that occurs at the expense of transmitted light.

Improved Transmission with Laser Having Multiple Longitudinal Modes

Figure 13:
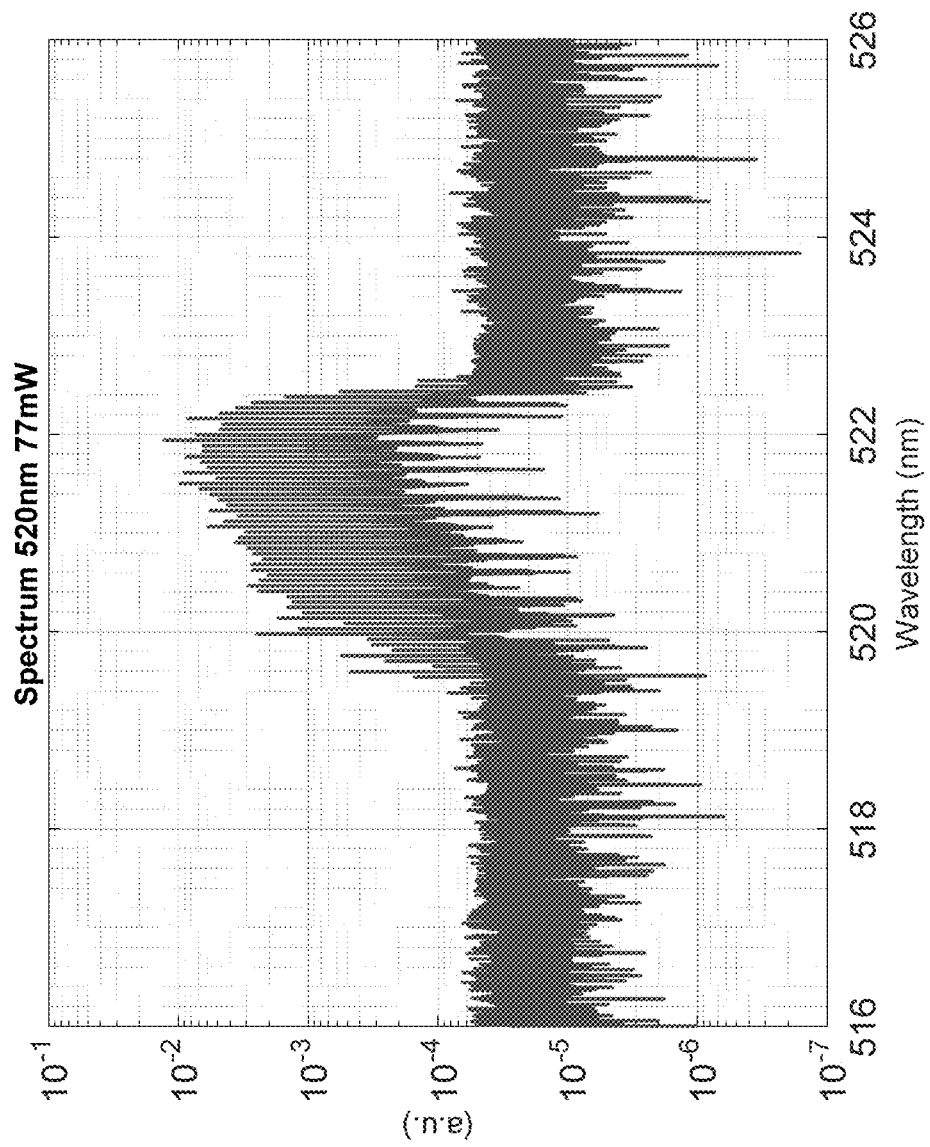
FIG. 13 shows the optical spectrum around 520 nm of illumination light having multiple longitudinal modes for use in reducing or eliminating link-efficiency variation (LEV) in an optical waveguide.
Figure 14:
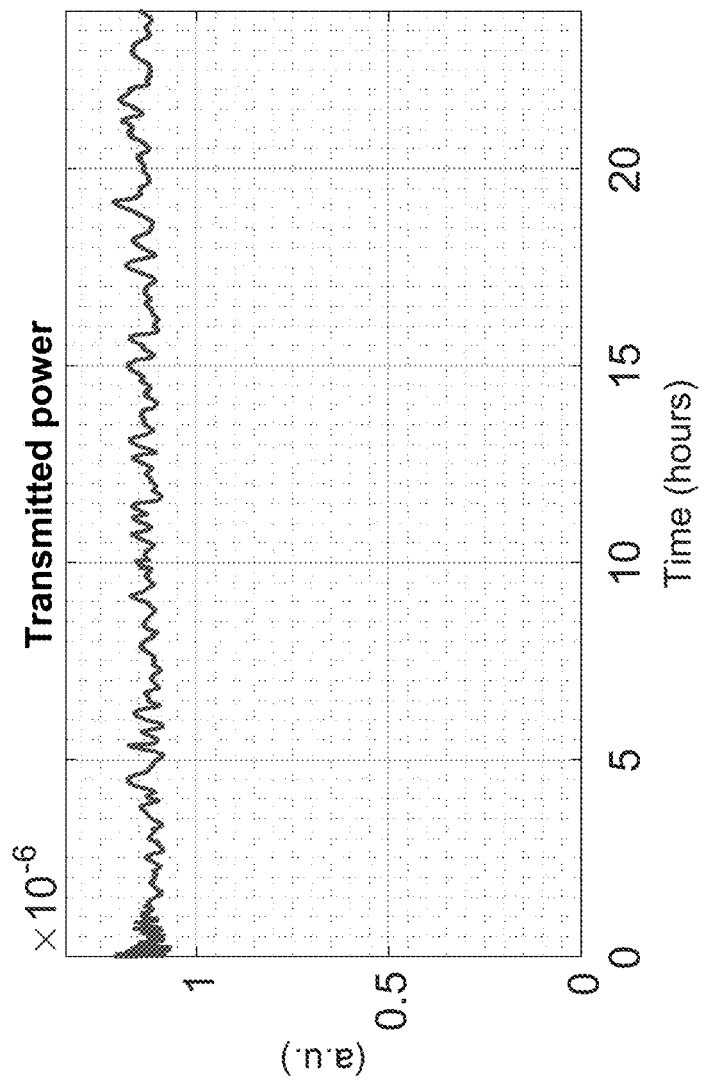
FIG. 14 shows transmitted power over time through a waveguide, demonstrating that LEV is not observed in a system using light having multiple longitudinal modes.
Figure 15:
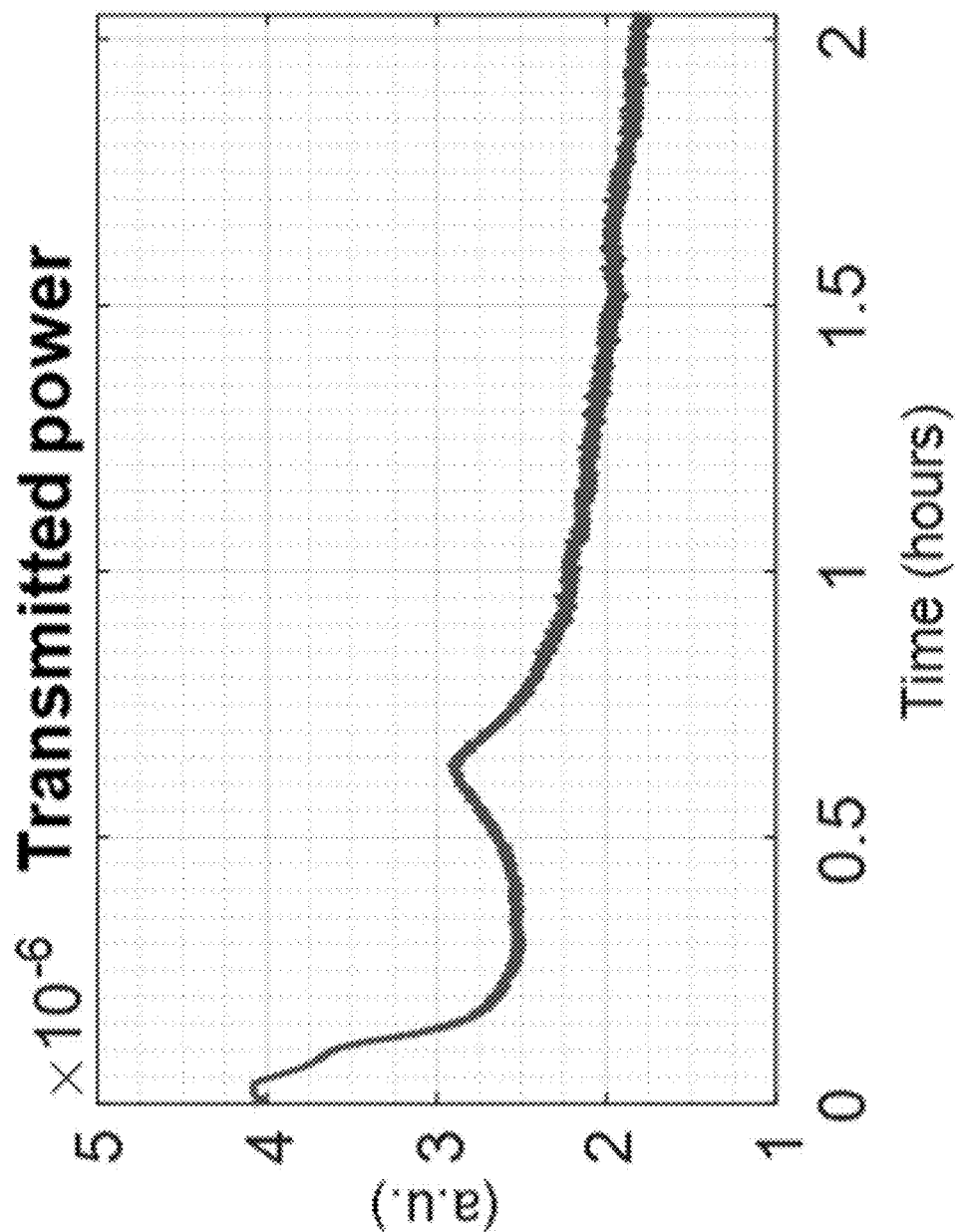
FIG. 15 shows a control experiment with the same waveguide as in FIG. 13 illuminated with a laser having a single, or only a few, longitudinal modes.

This experiment demonstrates the effectiveness of using a laser with multiple longitudinal modes to reduce or eliminate back reflection from a waveguide. Specifically, FIG. 13 shows the wavelength spectrum of the output from a 522 nm broadband direct band gap diode laser. The laser has a single transverse spatial mode structure with beam quality $M^2 \sim 1.2$ (nearly diffraction limited). As can be seen in FIG. 13, the laser displays multiple longitudinal modes, which make it broadband with spectral linewidth (wavelength range) of ~1-2 nm. For this particular optical system, the maximum fiber coupled power output is about 55 mW, and the temporal stability is +/-0.5%. FIG. 14 shows that no LEV was observed during a 24-hour exposure when the broadband laser with the maximum incident laser power of 54 mW was coupled to a target device with SiON waveguides. FIG. 15 shows a control experiment on the same target device, when the device was illuminated with 532 nm single longitudinal mode laser at comparable laser power. As is clear from this experiment, there is a significant drop in transmitted power over two hours when using the single longitudinal mode laser. This drop in transmitted power is characteristic of LEV.

Nucleic Acid Sequencing

As described above, the instant inventors have discovered that the poor performance typically observed using counterpropagated, single-wavelength, narrowband optical excitation in a target waveguide device can be overcome through the use of a broadband multi-mode laser input source. The utility of this approach has been demonstrated in exemplary DNA sequencing experiments using a PacBio® Sequel® chip that has been illuminated by light from a single broadband, multi-mode laser source. Specifically, in the demonstration system, excitation power was provided from the single laser source by splitting the laser output and coupling the separate beams into a DNA sequencing device, for example a device having the optical pathways illustrated in the device of FIG. 8B. In these experiments, the optical input was provided by a direct band-gap multi-mode InGaN semiconductor diode laser, which delivered a fiber-coupled power of up to 55 mW (77 mW laser head power), a central wavelength of about 522 nm, and a spectral bandwidth of approximately 2 nm. This laser source is well coupled into the target device and, as shown in FIG. 14, eliminates the generation of LEV in the target optical waveguides.

Figure 16:
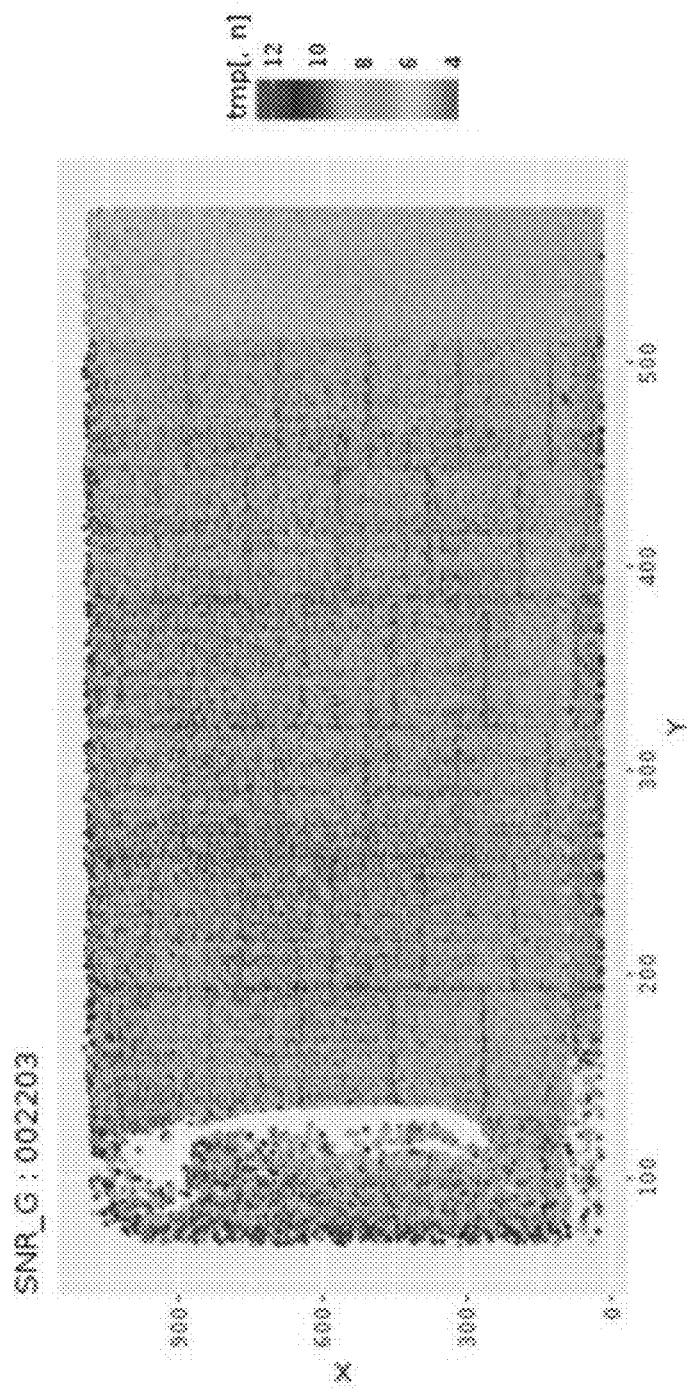
FIG. 16 shows a signal-to-noise ratio heat map of a DNA sequencing waveguide device where excitation is provided by counterpropagated light from a single split-beam multimode laser source.

A signal-to-noise ratio heat map generated from such an exemplary DNA sequencing reaction using the above-described laser source and target device is illustrated in FIG. 16, where the laser power at the head was 37 mW, and the power per cell input coupler was 2.4 mW. A 30 kB *E. coli* fragment was sequenced for 10 hours in this experiment. The SNR heat map shown in FIG. 16 was obtained from a 5 minute movie that was captured early in the sequencing run. Results of this sequencing run showed an 88.7% accuracy, a 10.1 kB read-length, and a 2.0 GB sequencing yield on just one half of a standard Sequel® chip.

Figure 17:
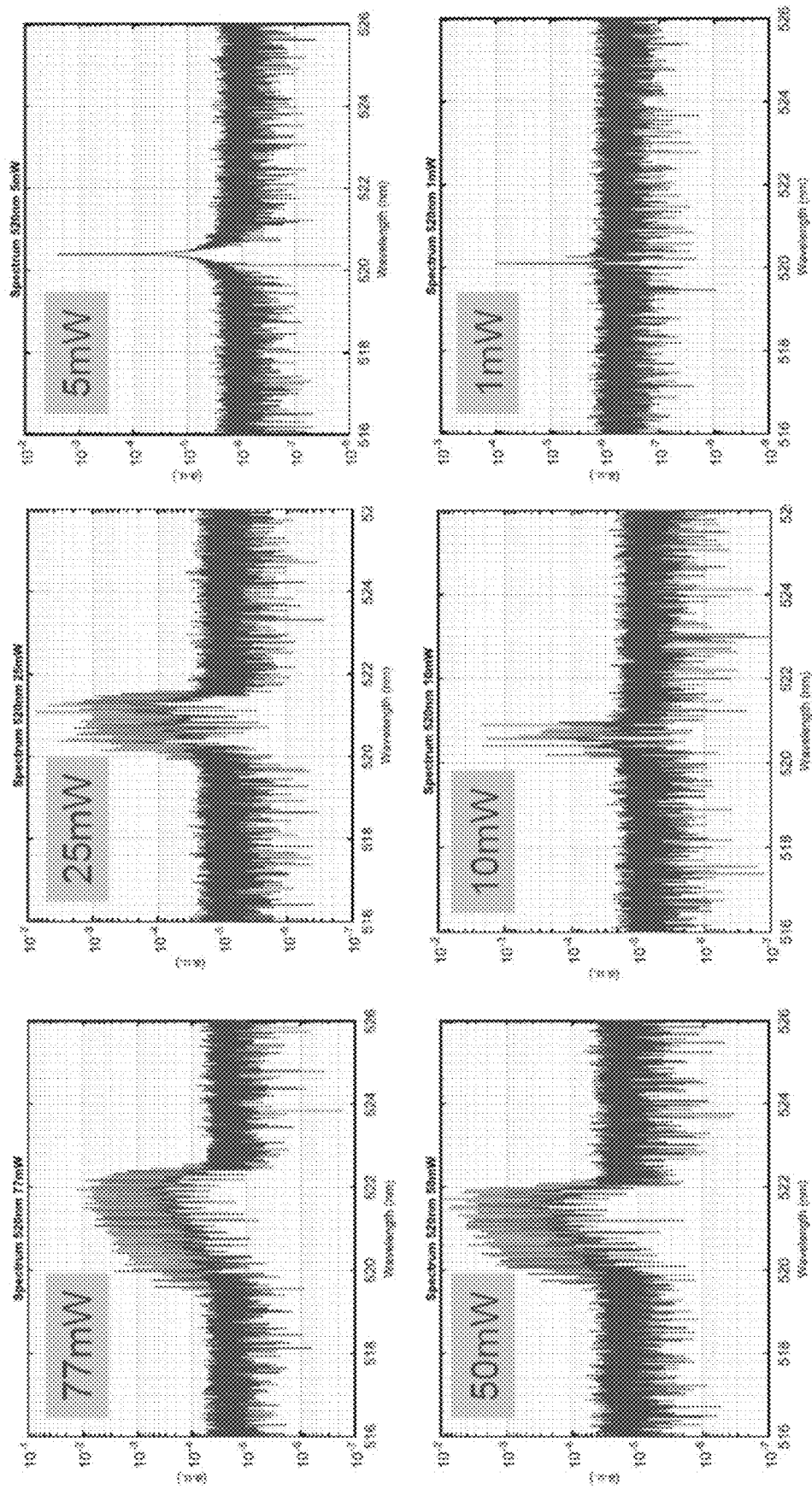
FIG. 17 shows the effect of laser power on spectrum bandwidth of illumination light.
Figure 18:
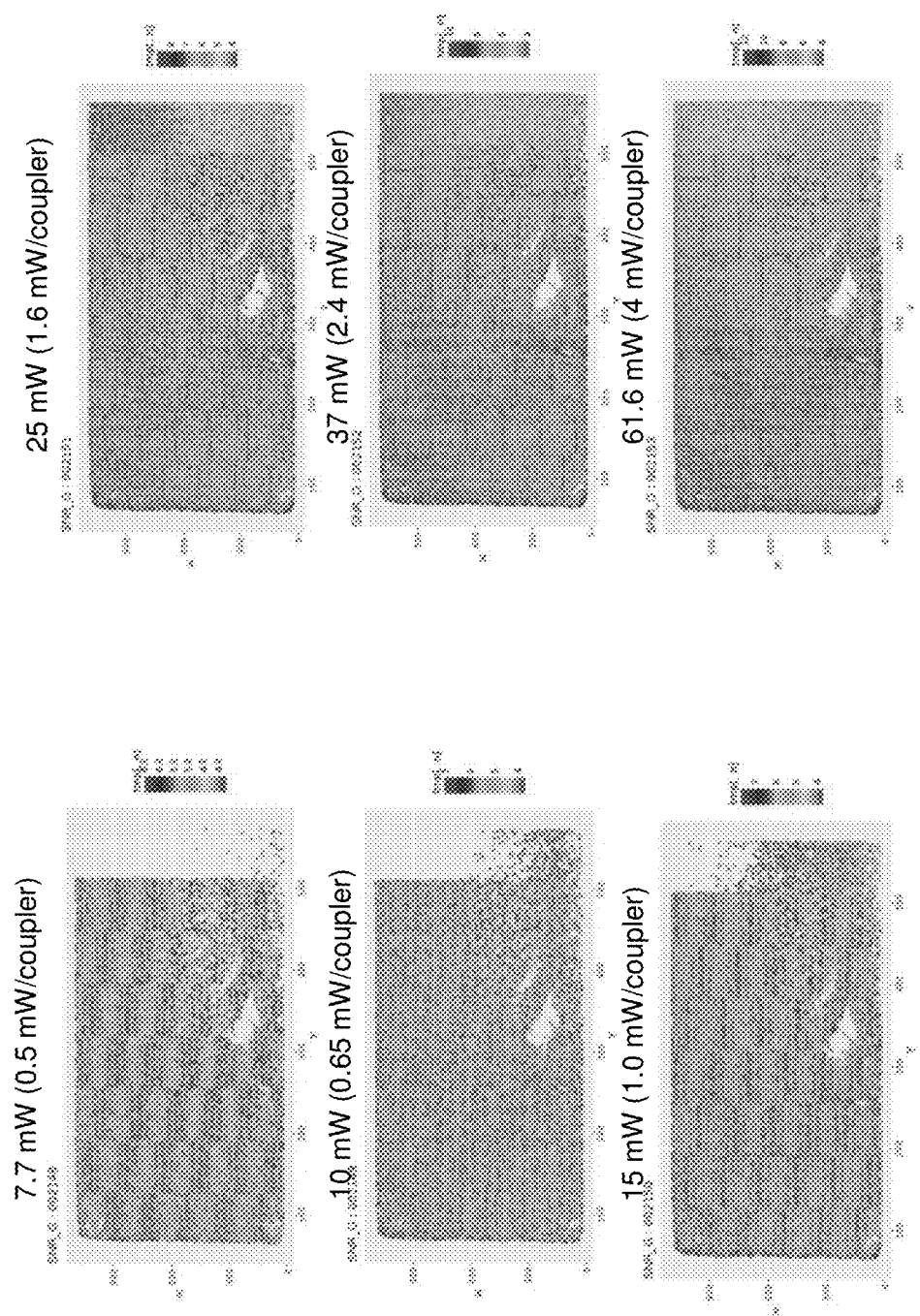
FIG. 18 shows the effect of laser power on signal-to-noise ratio heat maps from a DNA sequencing waveguide device.

FIG. 17 illustrates the effect of laser power on wavelength bandwidth. As can be seen in this comparison, the spectrum of a 522 nm multimode laser starts to narrow significantly as the power of the laser is decreased below about 20 mW. FIG. 18 illustrates the effect of laser coherence on sequencing SNR heatmaps, and the corresponding sequencing accuracy, as laser power is decreased. As can be seen in this example (including the analysis described below for FIG. 20), a significant decrease in sequencing accuracy is observed where the laser head power is decreased below about 20 mW.

Figure 19:
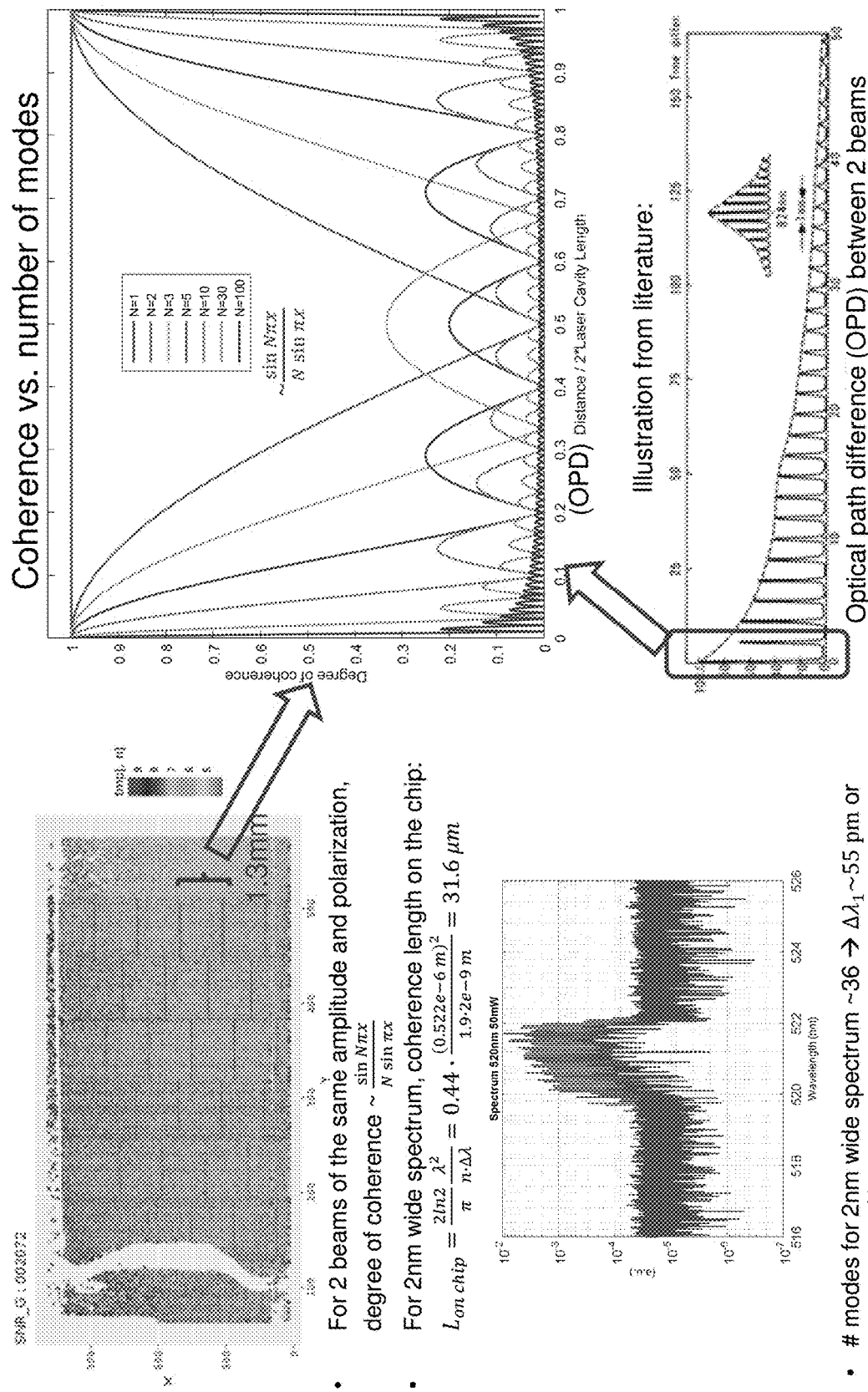
FIG. 19 shows the relationship between laser coherence, optical modes, spectral width, and optical path difference.

FIG. 19 describes the relationship between laser coherence, optical modes, spectral width, and optical path difference (OPD). According to the optical coherence theory, the laser coherence length in the chip active area can be estimated as $$L = \left(\frac{2\ln 2}{\pi}\right) \cdot \frac{\lambda^2}{n_{chip} \cdot \Delta\lambda},$$

where $\lambda$ is the laser central wavelength, $\Delta\lambda$ is the laser spectral width, and $n_{chip}$ is the active area waveguide device index of refraction. The index of refraction $n_{chip}$ can be estimated using a typical laser spectrum, as shown in the lower left portion of FIG. 19. The illustrated spectrum has about 36 optical longitudinal modes spanning ~2 nm, giving a mode spacing of $\Delta\lambda_1 \sim 55$ pm or $\Delta v_1 \sim 0.61 \cdot 10^{11}$ Hz. According to optical coherence theory, the mode spacing defines the spatial periodicity ($L_{chip}$) of the coherence in the active area of the target device:

$$\Delta v_1 = \frac{c}{2 \cdot n_{chip} \cdot L_{chip}}.$$

Accordingly, for an experimentally measured spatial period of coherence spikes of ~1.3 mm on the sensor (see, e.g., the SNR heat map in the top left portion of FIG. 19) the refractive index $n_{chip}$ of the active area is estimated to be 1.9.

Using the formula referenced above, for a 2 nm wide 522 nm laser spectrum and n~1.9, and as shown in the top left portion of FIG. 19, the coherence length on the target device can be estimated to be about 31.6 pm. Since the coherence fringes are repeating in the active area of the cell, with the period of ~1.3 mm, less than about 3% of ZMWs are experiencing higher coherence and even for smaller percentage of ZMWs it results in significant yield loss. Experimentally comparing yields for illumination scheme using the self-counter-propagation from one laser vs. counter-propagation from two lasers no yield difference was observed given the experimental uncertainty.

As the upper right portion of FIG. 19 illustrates, the degree of laser coherence is a strong function of the number of modes and for two beams of the same amplitude and polarization can be theoretically described by the following dependence $$\sim \frac{\sin N\pi x}{N \sin \pi x},$$

where x is the OPD between the self-counter-propagating beams with respect to the zero OPD point normalized by the period of the coherence function. (See, e.g., R. J. Collier, C. B. Burckhardt, L. H Lin, Optical Holography, Academic Press Inc, 1971, pp. 146-150.) It can be seen that when the number of longitudinal laser modes is greater than about 30, the coherence function has very narrow spatial peaks, but as the number of modes is reduced, it becomes wider.

These coherence fringes are observed to repeat with a spatial period of 1.3 mm. Their amplitude decays on the characteristic spatial scale which is defined by the spectral width of an individual laser mode. In the case of a typical CW laser diode, the coherence function is expected to decrease exponentially with distance with a very long characteristic spatial scale length (>10 m). No appreciable decay of the coherence peaks is therefore observed across the active area, which is only about 1 cm wide. It should be noted that the spatial coherence fringe period observed in the active area is directly related to the laser cavity length and its effective index of refraction $n_{chip}L_{chip}=n_L L_{cavity}$.

The lower right portion of FIG. 19 illustrates the appearance of a slowly decaying coherence function. (This figure is adapted from Epworth (1982) "The Temporal Coherence of Various Semiconductor Light Sources Used in Optical Fibre Sensors" in "Fiber-Optic Rotation Sensors and Related Technologies", Eds. S. Ezekiel and H. J. Arditty, pp. 237-244.)

Figure 20:
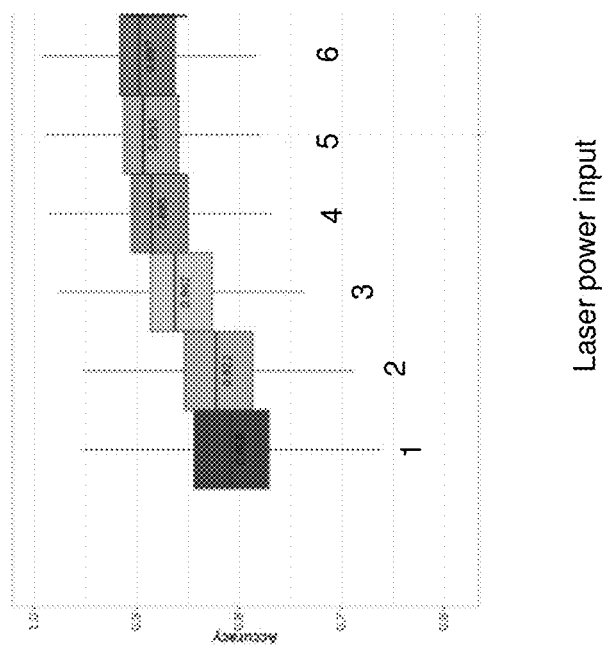
FIG. 20 shows the effect of laser power and spectral width on sequencing accuracy in a DNA sequencing reaction using a waveguide device.

The data from the DNA sequencing experiments illustrated in FIGS. 17, 18, and 20 provide additional support to the notion that high degree of coherence is undesirable for active area illumination. As the number of longitudinal modes (or spectral bandwidth) is reduced at a low laser power (e.g., as shown in FIG. 17), SNR heatmaps exhibit significantly larger spatial variations (see FIG. 18). FIG. 20 also shows that the accuracy of sequencing data decreases as the laser spectrum gets narrower. The six data points in FIG. 20 correspond to the following conditions: (1) a 7.7 mW laser input (~0.5 mW per coupler), (2) a 10 mW laser input (~0.65 mW per coupler), (3) a 15 mW laser input (~1.0 mW per coupler), (4) a 25 mW laser input (~1.6 mW per coupler), (5) a 37 mW laser input (~2.4 mW per coupler), or (6) a 61.6 mW laser input (~4 mW per coupler).

Camera Free Laser-to-Chip Alignment

Figure 21B:
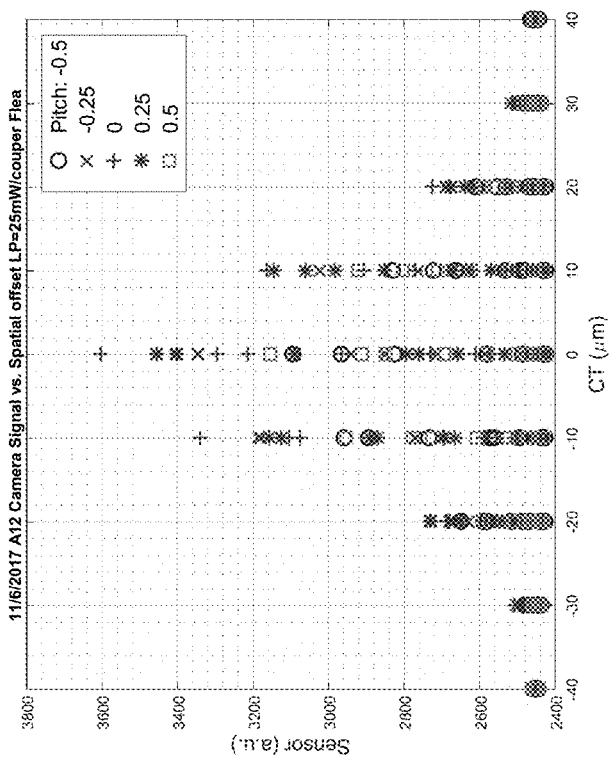
FIGS. 21A-21C illustrate requirements for achieving coarse alignment between a laser beam and an input coupler on a target waveguide without using an alignment camera.
Figure 21A:
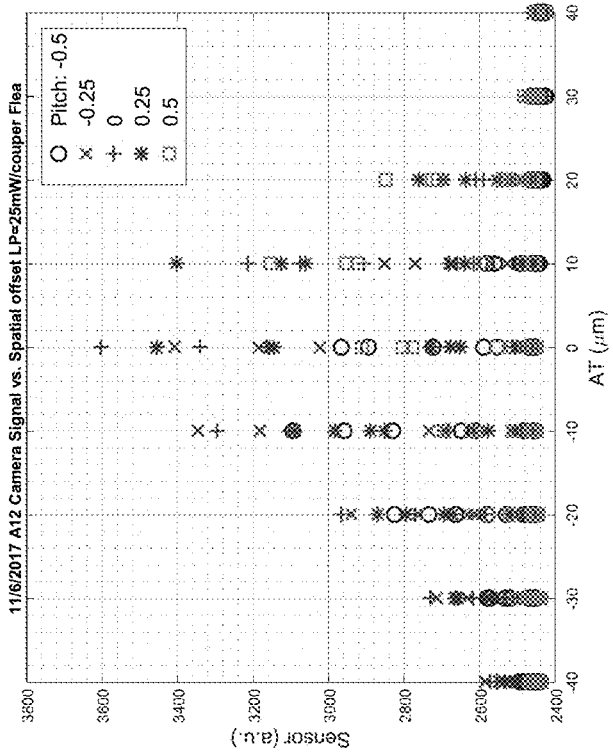
Figure 21C:
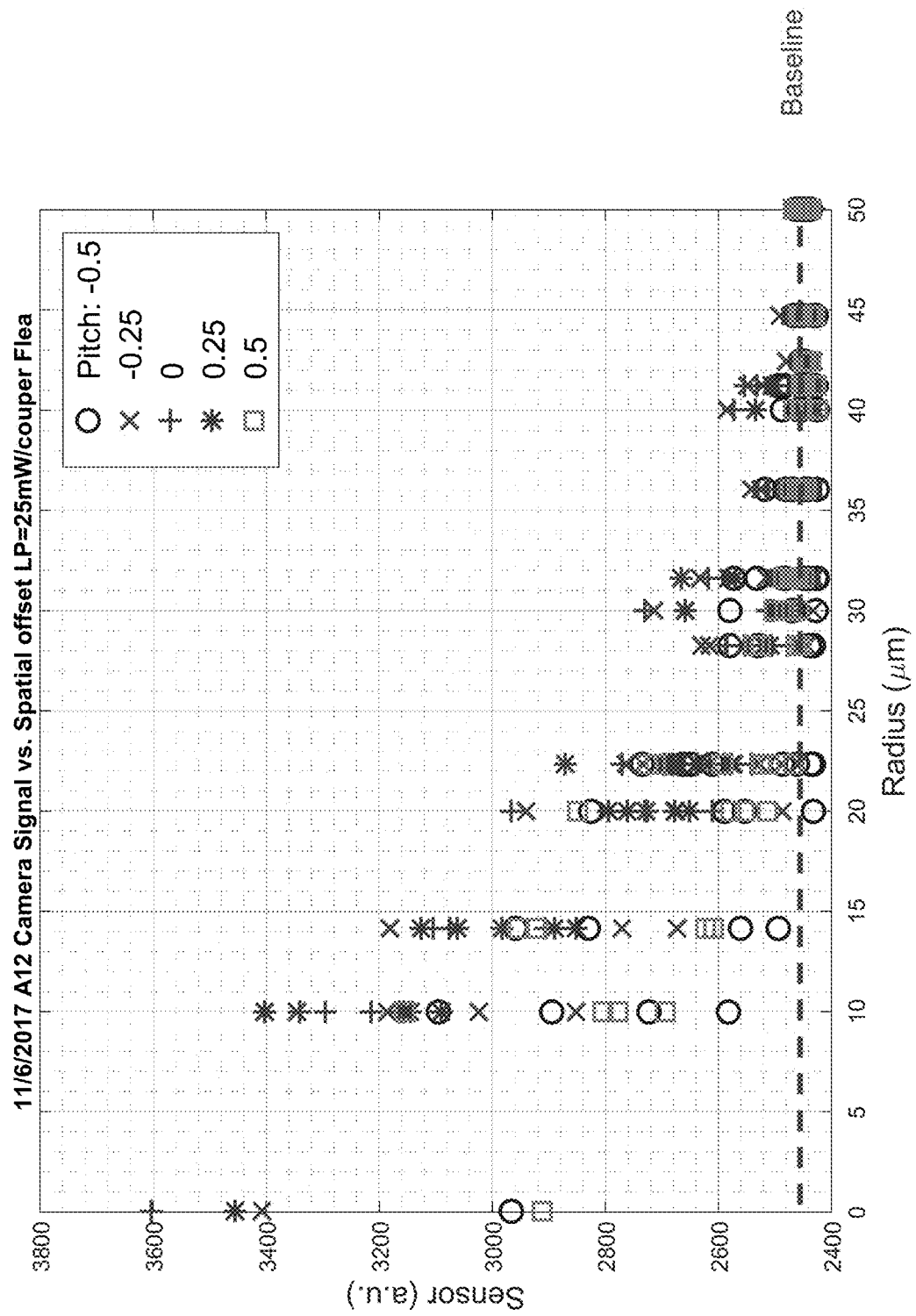

FIGS. 21A-21C illustrate requirements for achieving coarse alignment between a laser beam and a target waveguide device, specifically a DNA sequencing chip, in an optical system with no alignment camera. In this example, optical signals emitted by fluorescent reagents in the reaction regions of an arrayed waveguide device are measured as an indication of the efficiency of coupling of an input optical source and thus the alignment of the device with the source. The fluorescent signals are collected on a +/−40 micron grid with 10 microns resolution in x and y and range of +/−0.5° with 0.25° resolution in pitch angle with respect to the optimal alignment point. The same set of data is plotted as a function of 3 different coordinates in FIGS. 21A-21C. The figures illustrate that the laser beam is preferably within about +/−20 microns in x (21A) and y (21B) coordinates (called AT and CT on the plots) and within about +/−0.5° in pitch of the optimum alignment point in order to excite fluorescent signal, which can be subsequently detected by the chip sensor. In this example, the fluorescent signal is an average over 3×3 camera pixels in the sequencing area, and this averaging can be done quickly in the FPGA.

Under this requirement, if one assumes a +/−300 μm tolerance uncertainty of the input coupler position with respect to the laser beam in x and y and +/−2° in the pitch angle, then for a blind coarse search alignment, one needs to step through (300 μm/20 μm)*(300 μm/20 μm)*(2°/0.5°) ~15*15*4=900 locations. If roughly 0.1 sec camera exposure time per location is required to detect the fluorescent signal and that laser beam steering is done much faster and therefore its latency can be neglected, then blind coarse alignment search can be completed in ~90 seconds. Additional auxiliary alignment features described above can speed up this coarse alignment, which will be especially useful if tolerances are larger or if optics steering time is slower than in the example above.

All patents, patent publications, and other published references mentioned herein are hereby incorporated by reference in their entireties as if each had been individually and specifically incorporated by reference herein.

While specific examples have been provided, the above description is illustrative and not restrictive. Any one or more of the features of the previously described embodiments can be combined in any manner with one or more features of any other embodiments in the present invention. Furthermore, many variations of the invention will become apparent to those skilled in the art upon review of the specification. The scope of the invention should, therefore, be determined by reference to the appended claims, along with their full scope of equivalents.

What is claimed is:

1. A system for optical analysis, the system comprising:
    an optical source, the optical source configured to emit an optical excitation beam into free space, and
    a removable target waveguide device, comprising:
        at least one optical coupler, the at least one optical coupler configured to receive the optical excitation beam through free space from the optical source;
        at least one optical waveguide, the at least one optical waveguide comprising a first end; wherein the first end of the optical waveguide is configured to receive an optical excitation signal from the at least one optical coupler;
        at least one reaction region, the at least one reaction region optically coupled to the at least one waveguide; and
        at least one detector region, the at least one detector region optically coupled to the at least one reaction region and configured to detect an optical alignment signal from the at least one reaction region;
    wherein either the target waveguide device or the optical excitation beam is movable relative to the other; and
    wherein the system is configured to monitor the optical alignment signal and to move either the target waveguide device or the optical excitation beam relative to one another to increase the optical alignment signal.

2. The system of claim 1, wherein the system does not include an alignment camera.

3. The system of claim 1, wherein the system is configured to move either the target waveguide device or the optical excitation beam relative to the other to increase the optical alignment signal to a maximum level.

4. The system of claim 1, wherein either the target waveguide device or the optical excitation beam is movable in two dimensions.

5. The system of claim 1, wherein the at least one detector region is configured to detect both an optical alignment signal and an optical emission signal from the at least one reaction region.

6. The system of claim 1, wherein the optical excitation beam is configured to project at least a coarse illumination spot and a fine illumination spot on the target waveguide device, and wherein the coarse illumination spot is larger than the fine illumination spot.

7. The system of claim 6, wherein the optical excitation beam is configured to project the coarse illumination spot on the target waveguide device while the target waveguide device or the optical source is moved.

8. The system of claim 1, wherein the target waveguide device further comprises at least one auxiliary alignment sensor or at least one auxiliary alignment coupler positioned on a surface of the target waveguide device at a distance from the at least one optical coupler.

9. The system of claim 8, wherein the distance is defined using photolithography during manufacture of the target waveguide device.

10. The system of claim 8, wherein the at least one auxiliary alignment sensor or the at least one auxiliary alignment coupler is configured for use in a coarse alignment process.

11. The system of claim 8, wherein the target waveguide device comprises a plurality of auxiliary alignment sensors or a plurality of auxiliary alignment couplers.

12. The system of claim 11, wherein the plurality of auxiliary alignment sensors or the plurality of auxiliary alignment couplers are arranged in a geometric pattern.

13. The system of claim 12, wherein the geometric pattern includes the at least one optical coupler that is optically coupled to the at least one reaction region.

14. The system of claim 1, wherein the target waveguide device comprises at least one alignment feature at a defined location on the device, and wherein the location of the alignment feature is stored in a readable format on the device.

15. The system of claim 1, further comprising at least one optical element positioned between the optical source and the target waveguide device, wherein the at least one optical element modulates the optical excitation beam between the optical source and the target waveguide device.

16. The system of claim 15, wherein the at least one optical element is a lens, a polarizer, a wedge, a filter, a prism, a mirror, or a grating.

17. The system of claim 1, wherein the target waveguide device comprises a plurality of optical waveguides, each optical waveguide configured to receive the optical excitation signal from the optical source.

18. The system of claim 17, wherein the target waveguide device comprises at least 2, at least 5, at least 10, at least 50, at least 100, at least 500, at least 1,000, at least 5,000, at least 10,000, or at least 50,000 optical waveguides.

19. The system of claim 17, wherein the target waveguide device comprises no more than 100,000, no more than 50,000, no more than 10,000, no more than 5,000, no more than 1,000, no more than 500, or no more than 100 optical waveguides.

20. The system of claim 17, wherein the target waveguide device comprises from 1 to 100,000, from 100 to 10,000, or from 500 to 5,000 optical waveguides.

21. The system of claim 1, further comprising a computer that receives at least one electronic signal from the at least one detector region and analyzes the at least one electronic signal.

22. The system of claim 21, wherein the analysis comprises obtaining nucleic acid sequencing information.

23. The system of claim 1, wherein the optical excitation beam has a wavelength of excitation from about 450 nm to about 700 nm.

24. The system of claim 23, wherein the wavelength of excitation is from about 500 nm to about 650 nm.

25. The system of claim 1, wherein the at least one optical waveguide comprises a SiON core.

26. The system of claim 25, wherein the SiON core has a refractive index above about 1.6.

27. The system of claim 1, wherein the at least one optical waveguide comprises a core surrounded by silicon dioxide.

28. The system of claim 1, wherein the target waveguide device is fabricated on a silicon chip.

29. The system of claim 1, wherein the at least one detector region comprises a CMOS sensor.

30. The system of claim 1, wherein the optical source is coupled to an optical fiber, and the optical excitation beam is emitted from the optical fiber.

31. The system of claim 1, wherein the optical source is coupled to a planar lightwave circuit through an optical fiber, and the optical excitation beam is emitted from the planar lightwave circuit.

32. The system of claim 1, wherein the at least one reaction region comprises a nucleic acid sample.

33. The system of claim 1, wherein the at least one reaction region comprises a nanoscale well.

34. The system of claim 1, wherein the at least one reaction region comprises a zero mode waveguide.

35. The system of claim 1, wherein the target waveguide device comprises 2 to 16 couplers.

36. The system of claim 1, wherein the target waveguide device comprises from 2 to 16 optical splitters.

* * * * *